United States Patent
Levy

(10) Patent No.: US 9,372,870 B1
(45) Date of Patent: *Jun. 21, 2016

(54) PEER TO PEER CODE GENERATOR AND DECODER FOR DIGITAL SYSTEMS AND CLUSTER STORAGE SYSTEM

(71) Applicant: PEER FUSION, INC., Milpitas, CA (US)

(72) Inventor: Richard S. Levy, Milpitas, CA (US)

(73) Assignee: Peer Fusion, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/148,575

(22) Filed: Jan. 6, 2014

Related U.S. Application Data

(63) Continuation-in-part of application No. 12/701,884, filed on Feb. 8, 2010, now Pat. No. 8,626,820, which is a continuation of application No. 10/763,008, filed on Jan. 21, 2004, now abandoned, application No. 14/148,575, which is a continuation-in-part of application No. 13/550,350, filed on Jul. 16, 2012, now abandoned, which is a continuation of application No. 12/847,994, filed on Jul. 30, 2010, now abandoned, which is a continuation of application No. 11/398,962, filed on Apr. 5, 2006, now abandoned.

(60) Provisional application No. 60/441,822, filed on Jan. 21, 2003, provisional application No. 60/668,807, filed on Apr. 5, 2005.

(51) Int. Cl.
G06F 3/06 (2006.01)
H04L 29/08 (2006.01)
G06F 17/30 (2006.01)

(52) U.S. Cl.
CPC .......... *G06F 17/30206* (2013.01); *G06F 3/067* (2013.01); *H04L 67/1002* (2013.01); *H04L 67/1097* (2013.01); *G06F 3/0683* (2013.01)

(58) Field of Classification Search
CPC ..... G06F 3/0689; G06F 3/0683; G06F 3/067; H04L 67/1002; H04L 67/1097
See application file for complete search history.

(56) References Cited

U.S. PATENT DOCUMENTS

| | | |
|---|---|---|
| 5,588,121 A | 12/1996 | Reddin et al. |
| 5,636,355 A | 6/1997 | Ramakrishnan et al. |
| 5,893,139 A | 4/1999 | Kamiyama |
| 6,029,168 A * | 2/2000 | Frey .................. G06F 17/30067 |
| 6,081,907 A | 6/2000 | Witty et al. |
| 6,173,374 B1 | 1/2001 | Heil et al. |
| 6,678,828 B1 * | 1/2004 | Pham .................... G06F 3/0622 726/2 |
| 6,928,578 B2 | 8/2005 | Archibald, Jr. et al. |

(Continued)

OTHER PUBLICATIONS

Patterson D.A. et al., "A Case for Redundant Arrays of Inexpensive Disks (RAID)," Proceedings of the International Conference on Management of Data (SIGMOD), Jun. 1988, 25pp.

(Continued)

*Primary Examiner* — Jeong S Park
(74) *Attorney, Agent, or Firm* — Haynes Beffel & Wolfeld LLP

(57) ABSTRACT

A highly resilient, scalable, high-performance data storage system that stripes its content across a cluster of peer computers. Multiple peers can fail (up to the FEC level configured in the cluster) without disrupting the clients. Peer failures are detected by the cluster and all missing data is seamlessly generated so all I/O operations complete successfully.

13 Claims, 31 Drawing Sheets

(56) References Cited

U.S. PATENT DOCUMENTS

| | | | |
|---|---|---|---|
| 6,934,904 | B2 | 8/2005 | Talagala et al. |
| 7,287,180 | B1 | 10/2007 | Chen et al. |
| 7,412,433 | B2 | 8/2008 | Anglin et al. |
| 8,626,820 | B1* | 1/2014 | Levy .................... 709/201 |
| 2001/0012442 | A1 | 8/2001 | Kodama |
| 2002/0131423 | A1 | 9/2002 | Chan et al. |
| 2002/0133491 | A1 | 9/2002 | Sim et al. |
| 2002/0162109 | A1 | 10/2002 | Shteyn |
| 2002/0194428 | A1 | 12/2002 | Green |
| 2003/0033308 | A1* | 2/2003 | Patel .................. G06F 11/1076 |
| 2003/0084020 | A1 | 5/2003 | Shu |
| 2003/0120723 | A1 | 6/2003 | Bright et al. |
| 2003/0233455 | A1* | 12/2003 | Leber ................... G02F 1/1339 709/226 |
| 2003/0236961 | A1 | 12/2003 | Qiu et al. |
| 2004/0249972 | A1 | 12/2004 | White et al. |
| 2005/0015460 | A1 | 1/2005 | Gole et al. |
| 2005/0223102 | A1 | 10/2005 | Zhang et al. |
| 2005/0273686 | A1 | 12/2005 | Turner et al. |
| 2005/0283537 | A1 | 12/2005 | Li et al. |
| 2006/0069800 | A1 | 3/2006 | Li |
| 2006/0206889 | A1 | 9/2006 | Ganesan et al. |
| 2006/0212782 | A1 | 9/2006 | Li |
| 2006/0224760 | A1 | 10/2006 | Yu et al. |
| 2008/0282298 | A1 | 11/2008 | Ganesan et al. |
| 2009/0010426 | A1* | 1/2009 | Redmond ......... H04L 29/06027 380/29 |

OTHER PUBLICATIONS

Lawler, S., "Active/Active Controller Configuration Overview and Best Practice Guidelines—FAS Systems with Data ONTAPâ 7G," Network Applicance, Inc., Jan. 2007, 21 pp.

EMC2 white paper, "EMC CLARiiON High Availability (HA)—Best Practices Planning," Apr. 2007, 19 pp.

SNIA Technical Position, "Common RAID Disk Data Format Specification," Rev. 1.2 with Errata A Applied, Aug. 2007, 96 pp.

CiteSeer list of 20 articles which cited Plank, J.S., "A Tutorial on Reed-Solomon Coding for Fault-Tolerance in RAID-like Systems," Software Practice and Experience, 27(9): 995-1012, Sep. 1997 [CiteSeer list retrieved online on Oct. 8, 2003 <URL:http://citeseer.nj.nec.com/context/158301/41070>] 5 pages.

Burkhard, W.A. et al., "Disk Array Storage System Reliability," University of California, San Diego and Storage Architectures, Jul. 1993, 10 pages.

Hartman, J.H., "The Zebra Striped Network File System," Dissertation, University of California, Berkeley, 1994, 159 pages.

McAuley, A.J., "Reliable Broadband Communication Using a Burst Erasure Correcting Code," ACM SIGCOMM '90, Sep. 1990, pp. 1-10, Philadelphia, PA.

Plank, J.S., "A Tutorial on Reed-Solomon Coding for Fault-Tolerance in RAID-Like Systems," University of Tennesee, Feb. 19, 1999, p. 1-19.

Rabin, M.O., "Efficient Dispersal of Information for Security, Load Balancing, and Fault Tolerance," Journal of the Association for Computing Machinery, Apr. 1989, pp. 335-348, vol. 36, No. 2.

Rizzo, L., et al., "Effective Erasure Codes for Reliable Computer Communication Protocols," ACM Computer Communication Review, Apr. 1997, pp. 24-36, vol. 27, No. 2.

Rizzo, L., et al., "RMDP: an FEC-Based Reliable Multicast Protocol for Wireless Environments", Mobile Computing and Communications Review, vol. 2, No. 2, Apr. 1998, pp. 1-10.

Rowstron, A. et al., "Storage Management and Caching in PAST, a Large-Scale, Persistent Peer-To-Peer Storage Utility," ACM, 2001, 13 pages.

Xin, Q. et al., "Evaluation of Distributed Recovery in Large-Scale Storage Systems," Proceedings of the 13th IEEE International Symposium on High Performance Distributed Computing, Jun. 2004, 10 pages, Honolulu, HI.

Office Action mailed Jun. 27, 2011 in U.S. Appl. No. 12/847,994.

Sun Microsystems, Inc. white paper for Solaris ZFS™, 2008, 16 pp.

Seltzer M. et al., "A New Hashing Package for UNIX," presented at USENIX—Winter '91—Dallas, TX, 12 pp.

Hewlett Packard Administrator's Guide, VERITAS Volume Manager 3.1, for HP-UX 11i and HP-UX 11i Vrsion 1.5, Jun. 2001, 432 pp.

Litwin, W., "Linear Hashing: A New Tool for File and Table Addressing," IEEE 1980, pp. 212-223.

EMC 2 white paper, "EMC Symmetrix DMX-4 Ultra-Performance Tier 0 Using Flash Drives," Jun. 2008, 12 pp.

Tang, H. et al., "Differentiated object placement and location for self-organizing storage clusters," Technical Report 2002-32, UCSB, Nov. 2002, 14 pp.

Bakkaloglu, M., et al. "On correlated failures in survivable storage systems." Information Systems Journal May (2002), 2pp.

Wells, C., "The OceanStore archive: Goals, structures, and self-repair," U.C. Berkeley Masters Report, May 2002, 20pp.

Office Action mailed Feb. 21, 2012 in U.S. Appl. No. 12/701,884, 6pp.

Response filed Mar. 21, 2012 to Office Action mailed Feb. 21, 2012 in U.S. Appl. No. 12/701,884, 6pp.

Office Action mailed Sep. 8, 2011 in U.S. Appl. No. 12/556,518, 10pp.

Response filed Mar. 1, 2012 to Office Action mailed Sep. 8, 2011 in U.S. Appl. No. 12/556,518, 10pp.

Applicant-Initiated Interview Summary mailed Feb. 23, 2012, 3pp.

Final Office Action mailed May 14, 2012 in U.S. Appl. No. 12/556,518, 6pp.

Applicant-Initiated Interview Summary mailed Jun. 27, 2012, 3pp.

Response B filed Jun. 25, 2012 to final office action mailed May 14, 2012, 9pp.

Notice of Allowance mailed Jul. 18, 2012 in U.S. Appl. No. 12/556,518, 7pp.

Office Action mailed Nov. 5, 2012 in U.S. Appl. No. 13/550,350, 6pp.

U.S. Appl. No. 13/657,675—Office Action dated Jul. 3, 2013, 16 pages.

* cited by examiner $$\begin{bmatrix} 1 & 1 & 1 & \cdots & 1 \\ 1 & 2 & 3 & \cdots & n \\ \vdots & \vdots & \vdots & & \vdots \\ 1 & 2^{m-1} & 3^{m-1} & \cdots & n^{m-1} \end{bmatrix}_{20}$$

Figure 2

$$\begin{bmatrix} 1 & 0 & 0 & \cdots & 0 \\ 0 & 1 & 0 & \cdots & 0 \\ \vdots & \vdots & \vdots & & \vdots \\ 0 & 0 & 0 & \cdots & 1 \end{bmatrix}_{30}$$

Figure 3

$$\underbrace{\begin{bmatrix} 1 & 1 & 1 & \cdots & 1 \\ 1 & 2 & 3 & \cdots & n \\ \vdots & \vdots & \vdots & & \vdots \\ 1 & 2^{m-1} & 3^{m-1} & \cdots & n^{m-1} \end{bmatrix}}_{400} \underbrace{\begin{bmatrix} i_0 \\ i_1 \\ \vdots \\ i_{n-1} \end{bmatrix}}_{401} = \underbrace{\begin{bmatrix} c_0 \\ c_1 \\ \vdots \\ c_{m-1} \end{bmatrix}}_{402}$$

Figure 4

$$\underbrace{\begin{bmatrix} 1 & 0 & 0 & \cdots & 0 \\ 0 & 1 & 0 & \cdots & 0 \\ \vdots & \vdots & \vdots & & \vdots \\ 0 & 0 & 0 & \cdots & 1 \\ 1 & 1 & 1 & \cdots & 1 \\ 1 & 2 & 3 & \cdots & n \\ \vdots & \vdots & \vdots & & \vdots \\ 1 & 2^{m-1} & 3^{m-1} & \cdots & n^{m-1} \end{bmatrix}}_{500} \underbrace{\begin{bmatrix} i_0 \\ i_1 \\ \vdots \\ i_{n-1} \end{bmatrix}}_{501} = \underbrace{\begin{bmatrix} i_0 \\ i_1 \\ \vdots \\ i_{n-1} \\ c_0 \\ c_1 \\ \vdots \\ c_{m-1} \end{bmatrix}}_{502}$$

Figure 5

| i | 0 | 1 | 2 | 3 | 4 | 5 | 6 | 7 | 8 | 9 | 10 | 11 | 12 | 13 | 14 | 15 | 16 | 17 | 18 | 19 | 20 | ... |
|---|---|---|---|---|---|---|---|---|---|---|----|----|----|----|----|----|----|----|----|----|----|-----|
| GFLog | - | 0 | 1 | 25 | 2 | 50 | 26 | 198 | 3 | 223 | 51 | 238 | 27 | 104 | 199 | 75 | 4 | 100 | 224 | 14 | 52 | ... |
| GFILog | 1 | 2 | 4 | 8 | 16 | 32 | 64 | 128 | 29 | 58 | 116 | 232 | 205 | 135 | 19 | 38 | 76 | 152 | 45 | 90 | 180 | ... |

Figure 6

```
        1001
header
{
        source_path="<path_string>";
        VFS_path="<path_string>";
        source_size=<large_unsigned_integer>;
        push_date=<week_day> <month> <day_num> <hh:mm:ss>;
        total_peer_count=<unsigned_integer>;
        min_peer_count=<unsigned_integer>;
        RPE_metric=RPE_count|RPE_percent;
        RPE_Value=<unsigned_integer>;
        replication_count=<unsigned_integer>;
        replication_pc=<unsigned_integer>;
        encryption=<boolean>;
        CW_count=<unsigned_integer>;
        CW_segment_size=<unsigned_integer>;
        last_stripe_size=<unsigned_integer>;
}

1002
replication 0
{
        peer_descriptors=(
              <host_string>(peer_number=<unsigned_integer>,
        last_verification_date=<week_day> <month> <day_num> <hh:mm:ss>;
        heal_count=<unsigned_integer>;
        healed_peers=([<host_string>="<path_string>"]*);
} host_string = host_name|inet_address
path_string = [//<host_string>][/<device_string>][/<dir_string>]⁺/
[<file_string>]
week_day = Mon|Tue|Wed|Thu|Fri|Sat|Sun
month = Jan|Feb|Mar|Apr|May|Jun|Jul|Aug|Sep|Oct|Nov|Dec
hh = 00..24
mm = 00..59
ss = 00..59
segment_id = unsigned_integer
large_unsigned_integer = 0..2⁶⁴
unsigned_integer = 0..2³²
boolean = false|true
```

| Reserved Word | Usage |
|---|---|
| source_path | The original source path of the content |
| VFS_path | The VFS relative file path of the content |
| source_size | The original size of the content |
| push_date | The date the content was staged |
| total_peer_count | The total count of storage hosts involved |
| min_peer_count | The minimum number of storage hosts per cluster |
| RPE_metric | The recoverable error metric (storage cluster percentage or absolute host count) |
| RPE_value | The recoverable error value (e.g. 10 % or 10 hosts) |
| replication_count | The count of storage host cluster replications |
| replication_pc | The count of storage hosts per replication |
| encryption | A Boolean flag indicating whether the content was encrypted prior to encoding |
| CW_count | The count of whole codewords |
| CW_segment_size | The size of each codeword segment |
| last_stripe_size | The size, in symbols of the last (uneven) code word |

1004

| Construct Reserved Word | Usage |
|---|---|
| peer_descriptors | A list of peer descriptors |
| last_verification_date | The last date the HMF was verified |
| heal_count | How many times the HMF was healed |
| healed_peers | A list of storage hosts that were healed |

1005

| Construct Reserved Word | Usage |
|---|---|
| peer_number | The logical number of the storage host in the cluster sequence |

Figure 10B

```
        1006
header
{
        source_path="//host1/D:/users/temp/movie.mpg";
        VFS_path="/users/temp/movie.mpg";
        source_size=549342572;
        push_date=Tue Oct 29 21:36:05 2002;
        total_peer_count=5;
        min_peer_count=5;
        RPE_metric=RPE_count;
        RPE_Value=2;
        replication_count=0;
        replication_pc=5;
        encryption=false;
        CW_count=179523;
        CW_segment_size=51;
        last_stripe_size=50;
}
                1007
replication 0
{
        peer_descriptors=(host2(peer_number=0),host3(peer_number=1),host4(p
eer_number=2),host5(peer_number=3),host6(peer_number=4),0);
        last_verification_date=Tue Oct 29 21:36:05 2002;
        heal_count=0;
        healed_peers=();
}
```

Figure 10C

|        | CW 0 | CW 1 | CW 2 | CW 3 | CW 4 | CW 5 | CW 6 |
|--------|------|------|------|------|------|------|------|
| Peer 0 | E    | 0    | E    | 0    | E    | 0    | 0    |
| Peer 1 | E    | 1    | E    | 1    | 0    | E    | 1    |
| Peer 2 | E    | 2    | 0    | E    | 1    | E    | 2    |
| Peer 3 | 0    | E    | 1    | E    | 2    | E    | 3    |
| Peer 4 | 1    | E    | 2    | E    | 3    | 1    | E    |
| Peer 5 | 2    | E    | 3    | 2    | E    | 2    | E    |
| Peer 6 | 3    | 3    | E    | 3    | E    | 3    | E    |

Figure 11A

|        | CW 0 | CW 1 | CW 2 | CW 3 | CW 4 | CW 5 | CW 6 | CW 7 | CW 8 | CW 9 | CW 10 | CW 11 |
|--------|------|------|------|------|------|------|------|------|------|------|-------|-------|
| Peer 0 | E    | 0    | E    | 0    | E    | 0    | 0    | E    | 0    | E    | 0     | 0     |
| Peer 1 | E    | 1    | E    | 1    | 0    | E    | 1    | E    | 1    | E    | 1     | 1     |
| Peer 2 | E    | 2    | E    | 2    | 1    | E    | 2    | E    | 2    | 0    | E     | 2     |
| Peer 3 | E    | 3    | 0    | E    | 2    | E    | 3    | E    | 3    | 1    | E     | 3     |
| Peer 4 | E    | 4    | 1    | E    | 3    | E    | 4    | 0    | E    | 2    | E     | 4     |
| Peer 5 | 0    | E    | 2    | E    | 4    | E    | 5    | 1    | E    | 3    | E     | 5     |
| Peer 6 | 1    | E    | 3    | E    | 5    | 1    | E    | 2    | E    | 4    | E     | 6     |
| Peer 7 | 2    | E    | 4    | 3    | 6    | 2    | E    | 3    | E    | 5    | 2     | E     |
| Peer 8 | 3    | E    | 5    | 4    | E    | 3    | E    | 4    | E    | 6    | 3     | E     |
| Peer 9 | 4    | E    | 6    | 5    | E    | 4    | E    | 5    | 4    | E    | 4     | E     |
| Peer 10| 5    | 5    | E    | 6    | E    | 5    | E    | 6    | 5    | E    | 5     | E     |
| Peer 11| 6    | 6    | E    | 6    | E    | 6    | 6    | E    | 6    | E    | 6     | E     |

Figure 11B

|  | Peer 0 | Peer 1 | Peer 2 | Peer 3 | Peer 4 | Peer 5 | Peer 6 | Peer 7 | Peer 8 | Peer 9 | Peer 10 | Peer 11 |
|---|---|---|---|---|---|---|---|---|---|---|---|---|
| CW 0 | E | E | E | E | E | 0 | 1 | 2 | 3 | 4 | 5 | 6 |
| CW 1 | 0 | 1 | 2 | 3 | 4 | E | E | E | E | E | 5 | 6 |
| CW 2 | E | E | E | 0 | 1 | 2 | 3 | 4 | 5 | 6 | E | E |
| CW 3 | 0 | 1 | 2 | E | E | E | E | E | 3 | 4 | 5 | 6 |
| CW 4 | E | 0 | 1 | 2 | 3 | 4 | 5 | 6 | E | E | E | E |
| CW 5 | 0 | E | E | E | E | E | 1 | 2 | 3 | 4 | 5 | 6 |
| CW 6 | 0 | 1 | 2 | 3 | 4 | 5 | E | E | E | E | E | 6 |
| CW 7 | E | E | E | E | 0 | 1 | 2 | 3 | 4 | 5 | 6 | E |
| CW 8 | 0 | 1 | 2 | 3 | E | E | E | E | E | 4 | 5 | 6 |
| CW 9 | E | E | 0 | 1 | 2 | 3 | 4 | 5 | 6 | E | E | E |
| CW 10 | 0 | 1 | E | E | E | E | E | 2 | 3 | 4 | 5 | 6 |
| CW 11 | 0 | 1 | 2 | 3 | 4 | 5 | 6 | E | E | E | E | E |

Figure 11C

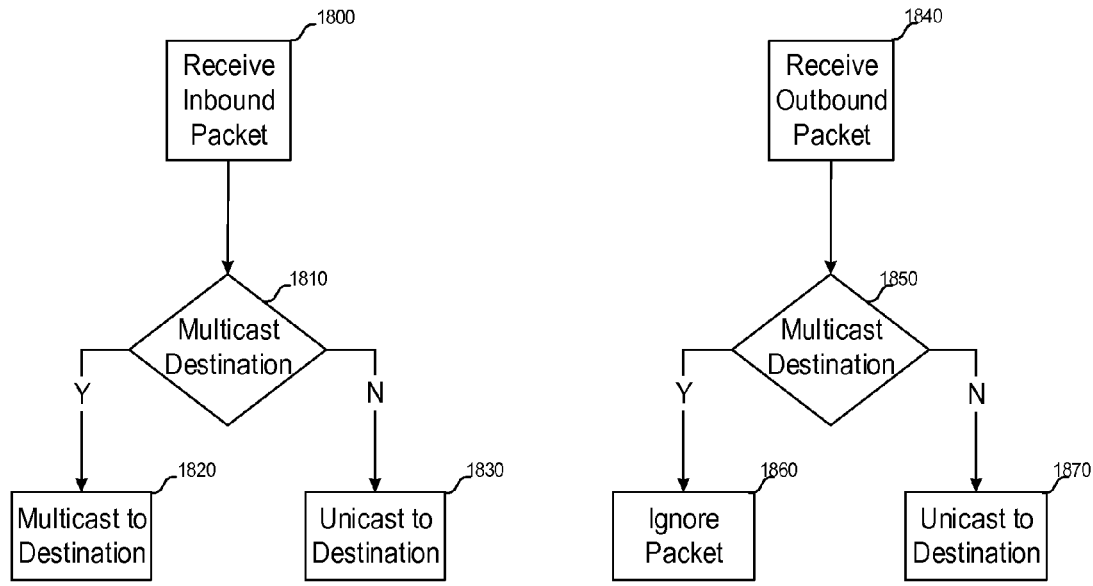
Figure 18A
Figure 18B
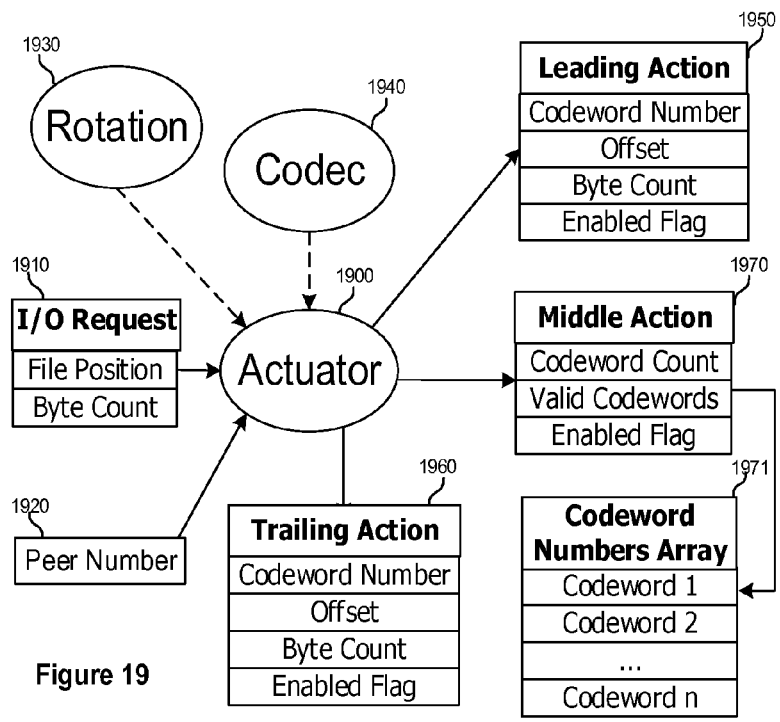
Figure 19

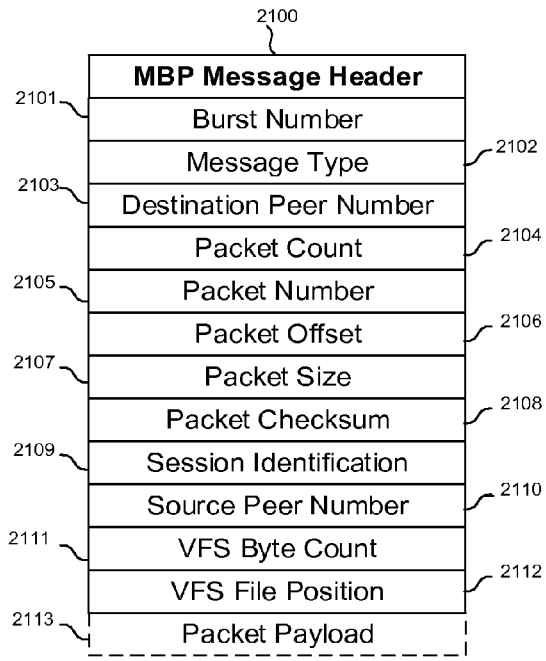

| MBP Message Header | |
|---|---|
| Burst Number | 2101 |
| Message Type | 2102 |
| Destination Peer Number | 2103 |
| Packet Count | 2104 |
| Packet Number | 2105 |
| Packet Offset | 2106 |
| Packet Size | 2107 |
| Packet Checksum | 2108 |
| Session Identification | 2109 |
| Source Peer Number | 2110 |
| VFS Byte Count | 2111 |
| VFS File Position | 2112 |
| Packet Payload | 2113 |

Figure 21A

| MBP Message Types | |
|---|---|
| MBP_MSG_TYPE_ISS | The packet payload is an ISS |
| MBP_MSG_TYPE_CSS | The packet payload is a CSS |
| MBP_MSG_TYPE_GP | The packet payload is a GP |
| MBP_MSG_TYPE_XMITNACK | Request to re-transmit part of a Burst |
| MBP_MSG_TYPE_SAVEACK | A write Burst was saved |
| MBP_MSG_TYPE_XMITHMF | The packet payload is HMF data |
| MBP_MSG_TYPE_XMITRQST | Request to transmit of a Burst |
| MBP_MSG_TYPE_RECVRQST | Request to receive of a Burst |
| MBP_MSG_TYPE_SIDREGISTER | Client request a session registration |
| MBP_MSG_TYPE_SIDUNREGISTER | Client request a session unregistration |
| MBP_MSG_TYPE_PEERFAILURE | Notification that a peer has failed |

Figure 21B

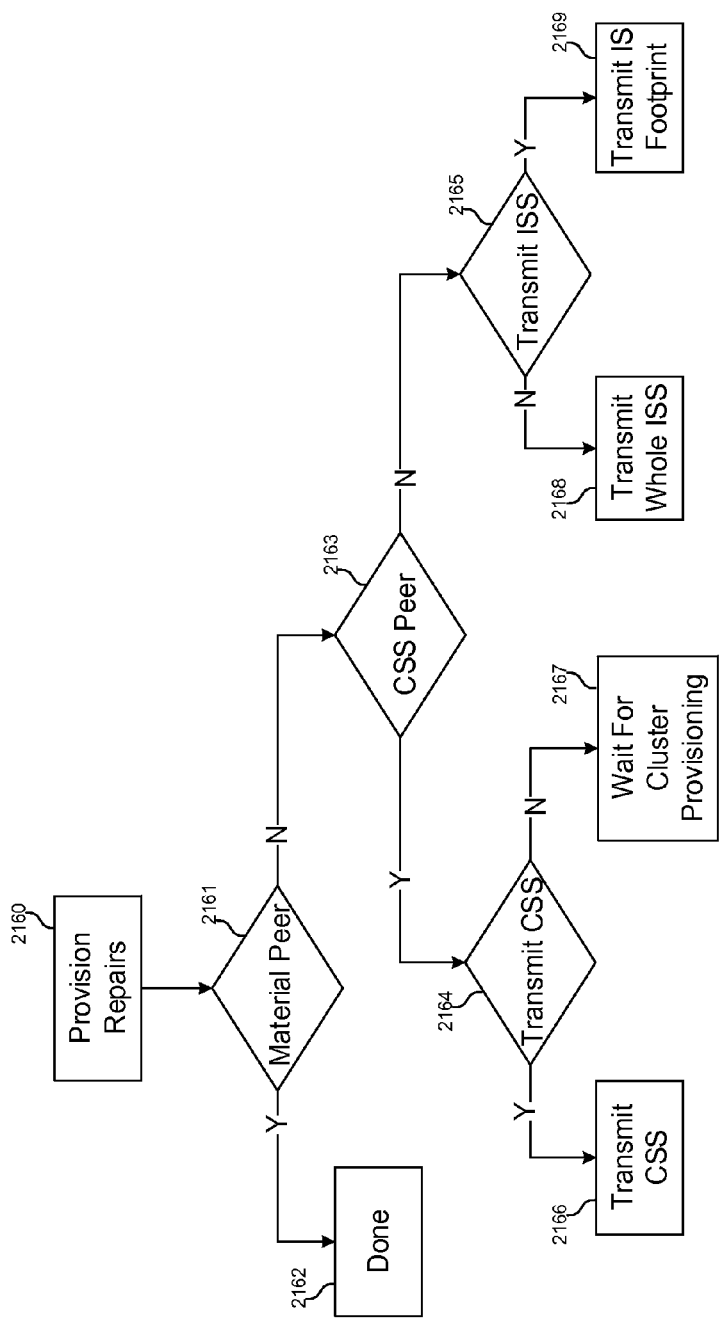
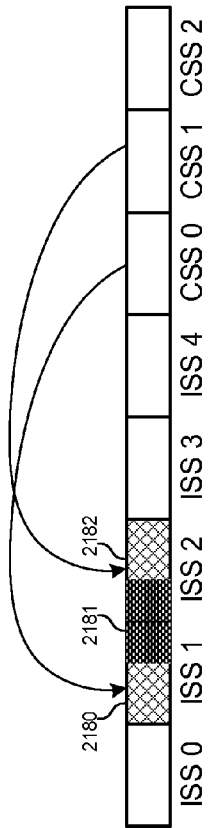
Figure 21D
Figure 21E

PEER TO PEER CODE GENERATOR AND DECODER FOR DIGITAL SYSTEMS AND CLUSTER STORAGE SYSTEM

CROSS-REFERENCE TO OTHER APPLICATIONS

This application is a Continuation-In-Part of U.S. patent application Ser. No. 12/701,884 filed 8 Feb. 2010, which application is a continuation of U.S. patent application Ser. No. 10/763,008 filed 21 Jan. 2004, which application claims priority under 35 U.S.C. §1.119(e) to U.S. provisional Application Ser. No. 60/441,822, filed 21 Jan. 2003, all of which are by Richard S. Levy, are entitled "PEER TO PEER CODE GENERATOR AND DECODER FOR DIGITAL SYSTEMS," and are incorporated herein by reference.

This application is also a Continuation-In Part of U.S. patent application Ser. No. 13/550,350 filed 16 Jul. 2012, entitled "CLUSTER STORAGE SYSTEM," by Richard S. Levy, which application is a continuation of U.S. patent application Ser. No. 12/847,994 filed 30 Jul. 2010, entitled "CLUSTER STORAGE SYSTEM," by Richard S. Levy, which application is a continuation of U.S. patent application Ser. No. 11/398,962 filed 5 Apr. 2006, entitled "CLUSTER STORAGE SYSTEM," by Richard S. Levy, which application claims priority under 35 U.S.C. §1.119(e) to U.S. provisional Application Ser. No. 60/668,807, filed 5 Apr. 2005, entitled "PEER TO PEER NETWORK WITH IMPROVED SPEED, RELIABILITY, AND SCALABILITY," by Richard S. Levy all of which are herein incorporated by reference.

BACKGROUND OF THE INVENTION

1. Field of Invention

The present invention relates to encoding and decoding digital content for reliable distribution and storage within a networked cluster of storage systems and more particularly to a system that evenly distributes the resource requirements across the cluster of storage systems.

2. Description of Related Art

Network Protocols:

Communication between systems across the Internet is generally accomplished through the Internet Protocol (IP). This transmission protocol supports two higher-level protocols: The transfer Control Protocol (TCP/IP) is a streaming point-to-point protocol and the User Datagram Protocol (UDP/IP) is a connectionless protocol.

TCP/IP has been compared to a telephone conversation where the two parties are connected via a dedicated circuit, with the correctness of the data transmitted being guaranteed by the protocol. In TCP/IP, data is transmitted and received as a stream and, while the sequence of bytes is preserved, it is not guaranteed to arrive all at once, as there are no protocol defined packet boundaries. TCP/IP requires one dedicated socket at each end for the duration of the connection. Thus, data to be transmitted to multiple recipients requires multiple socket connections at the source. This can be a limitation as most operating systems have a finite pool of sockets. Once the pool is exhausted, no new connections can be made until some connections are terminated and their sockets are released back into the pool. Further, data to be transmitted to multiple recipients requires retransmission for each additional recipient thereby using more network bandwidth.

UDP/IP is a packet-oriented protocol that has been compared to sending letters via the post office with the correctness of the data being the responsibility of the application and not the UDP/IP protocol. There is very little management of UDP/IP packets, so they can arrive in the wrong order, they can be duplicated, or not arrive at all. Packet loss in UDP/IP could be due to network congestion, operating system socket buffer overflow, etc. In UDP/IP individual packets arrive complete as the protocol does define packet boundaries. UDP/IP does not require a dedicated socket per connection, as the protocol does not manage the state of the transmission. Instead, one socket can be used to send packets to any number of hosts with each datagram specifying a different network address. UDP/IP is generally faster than TCP/IP but it lays upon the application the responsibility for error detection and recovery, as there is no inherent acknowledge and retransmit capability.

UDP/IP defines three ways of transmitting packets: unicast, multicast and broadcast. Unicast transmits datagrams (packets) for delivery to a single recipient. Multicast transmits datagrams for delivery to a well-defined group of recipients. Broadcast transmits datagrams for delivery to every potential recipient on the network. The usage of broadcast is limited due to the heavy load it places on the network.

Transmission Errors:

Anytime data is transferred across a medium from its source to its destination there is the possibility that errors will be introduced causing packet loss. The errors can be introduced at many steps during the transmission. Some errors are due to physical conditions (such as weather, interference, etc.) affecting the transmission medium such as satellite, antenna, etc. Other errors are due to software/hardware conditions (such as network congestion, buffer overflow, CPU busy, etc.) affecting the source and destination systems' ability to send/receive data packets.

Error Detection and Correction:

Transmission failures fall into two categories: "errors" occur when the data received is corrupted and "erasures" occur when the data is not received. The TCP/IP and UDP/IP protocols ensure that the destination system will not receive corrupted data. However, erasures can occur when packets are entirely missed such as when they are not received within an application-defined period of time. This can easily occur in UDP/IP due to network congestion, and it can happen in both UDP/IP and TCP/IP when the source system dies. There are two methods for correcting the errors, Backward Error Correction (BEC) and Forward Error Correction (FEC). BEC is when the destination system detects that an error has occurred in a packet (e.g., through a single checksum, etc.) and requests that the source system retransmit that packet. The implementation is relatively simple, but the performance is poor as the same packet could be re-transmitted many times due to errors. Additionally, the overhead of the protocol requesting a re-transmission upon error detection and otherwise sending an acknowledgement for each packet is great. Standard FEC coding improves the reliability of transmission by introducing checksum symbols into the data prior to transmission. These checksum symbols enable the receiving system to detect and correct transmission errors, when the error count is within the encoding parameters, without requesting the retransmission of the original data.

Forward Error Correction (FEC):

One of the criteria by which a FEC coding method is gauged is the number of failures/erasures that it can tolerate. There exist many FEC codes whose implementations are of varying complexity depending upon the flexibility and performance required. High performance parity-based coding methods (e.g., Hamming, etc.) usually compute the checksum symbols using the bitwise exclusive-or (XOR) of the data. These are inadequate, as they can tolerate no more than two errors at a time in some error combinations. A system is needed that can tolerate the number of systems failing simultaneously within a cluster to be greater than two. Such coding methods (e.g., generic Reed-Solomon, etc.) often have poor performance when used to encode/decode large data sets that makes them inapplicable to most real-world problems. Another consideration is whether the coding method allows the sequential decoding of the data. Sequential decoding retrieves the data in the order in which it appeared in the original content before encoding. Streaming of audio/video content is not possible without the ability to decode sequentially as the entire data context would have to be decoded before streaming could commence. This is impractical, as it requires that the decoded content be stored locally, which may exceed the system's storage capacity and/or violate the content's copyright/licensing, as well as entail a long delay while the decoding is proceeding before the streaming can begin. For content that does not have a sequential nature (e.g., databases, etc.), a coding method that allows random access into the encoded representation is necessary. The requirement is to encode/decode a specific area of the data set without first encoding/decoding from the start down to the specific area. Performance is an issue for those encoding methods that have this capability while other encoding methods lack this capability altogether.

Storage Medium:

The vast majority of on-line content is stored on hard disk drives (HDD). Near-line content, though mostly stored on tape, is migrating to HDD as the cost of the latter continues to come down and their capacity expands. Off-line content is usually stored on tape. Some storage mediums have inherent limitations that preclude some functionality (e.g., linear tape requires sequential access, volatile memory is not capable or retaining data, etc.) Other storage mediums have no such limitations and allow the application of the full functionality of this invention (e.g., HDD's, Flash memory, etc.)

HDD's are most interesting at the present because the growth in their capacity has far outpaced their ability to store and retrieve data. This asymmetry is such that entirely reading or writing a one-terabyte HDD's would require many days.

Another limitation of HDD's is their reliability. No matter what their Mean Time Between Failure (MTBF), HDD's can fail thereby losing their contents. In order to improve their reliability, HDD's are sometimes grouped into a Redundant Array of Independent Disks (RAID) configuration so that the loss of a single member of the disk group will not interrupt the operations of the RAID. When the defective disk is replaced with a new (empty) disk, the RAID will "rebuild" the data that belongs on the new disk. This is an operation that can take several hours depending upon the size of the disk and the how busy the RAID is. Starting from the time the disk failure was first detected and until the time the replacement disk is "rebuilt", the RAID is said to be "naked." The term naked indicates that the RAID no longer offers any protection, as the loss of a second member of the disk group is fatal to the RAID since it is incapable of correcting more than one failure.

Virtual File System:

A Virtual File System (VFS) provides a unified view of multiple networked file systems. Conventional VFS technology is essentially a networked file system in that only the real file systems know and manage their contents. A VFS is not a real file system as it relies on real file systems to manage the files on their local disks (thus, the "virtual" aspect). Therefore accessing a file through a VFS amounts to forwarding file I/O commands (e.g., open, close, read, write, etc.) via the network to a remote file system. One advantage of a VFS is that it can provide a common layer over heterogeneous file systems. The main benefit is the translation of file path syntax between the different file systems. Thus, an application running under one file system can access files on a remote file system through a seemingly native file path.

One of the limitations of current VFS technology is that it can only represent files that are entirely contained within a single file system.

Scalability:

The amount of data to store is growing at a tremendous rate with no indications of tapering any time soon. This has resulted in ever-greater capacity and performance requirements for storage servers. The latter have grown to manage terabytes of data, which has exacerbated the I/O throughput problems. Storage Area Networks (SAN) were created to provide high performance Fibre networks connecting servers and large RAID's. SAN's are highly complex and very expensive.

Redundancy:

Powerful servers service many simultaneous data transfers and therefore would have a severe impact when they become unavailable. A failure in a non-redundant server will cause immediate disruptions. Redundancy is often added to servers to minimize down time by avoiding single points of failure. Server sub-systems can be made redundant by duplicating their major components, including the hard disk drives (RAID), the host bus adapters (HBA), RAID controllers, CPUs, network interfaces, memory, routers, switchers, power supplies, etc. SAN's have the same reliability requirements so they are made redundant which requires cross strapping of all the connecting cables from all the servers, RAID's, SAN's, etc. For all this added hardware, most servers and SAN's provide only protection for a single point of failure, as a second failure within the same sub-system will usually cause disruptions. Most fully redundant systems still cause disruptions when their failed components are repaired (e.g., a memory bank, CPU or I/O controller are replaced). The failed components must be repaired as soon as possible because their unavailability increases the vulnerability of the systems. Thus, fully redundant systems do not eliminate disruptions on failures, they simply afford some time to schedule the disruption. Embodiments of the present invention are inherently able to withstand multiple concurrent failures as well as having repairs performed while operational without disruptions.

Server Failure:

When a storage server or RAID fails, its content becomes unavailable and all of its sessions (data transfers) are aborted. At best a replacement becomes available and the clients re-issue their requests so that the sessions restart. This does not result in the resumption of the sessions at the point of interruption; the sessions have lost their previous context. In some cases, the massive spike of activity due to the hundreds of re-issued requests can by itself overwhelm the new server. Some requestors will not re-issue the request and incomplete content may remain on their systems. It is hoped that the new server has access to the same data as the server that failed without which the new requests will fail. As a rule, the error recovery process is more complex than the transfer process for both the clients and the servers. Typically, a backup/standby server detects a server failure and a fail-over procedure is initiated culminating in the backup server taking over. The new server has no knowledge of on-going transactions that were aborted as no context is retained during the fail-over procedure. The client systems must recover from the failure and attempt to reconnect to the new server when it completes its take-over for the failed server. It is the burden of the client to keep state and cleanup any interrupted transactions. Long database transactions may be impossible to roll back and the clients may no longer have the data to restart the transactions.

The solution is usually to restart the client and requires operator intervention. A very large industry has developed to provide software solutions as workarounds. These are very complex and expensive, yet cannot avoid disruptions either when the failure occurs or when the repair occurs.

Load Balancing:

Load balancing is a major problem for enterprise data centers. Load balancing encompasses all of the resources of a server including the CPU(s), the memory, the storage capacity, the storage I/O bandwidth, the network bandwidth, etc. The availability of large RAID Storage Systems and powerful servers is not sufficient to ensure load balancing. The location of the most requested data determines which servers and their network segments bear the greatest load. Thus, a data center could have several RAID Storage Systems of identical capacity with very different loads based upon usage patterns. Typically adjusting the load is a complex endeavor require service disruption due to the need to move data, take RAID systems off-line in order to re-stripe them, etc.

BRIEF SUMMARY

Described embodiments of the present invention provide a reliable, distributed, efficient and highly scalable method and system for storing content onto a cluster of Storage Systems that store segments of encoded stripes of the content. Content can be retrieved from the cluster of Storage Systems by reassembling the encoded stripes and if necessary decoding them into original content. Through decoding, the reassembly is successful even if some Storage Systems in the cluster are unavailable or transmission errors occur causing data loss. The high availability of the content is ensured as the system can be configured to recover from the loss of a high percentage of cluster members.

In one embodiment of the present invention, the content (file or stream) is divided into blocks of input symbols and encoded using a derivative of the Reed-Solomon coding method to produce checksum symbols used to recover from multiple erasures. The combination of an input symbol block and its computed checksum symbols forms a codeword. A codeword preferably is divided into equal size segments that are each stored on their respective Storage System.

The Reed-Solomon encoding process is usually very time consuming, especially when the data set is large and the FEC criteria are high. At forty percent FEC, error-based Reed-Solomon algorithms usually achieve a performance of a few thousand bytes per second and the erasure-based algorithms usually achieve less than four megabytes per second. This lack of performance has rendered them inappropriate for most software applications. The novel implementation of the encoder and decoder of embodiments of the present invention achieve very high performance. At forty percent FEC, the present system exceeds seventy megabytes per second. One advantage of embodiments of the present invention is that the encoding computation of checksum symbols has been greatly simplified over standard Reed-Solomon encoding. For a given codeword, a checksum symbol generated through a standard Reed-Solomon algorithm can be used to recompute any missing input symbol. The overhead of computation is tremendous to achieve such flexibility. Furthermore, this flexibility is not necessary for erasures-only implementations. As a direct result of the simplified encoding, the decoding has also become simpler and therefore faster as well. Another advantage of embodiments of the present invention is that the size of the codewords is not limited by the size of the domain of symbols of the implementation. A typical 8-bit symbol Reed-Solomon implementation has a total symbol domain size of 255 symbols ($2^8-1$) and therefore has a maximum codeword size of 255 symbols. The inefficiencies of dividing a large data set (many gigabytes) in sub-256 byte segments (to allow for checksum symbols in the codeword) include starting/stopping encoding very often (which results in many function calls) and greater network overhead as many more packets of a smaller size must be transmitted. Another advantage of embodiments of the present invention is that the encoding and decoding computation is distributed equally to all the Storage Systems within the cluster instead of being performed only by the Storage System initiating the staging of the content. The resulting performance improvements reduce the time required to encode a one-gigabyte file onto a cluster of five PCs from two hours with an ordinary implementation of an encoder to less than five seconds with embodiments of the present invention. The performance continues to improve as the Storage System cluster grows so that a twenty PC cluster requires one second, etc. Another advantage of embodiments of the present invention is that the performance gains grow in essence linearly with the size of the Storage System cluster with the only limit being the network bandwidth and the aggregate I/O throughput of the Storage Systems. The addition of Storage Systems to the cluster introduces no additional overhead.

One advantage of embodiments of the present invention is that the cluster of Storage Systems is self-healing. The system will periodically ascertain the state of the cluster by querying its members to verify that each Storage System is operational and is storing the data as expected. The data lost due to the unavailability of any members of the cluster can be reconstructed on replacement Storage Systems. Healing can occur while a file is being read as well as written. There are no disruptions as the availability of the data is uninterrupted during the healing process. The impact on performance of healing a file is negligible as the amount of computation required is minimal. Consider a gigabyte file stored on a cluster of ten Storage Systems with one failed cluster member. As the gigabyte file is striped equally, the replacement Storage System must recover the one tenth of file that was stored on the failed system (a hundred megabytes). In embodiments of the present invention, all members of the cluster including the replacement Storage System have equal opportunity to participate in the heal transaction. Thus, the hundred megabytes is divided into the ten Storage System cluster with each member computing ten megabytes concurrently. Each member of the cluster is computing one hundredth of the original file size). At a rate of seventy megabytes per second, the missing hundred megabytes are computed in less than one second.

Another aspect of this invention is the added data security it offers. The ability to re-assemble and decode the content from a cluster requires access to a Host Map File (HMF) data that is created as part of the encoding process and stored as the header of every stripe file in the cluster. By optionally encrypting the HMF data and also storing it in a separate file we can ensure that no Storage System is aware of the other members of the cluster or of its own sequence, of the name/location of the original content, of the encoding parameters, etc. Content that has been encoded (Reed-Solomon), scrambled (rotation of the input and checksum symbol segments), and distributed (within a cluster of Storage Systems) is very difficult to recover without the corresponding HMF data. Conventional encryption of a file preserves the contiguity of the data and relies on the keys to safeguard it. In embodiments of the present invention, the files on a Storage System do not represent contiguous data, but interlaced segments of data that, except for one Storage System, do not start at the beginning of the original content. Content thus, encoded would be highly secure, readily available for retrieval or streaming, yet never be stored on a single computer. The file content can also be encrypted before or after being encoded for added security.

The balancing of the I/O and capacity load is another advantage of embodiments of the present invention. In an enterprise data center, embodiments of the present invention allow immediate deployment and integration of new Storage Systems. Embodiments of the present invention consider the Storage Systems as modular building blocks that are tapped as needed to dynamically assemble storage clusters. There no longer is a need to strategize on where to store the data in order to minimize single points of failure and balance the load. In this heterogeneous environment, the main criteria in dynamically enlisting a Storage System into a cluster for purposes of storing content are its availability, its storage capacity and its present load (e.g., processor, memory, network, etc.). Specifically, a Storage System's hardware architecture and operating system are not considerations as they are not material to the storing of data. Embodiments of the present invention automatically distribute the entire load evenly across the cluster including I/O (disk and network), CPU (encoding and decoding) and storage capacity.

BRIEF DESCRIPTION OF THE DRAWINGS

First Set of Embodiments

FIG. 2 depicts an m×n Vandermonde matrix.

FIG. 3 depicts an n×n identity matrix.

FIG. 4 depicts the encoder multiplication of the Vandermonde matrix with one packet of input symbols (data).

FIG. 5 depicts the n+m×n maximal decoder matrix before the elimination of erasure rows and inversion.

FIG. 6 depicts the first few entries in the logarithm and inverse logarithm tables of the Galois field $GF(2^8)$.

FIG. 10A depicts the grammar of the Host Map File.

FIG. 10B depicts a tabular description of the constructs in a Host Map File.

FIG. 10C depicts a sample Host Map File.

FIG. 11A depicts a seven-segment Rotational Distribution Look Up Table sorted by peers (Storage Systems).

FIG. 11B depicts a twelve-segment Rotational Distribution Look Up Table (RLUT) sorted by peers (Storage Systems).

FIG. 11C depicts the RLUT of FIG. 11B sorted by codewords.

Second Set of Embodiments

Figure 16:
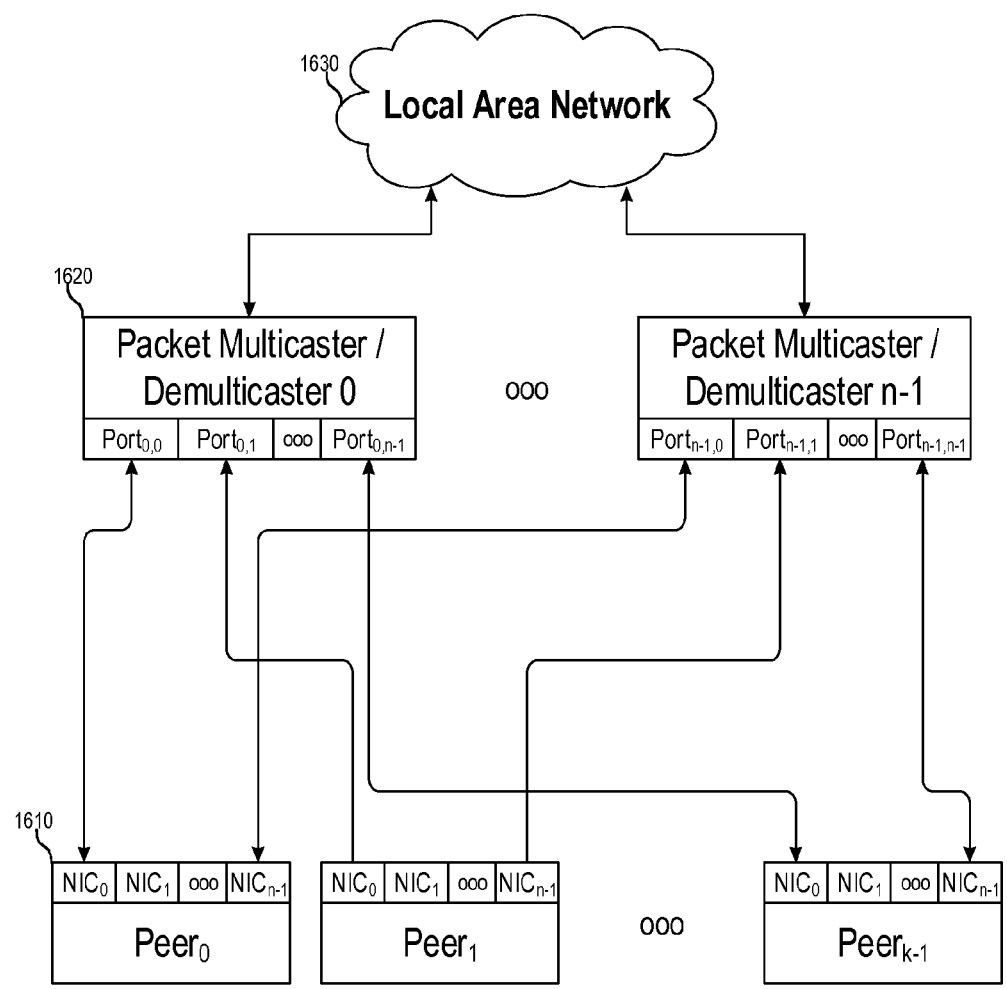

FIG. 16 is a block diagram of a basic network layout of a cluster of peers.

Figure 17A:
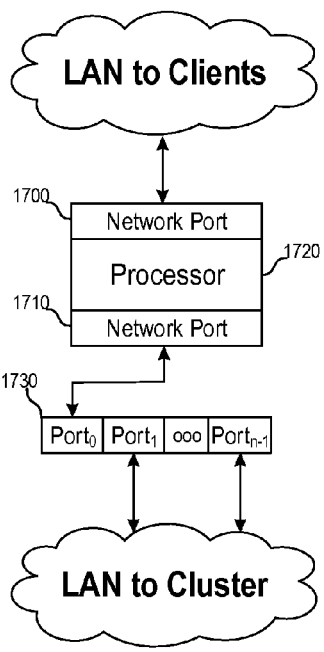

FIG. 17A is a block diagram of a Packet Multicaster/Demulticaster where the processor is separate from the switch.

Figure 17B:
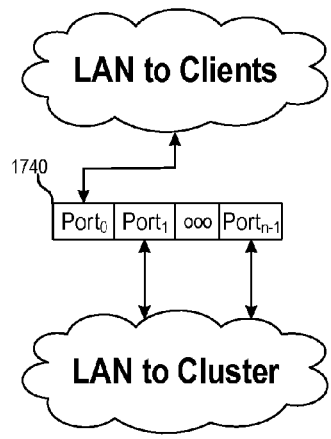

FIG. 17B is a block diagram of a Packet Multicaster/Demulticaster where the processor is in the switch.

Figure 17C:
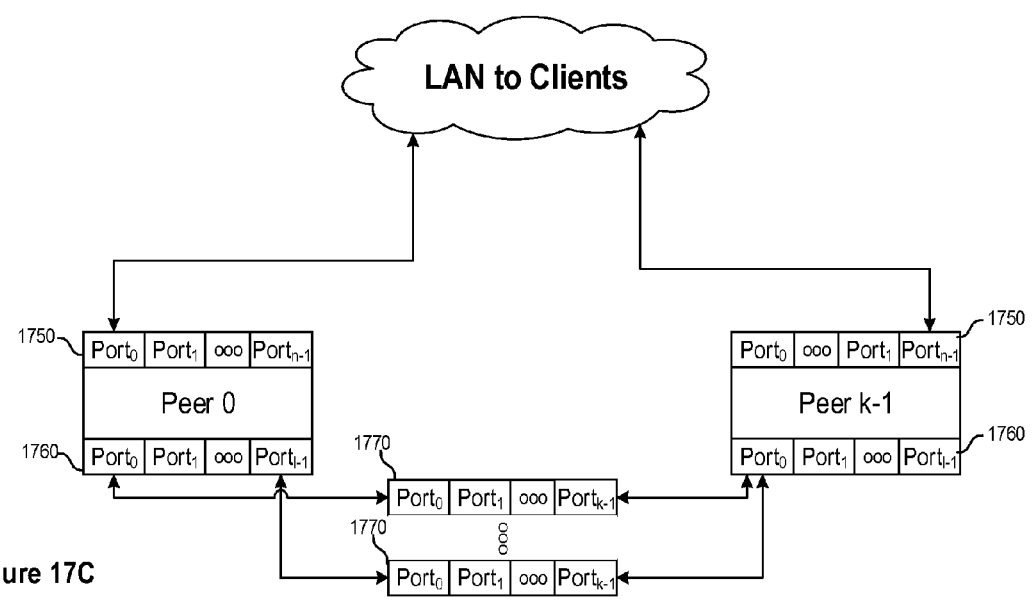

FIG. 17C is a block diagram of a Packet Multicaster/Demulticaster where the processor is in the peer.

FIG. 18A is a flowchart of the processing of an inbound packet by the Packet Multicaster/Demulticaster.

FIG. 18B is a flowchart of the processing of an outbound packet by the Packet Multicaster/Demulticaster.

FIG. 19 is a block diagram of the various components of the core.

Figure 20A:
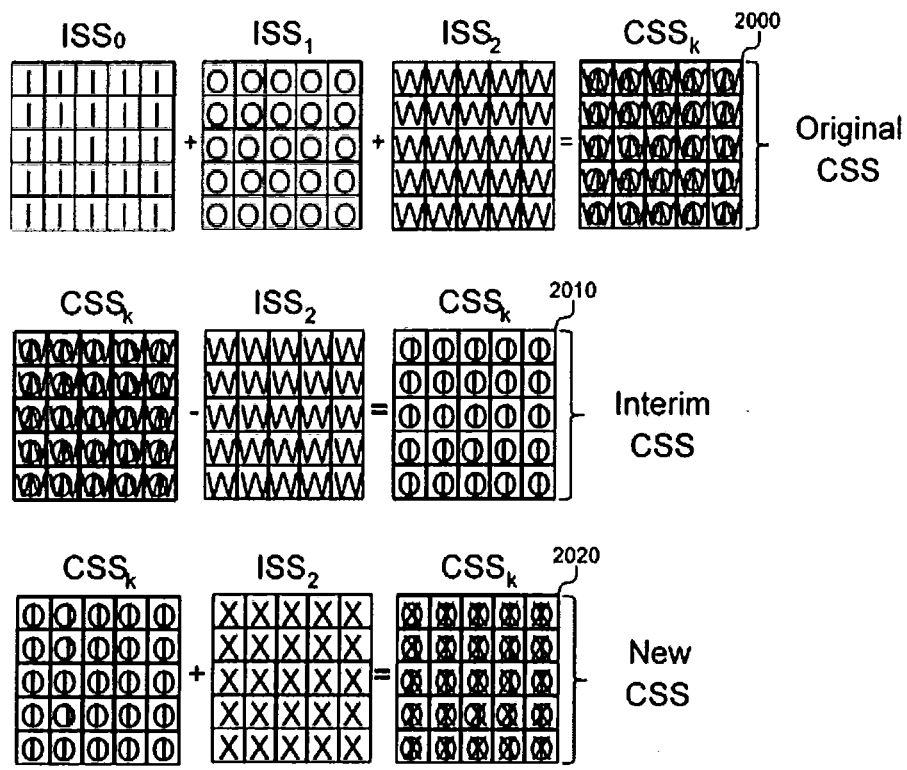

FIG. 20A is a diagram of the de-encoding process of the codec.

Figure 20B:
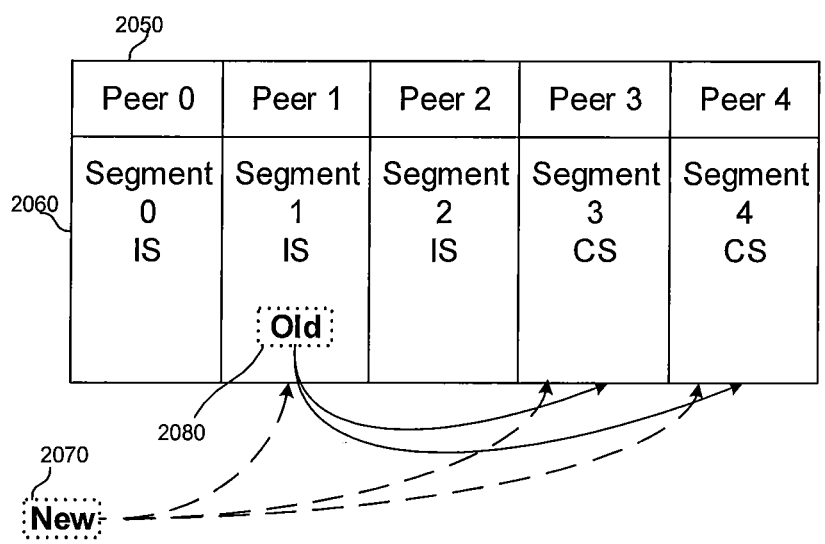

FIG. 20B is a diagram of the provisioning of the de-encoding process of the codec.

FIG. 21A is a diagram of the MBP message header.

FIG. 21B is a table of the MBP message types and their use.

Figure 21C:
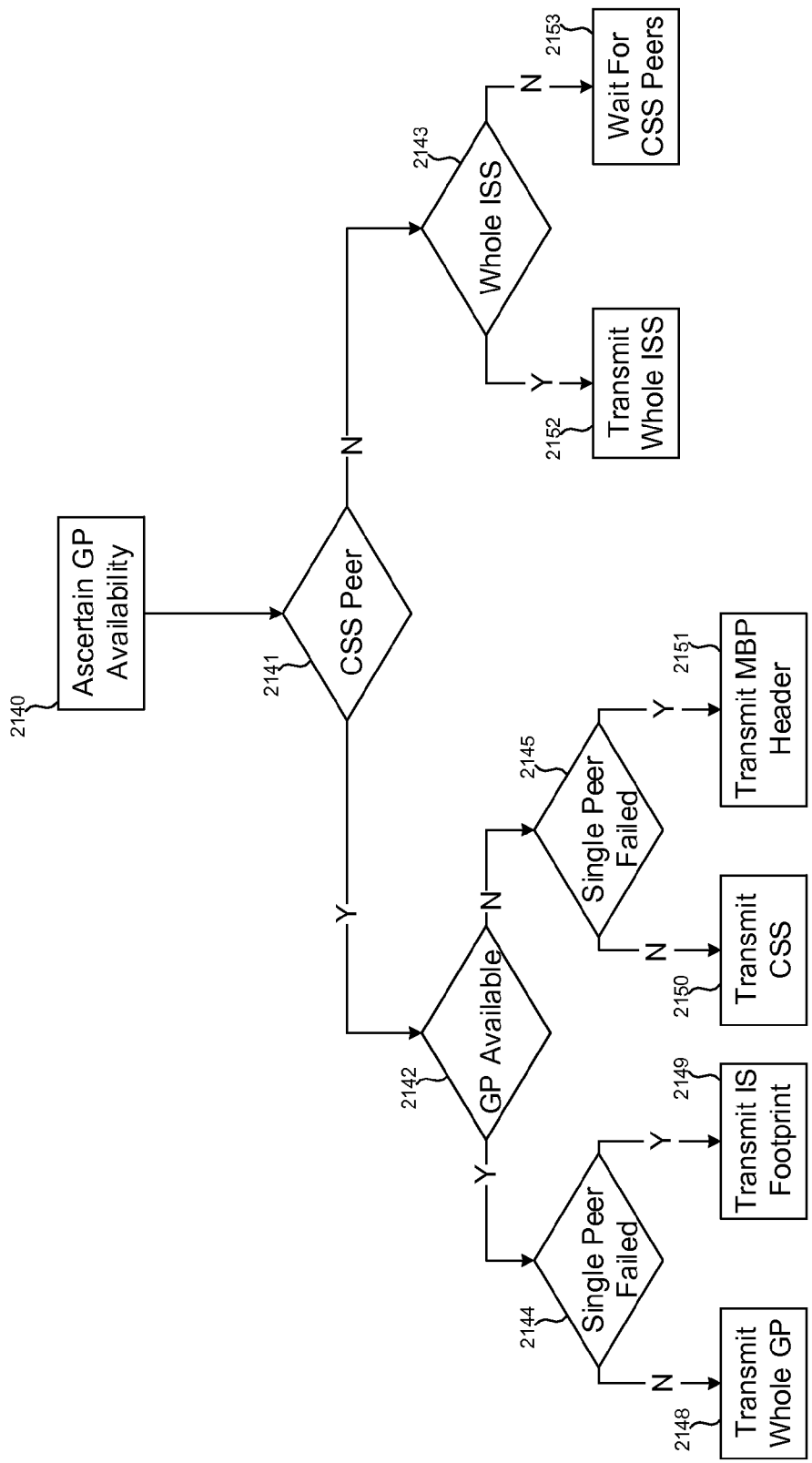

FIG. 21C is a flowchart of step 1 of the processing of a partial codeword write request.

FIG. 21D is a flowchart of step 2 of the processing of a partial codeword write request.

FIG. 21E is a diagram of an example of a partial codeword write request with peer failures.

Figure 22:
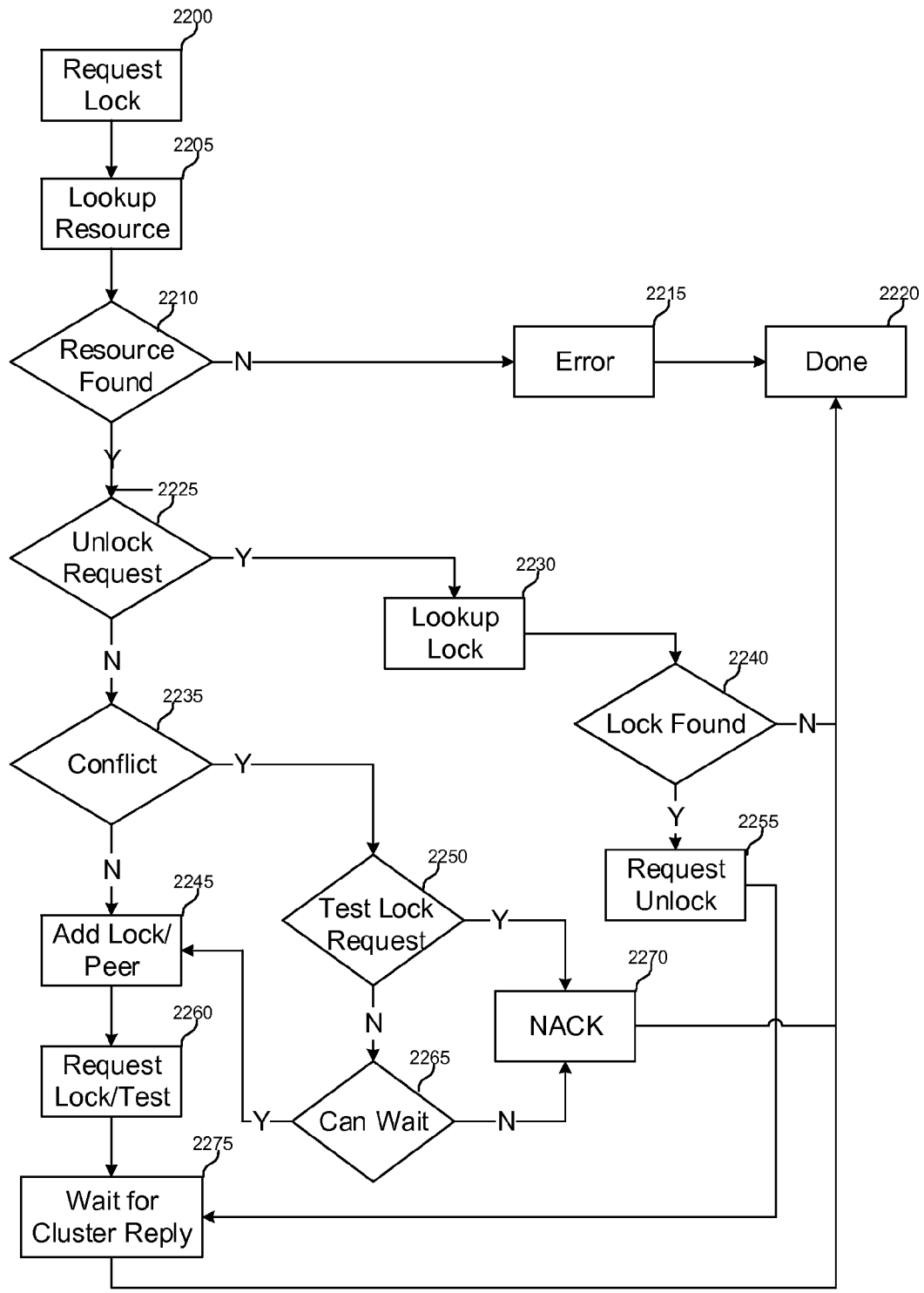

FIG. 22 is a flowchart of the Cluster lock request message transmission.

Figure 23A:
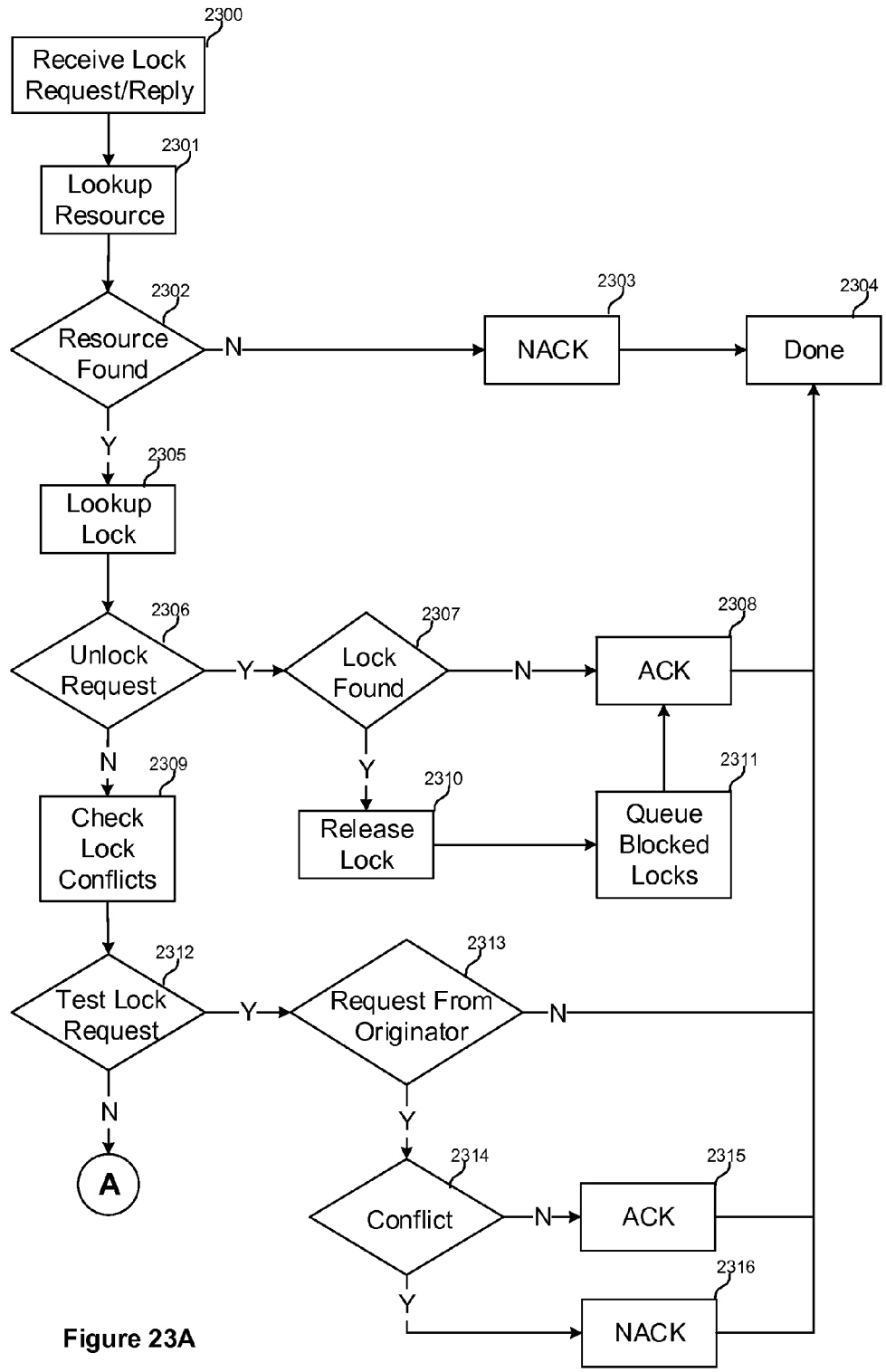

FIG. 23A is a flowchart of the Cluster lock request/reply message reception.

Figure 23B:
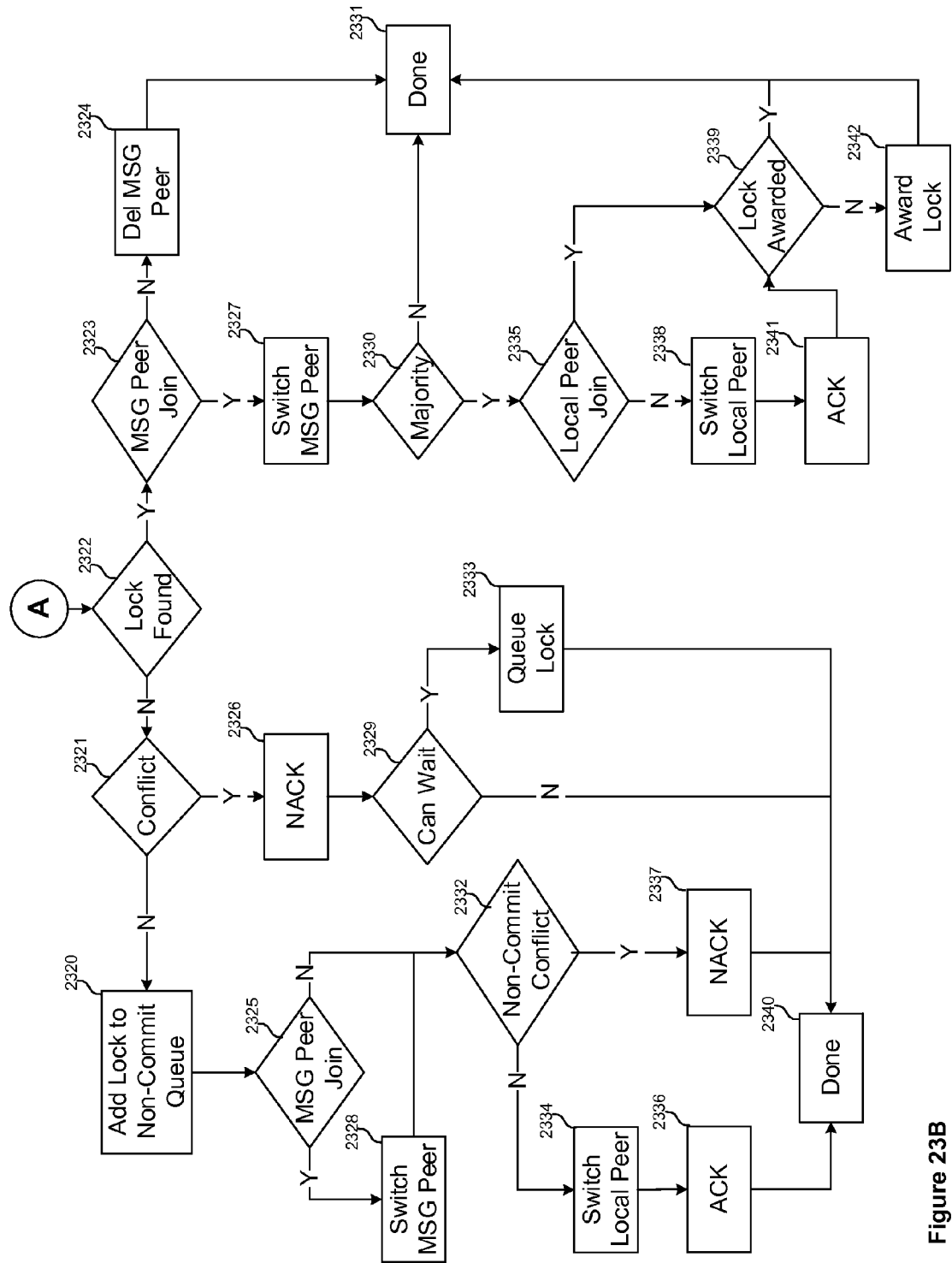

FIG. 23B is a flowchart of the Cluster lock request/reply message reception.

Figure 24B:
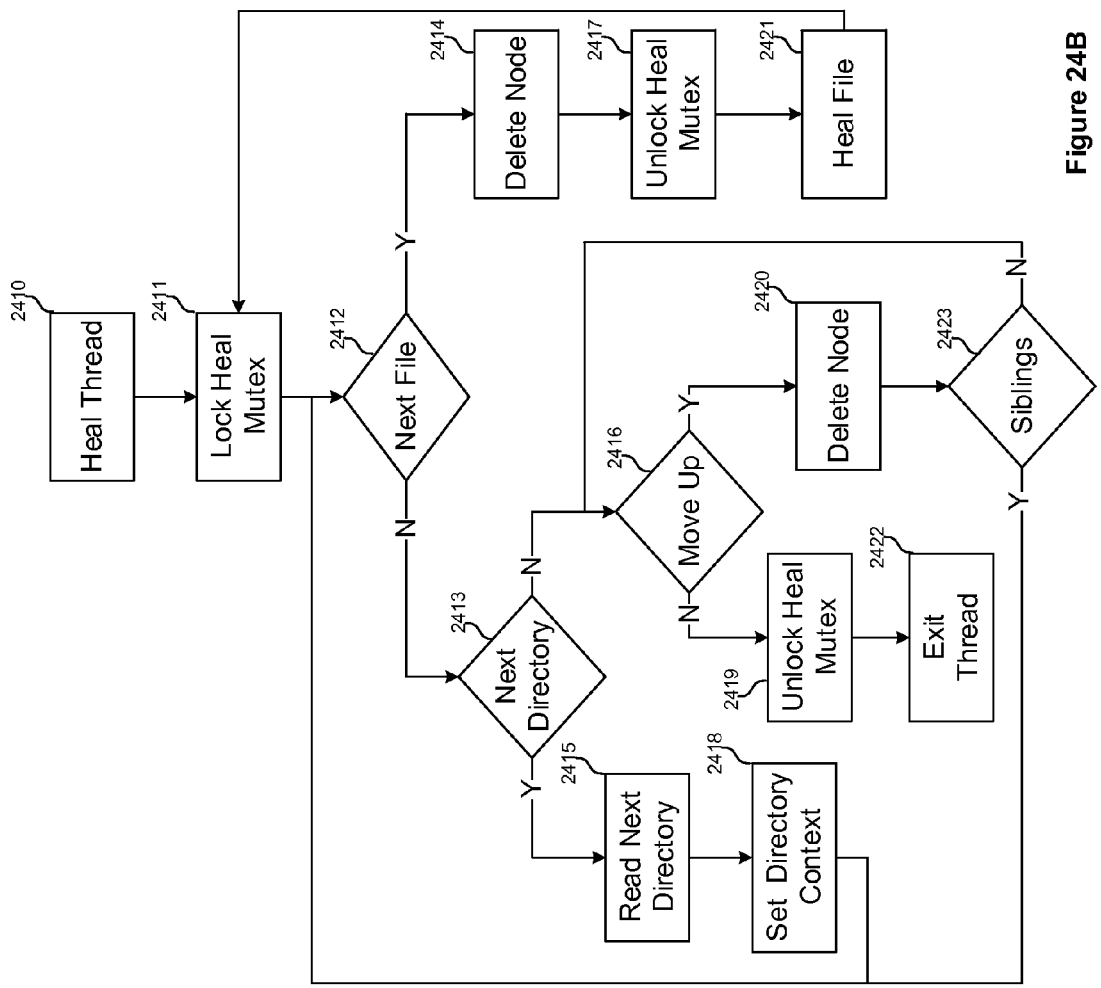
Figure 24A:
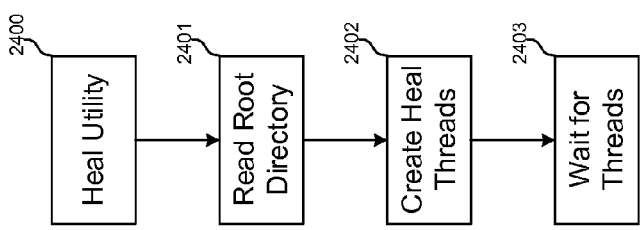

FIG. 24A is a flowchart of the Heal Utility as applicable to the first embodiment.

FIG. 24B is a flowchart of the Heal Thread as applicable to the first embodiment.

Figure 25B:
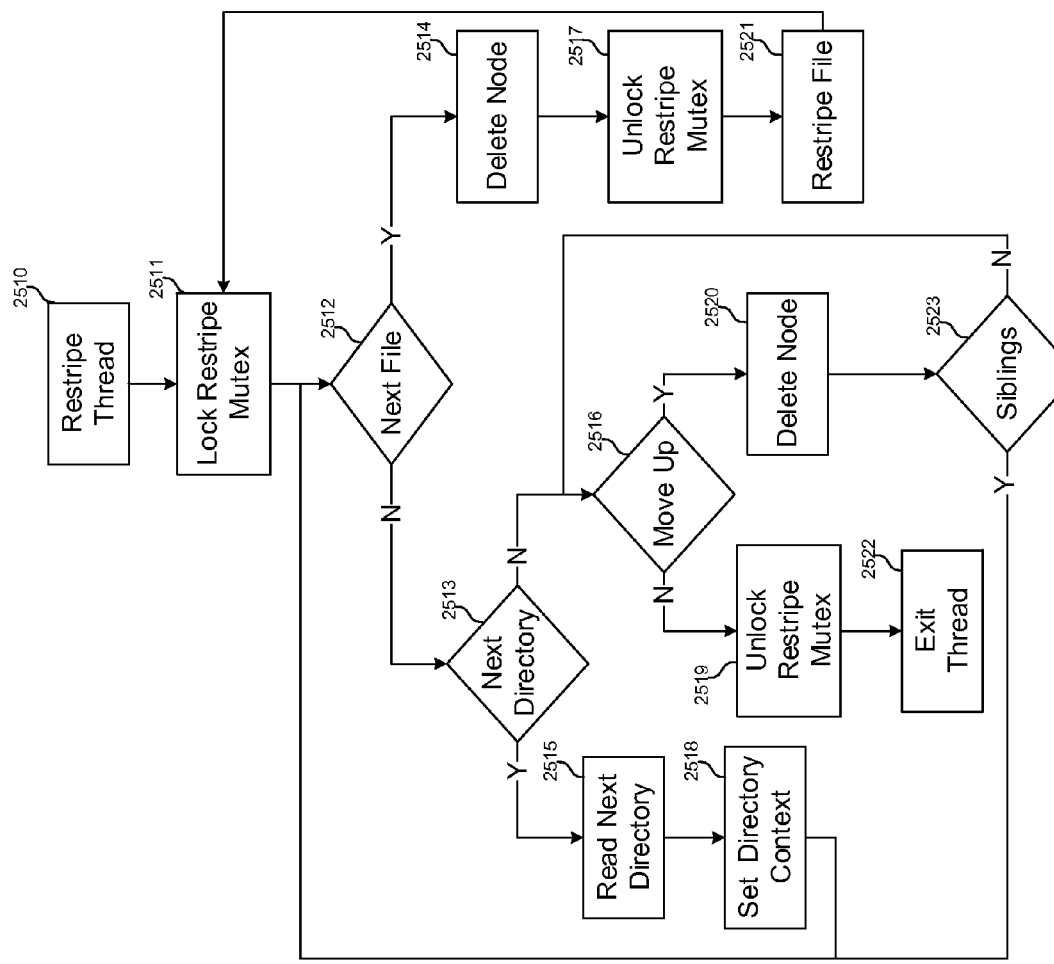
Figure 25A:
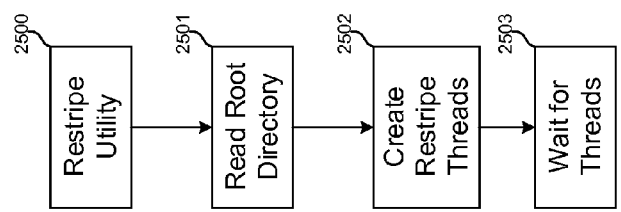

FIG. 25A is a flowchart of the Re-stripe Utility as applicable to the first embodiment.

Figure 26A:
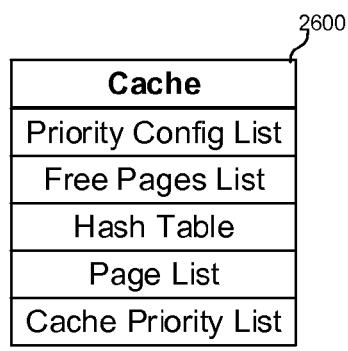
Figure 26B:
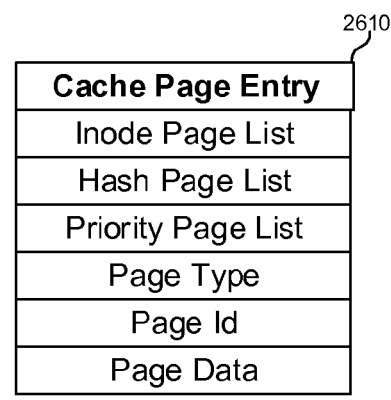
Figure 26C:
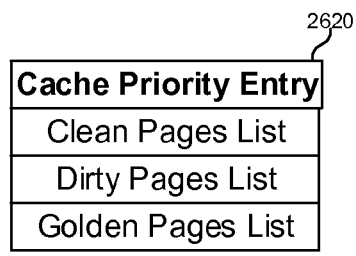
Figure 26D:
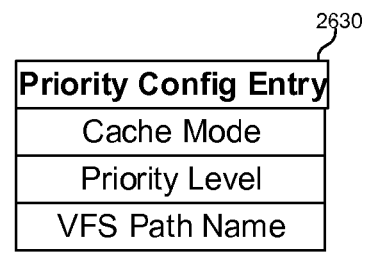

FIG. 25B is a flowchart of the Re-stripe Thread as applicable to the first embodiment.
FIG. 26A is a diagram of the Cache.
FIG. 26B is a diagram of the Cache Page Entry.
FIG. 26C is a diagram of the Cache Priority Entry.
FIG. 26D is a diagram of the Cache Priority Configuration Entry

DETAILED DESCRIPTION

First Set of Embodiments

General Discussion
A Generic Reed-Solomon Encoder Implementation:

A Reed-Solomon encoder takes input symbols and computes the corresponding checksum symbols in order to produce a codeword that can correct transmission errors. The width of the symbols is variable, though as it grows the universe of symbols, defined as $2^w$ where w is the width of the symbols in bits, becomes rapidly unmanageable for most computers. At w=8, the universe of symbols is $2^8$=256 (8-bit) bytes which is quite manageable. At w=16, the universe of symbols is $2^{16}$=65536 (16-bit) words which is manageable from the memory aspect, but time-consuming from the computational aspect. At w=32, the universe of symbols is $2^{32}$=4294967296 (32-bit) words which exceeds the memory and computational capacity of most computers. Due to current performance limitations of computers, the width of the symbols is usually set at w=8. The input and checksum symbols are combined to form a resilient block of symbols called a codeword.

The Reed-Solomon codes are defined as:

$$RS(n,k)$$

Where n is the total number of symbols per codeword and k is the number of input symbols per codeword. The number of checksum symbols r is defined as:

$$r=(n-k)$$

The maximum number of symbols with errors that can be corrected is:

$$t=r/2$$

Redundancy is the ratio of checksum symbols to input symbols. Increasing the redundancy increases the reliability, but also the storage space occupied and the time required to compute the checksum symbols. A full implementation of a Reed-Solomon encoder is one that recovers from failures due to erasures and errors. By definition, an erasure occurs at a known location within the codeword whereas the location an error must be discovered through computation to validate the codeword. To recover from x input symbol errors requires 2x checksum symbols. If the codeword size is 255 bytes and the recoverable input symbols error count is 16, then at least 32 checksum symbols must be generated leaving a payload of at most 223 input symbols in a packet.

A Vandermonde matrix (see FIG. 2) is an m×n matrix defined as:

$$v_{i,j}=j^{i-1}$$

FIG. 4 depicts encoding using Reed-Solomon codes for the recovery of erasures.

The encoding is the multiplication of an m rows by n columns (m×n) Vandermonde matrix V 400 and an n×1 input symbol matrix D 401 resulting in a m×1 checksum symbol matrix C 402, using the following equation:

$$VD=C$$

These checksum symbols can be used to augment the input symbols during transmission thereby providing the recipient(s) the (FEC) capability to repair erasures in the input symbols by recomputing them using the checksum symbols.

The codeword is represented by the m+n×1 matrix E defined as:

$$E = \begin{bmatrix} D \\ C \end{bmatrix}$$

FIG. 5 depicts the computation of matrix E 502 as:

$$WD=E$$

Where the m+n×n matrix W 500 is defined as:

$$W = \begin{bmatrix} I \\ V \end{bmatrix}$$

The matrix I is the identity matrix as depicted in FIG. 3.
The maximum count M of symbols per codeword CW is $$M=2^w-1$$

For example for w=8, M=255 symbols.

Codewords are divided into as many segments as there are hosts in a cluster so that a cluster of H hosts will result in codewords divided into H segments of size s $$s=M/H$$

Where H is less than or equal to M to ensure that no cluster stores less than one symbol per codeword. Were H allowed to be greater than M, bit manipulation of the symbols in the codewords would be required which would significantly impact performance.

A fundamental requirement of the erasure recovery algorithm is that any checksum symbol can be used to recover any input symbol. In other words, any checksum symbol segment can be used to recover any input symbol segment. This is because it is not possible to predict which input symbols will be erased.

A Generic Reed-Solomon Erasures Decoder Implementation:

The decoding process in order to recover erasures in the input symbols D relies on the equation:

$$D=EW^{-1}$$

Where the $W^{-1}$ matrix is the inverse of the W matrix as computed using arithmetic over Galois fields. Galois field arithmetic is necessary in Reed-Solomon computation as the universe of symbols used is limited to binary words of fixed length. The finite precision of such words renders calculations such as the Gaussian Elimination (used to invert the dispersal matrix) impossible. Galois fields are used to ensure valid results of arithmetic over the universe of symbols. Galois field arithmetic defines addition and subtraction of the elements of the field as the exclusive-or (XOR) operation. Multiplication and division over Galois fields are performed using two logarithm tables as partly depicted in FIG. 6. Multiplication is defined to be the inverse log of the addition of the logs of two numbers expressed as:

$$GFILog(GFLog(a)+GFLog(b))$$

And division is defined to be the inverse log of the subtraction of the logs of two numbers expressed as:

$$GFILog(GFLog(a)-GFLog(b))$$

Continuing the decoding process, within matrix $W^{-1}$ the rows corresponding to input symbol erasures are removed from W and E, and any n rows are selected from W and E, thereby producing W' and E' respectively. No more than m rows can be removed, as this is the count of checksum symbols produced. Each erasure value is recomputed by multiplying the corresponding logical row in W' by E'. Any checksum erasures are ignored, as it is only necessary for the decoding process to recompute the input symbol erasures. An error occurs when the erasures count exceeds the checksum count m, as there is insufficient information to repair the erasures detected.

The described embodiments of the present invention are only concerned with erasures, which makes it more efficient. To recover from x input symbol erasures requires x checksum symbols. If the codeword size is 255 bytes and the recoverable input symbols error count is 16, then at least 16 checksum symbols must be generated leaving a payload of at most 239 input symbols in a codeword. Thus, an erasure failure model requires fifty percent less checksum symbols than an error failure model. This increase in the input symbol payload per codeword translates into fewer packets transmitted and less data stored on the staging hosts.

Details of Embodiments

In the descriptions of the embodiments described herein, the FEC coding method used is a derivative of the Reed-Solomon codes. Other coding methods can also be used depending upon their suitability to various embodiments of the present invention. Much literature exists describing Reed-Solomon codes and their use is widespread, ranging from satellite communication to compact disk players, etc. However, their ability to recover from failures due to errors as well as erasures is to a significant degree offset by their poor performance. Embodiments of the present invention achieve substantial improvements in performance through three main components. The first is a high performance algorithm for encoding and decoding. The second is load balancing of all computation and I/O over a cluster of Storage Systems. The third is a high performance communication Multicast Burst Protocol (MBP). The system benefits from several other novel aspects such as essentially limitless scalability, a true Virtual File System, no single point of failure, etc., as described later.

Figure 1A:
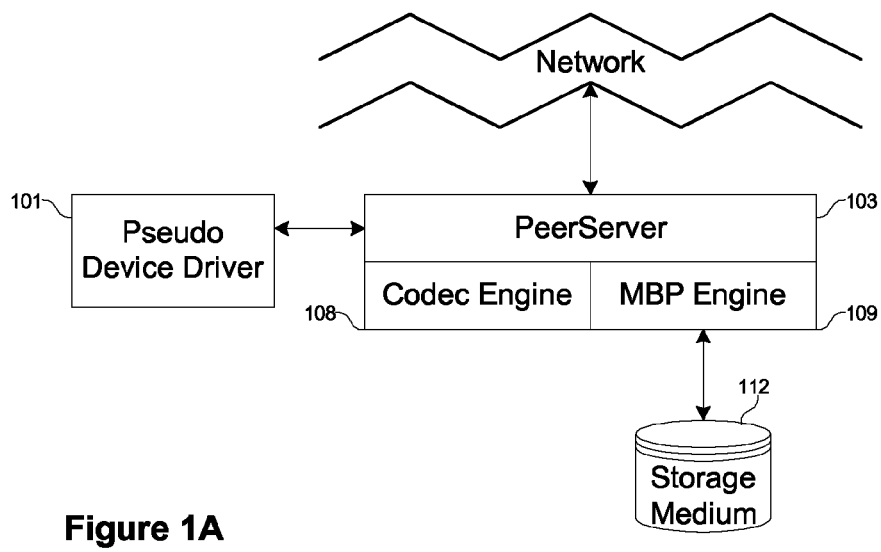
FIG. 1A depicts a block diagram of the major components of a Storage System including a PeerServer, a Pseudo Device Driver, a Codec Engine, an MBP Engine and a local storage medium.

Embodiments of the present invention have one or more clusters of Storage Systems functioning as peers to collaborate in the storage and retrieval of data. The present invention refers to Storage Systems rather than computers and storage mediums rather than hard disk drives, as these are one embodiment but by no means the only one. A Storage System as illustrated in FIG. 1A has three major components: a PeerServer 103, a Codec Engine 108 and an MBP Engine 109. The Pseudo Device Driver 101 may optionally reside on the Storage System, but is not required. The fundamental hardware requirements of a Storage System are: a processor, memory, a network connection and some storage medium. There are many ways to satisfy these requirements. A processor and memory can be available through a server, a single board computer or even a System On a Chip (SOC). Most of these also include network connectivity through either a board, a single chip or embedded within the SOC. The storage medium requirement is for a persistent repository of data. Many devices satisfy this requirement beside hard disk drives, including flash memory, tape drives, CD-R, etc. Storage technology is evolving rapidly and the various storage mediums are well suited for different embodiments of the present invention.

The cluster has no single point of failure as it has no central control and all the Storage Systems are equal peers. A cluster is assembled dynamically as Storage Systems attempt to discover their peers over the network. No Storage System has inherently more information than its peers have. For example, no Storage System manages the Virtual File System of the cluster as it is assembled through peer-to-peer communication. Thus, when an application process wants to retrieve the contents of a file stored on the cluster, the protocol is to multicast a request to the entire cluster and let the cluster resolve any issues, such as how is the file striped, which peers are supposed to have a stripe, which peers are missing and how to repair any missing stripes.

Embodiments of the present invention maximize the encoding network bandwidth usage through the use of UDP/IP multicasting. All communication packets between Storage Systems that contain codeword segments are multicast across the cluster. The cluster size has therefore no impact on performance as the entire cluster receives a multicast UDP/IP packet whether there are ten Storage Systems in the cluster or whether there are ten thousand Storage Systems in the cluster. Thus, when a file is transmitted to the cluster for storage, it will be transmitted once only regardless of the size of the cluster. For example, a one-gigabyte file striped over a ten Storage System cluster will result in each Storage System receiving the entire file but encoding and storing only one tenth of the file (one hundred megabytes).

Embodiments of the present invention maximize decoding performance by leveraging UDP/IP multicasting to give all Storage Systems an equal opportunity to perform computations. When a codeword is retrieved from a cluster, each available Storage System multicasts its segment of the codeword thus, making it available to the entire cluster. When some Storage Systems are (or become) unavailable, all the available peers are able to aggregate the transmitted codeword segments and therefore have sufficient data to decode the missing segments. Note that, during the retrieval of content, no checksum segments from unavailable Storage Systems are decoded, as these do not contribute to the retrieval of the original content. The actual decoding computation is performed on a rotational pattern based upon a formula or method that includes the available peers and the missing peers. For example, if one of the ten Storage Systems in the previous encoding example were unavailable, the computation of its missing one hundred megabytes would result in each of the nine remaining available Storage Systems computing one ninth of one hundred megabytes.

Embodiments of the present invention maximize the healing performance by leveraging UDP/IP multicast to give all the available Storage Systems, including the empty replacement systems, an equal opportunity to heal the content by computing missing segments. Note that during the healing of content checksum segments from unavailable Storage Systems are recomputed, as these are required for the recovery of the lost Storage Systems. When permanently unavailable members of a cluster are replaced with new Storage Systems, the latter have no content initially. The replacement Storage Systems proceed to heal the cluster by recreating the content that was on the Storage Systems they are replacing. The computation of missing segments is performed by decoding codewords in a manner similar to the retrieval of the content. However, when healing, even the replacement Storage Systems participate in the computation. They are able to aggregate the codeword segments that are multicast by the available Storage Systems in the cluster and participate on an equal basis in the rotational computation pattern. For example, if one of the ten Storage Systems in the previous encoding example was healed, the computation of its missing one hundred megabytes would result in each of the nine remaining available Storage Systems and the replacement Storage System computing one tenth of one hundred megabytes.

The High Performance Algorithm for Encoding:

The High Performance Encoder Implementation (HPEI) is a derivative of the Reed-Solomon algorithm. The HPEI modifies the premise of the Generic Reed-Solomon Encoder Implementation that any checksum symbol within a codeword can be used to recover any input symbol. Such checksum symbols are referred to as Unrestricted Checksum Symbols (UCS) in embodiments of the present invention. The new premise is that any checksum symbol within a codeword can replace any input symbol of the same order. Such checksum symbols are referred to as Restricted Checksum Symbols (RCS) in embodiments of the present invention. Each segment within a codeword is an ordered set of symbols and all segments are of the same size by construction.

In the HPEI, codeword CW(i,j,k) is defined as the ordered set of i segments of j symbols where k segments contain only checksum symbols and l=i−k segments contain only input symbols.

The performance benefits stem from the far lesser computation required for computing these Restricted Checksum Symbols versus Unrestricted Checksum Symbols. RCS are sufficient for error recovery because all Storage Systems store segments of equal size that consist exclusively of checksum symbols or input symbols based upon a codeword rotation. Thus, the recovery from the loss of an input symbol segment (Storage System) is performed using a checksum symbol segment of equal size and therefore containing sufficient symbols in the corresponding order. Any fragmentation of the checksum symbols over the cluster would be inadequate, as there would always be some failure combinations for which no checksum segment could be assembled with symbols in the right order.

Figure 12A:
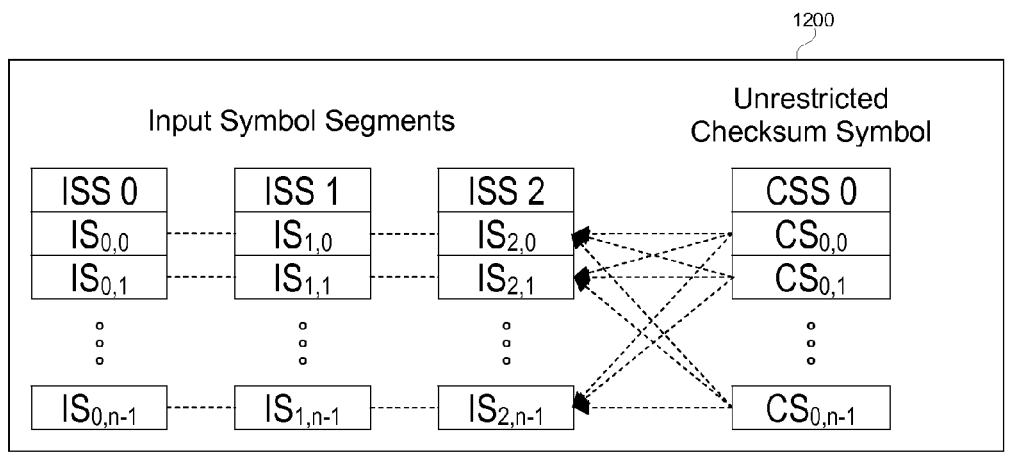
FIG. 12A depicts the potential interactions of unrestricted checksum symbols with the input symbols of a codeword.

To produce an Unrestricted Checksum Symbol, the computation must be applied to all the input symbols in the codeword (see FIG. 12A). To produce a Restricted Checksum Symbol, the computation must be applied to all the input symbols of the same order in the codeword (see FIG. 12B). For example, at 40 percent FEC, a codeword containing 3 segments of 51 input symbols each must generate 2 segments of 51 checksum symbols each. To generate one segment of UCS requires 3*51*51=7803 operations. To generate one segment of RCS requires only 3*51=153 operations. This represents a 98 percent decrease in computation.

As part of their enlistment into a cluster, the Storage Systems are assigned a unique sequence number. This number is used in the identification of segments within a codeword for encoding and decoding. For all segments there is a fixed one to one mapping of the segment number and the Storage System number.

In one embodiment of the present invention, to compute a restricted checksum symbol segment CSS, a unique index ix into table GFILog 602 is computed for each input symbol segment. The index must be unique across all the checksum symbol segments of each codeword. The entries into table GFILog 602 corresponding to each index are used to encode a checksum symbol segment.

Figure 12B:
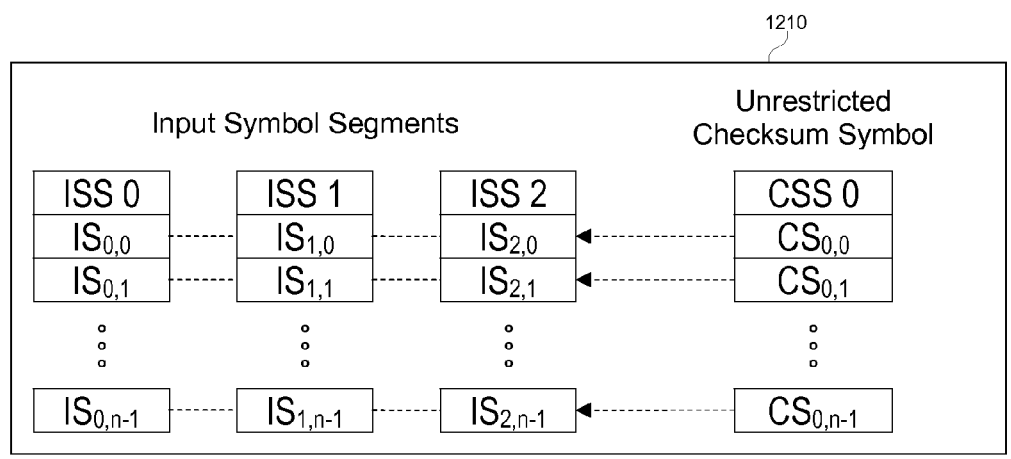
FIG. 12B depicts the potential interactions of restricted checksum symbols with the input symbols of a codeword.

Referring to FIG. 12B, we start by setting every symbol slot in the checksum symbol segment CSS0 to 0. Then a unique value for ix is computed for segment ISS0; each input symbol $IS_{0,x}$ (x=0, . . . , n−1) is multiplied over the Galois Field GF by ix; the resulting value is made into the corresponding checksum $CS_{0,x}$ by XORing it with the previous value of $CS_{0,x}$. The process repeats for the remaining input symbol segments ISS1 and ISS2, each with a new value for ix. Thus, a sequence of ix index values is created forming an encoding vector with one element per input symbol segment.

The High Performance Algorithm for Decoding:

The computation associated with decoding to retrieve the original content is necessary only when some input symbol segments of a codeword are unavailable. No decoding is necessary to retrieve the original content of a codeword when no segments are missing, or only checksum symbol segments are missing.

In one embodiment of the present invention, to repair one or more Restricted Input Symbol segments in a codeword CW, a l×l decoding matrix X is produced reflecting the missing input symbol segments. The decoding matrix X is the identity matrix 300 in rows that correspond to input symbols and a decoding vector in rows that correspond to erasures. The decoding vector for an erasure input symbol segment ISSn is constructed as a sequence of unique ix index values into table GFILog 602 corresponding to each input symbol segment.

Figure 8A:
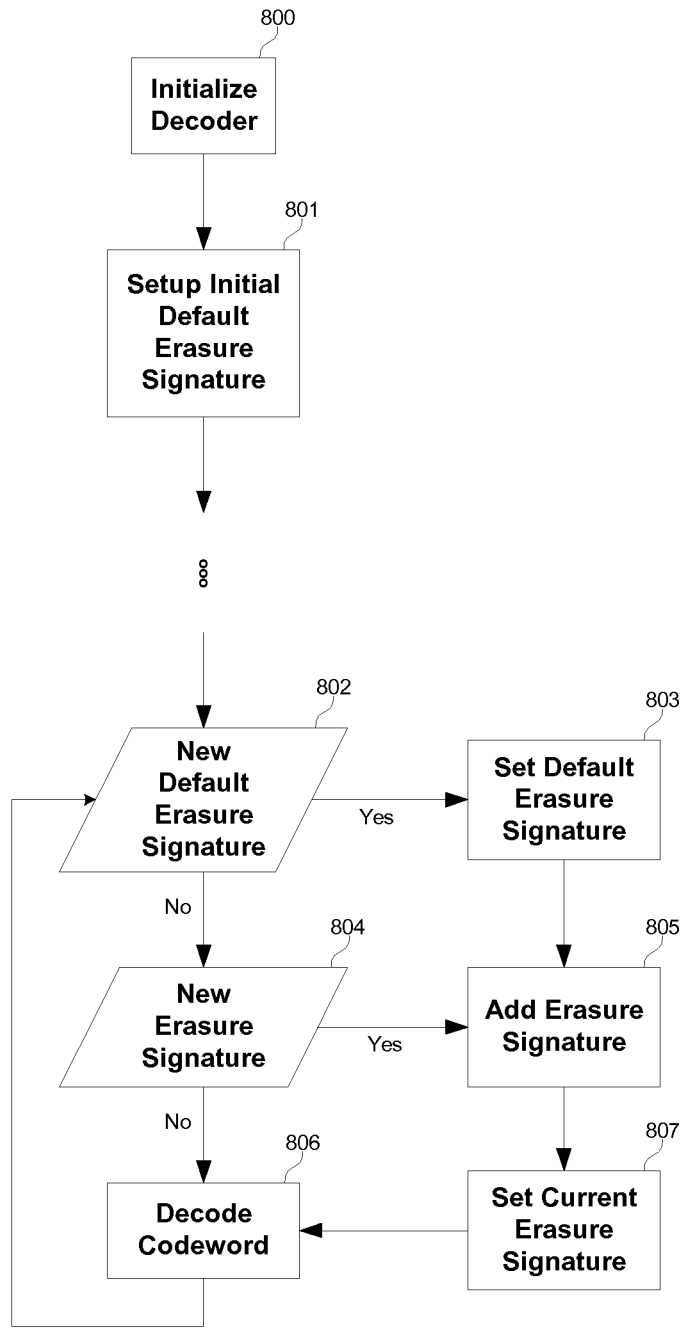
FIG. 8A depicts a flowchart of the management process of the Erasure Signatures of the High Performance Algorithm for Decoding.
Figure 8B:
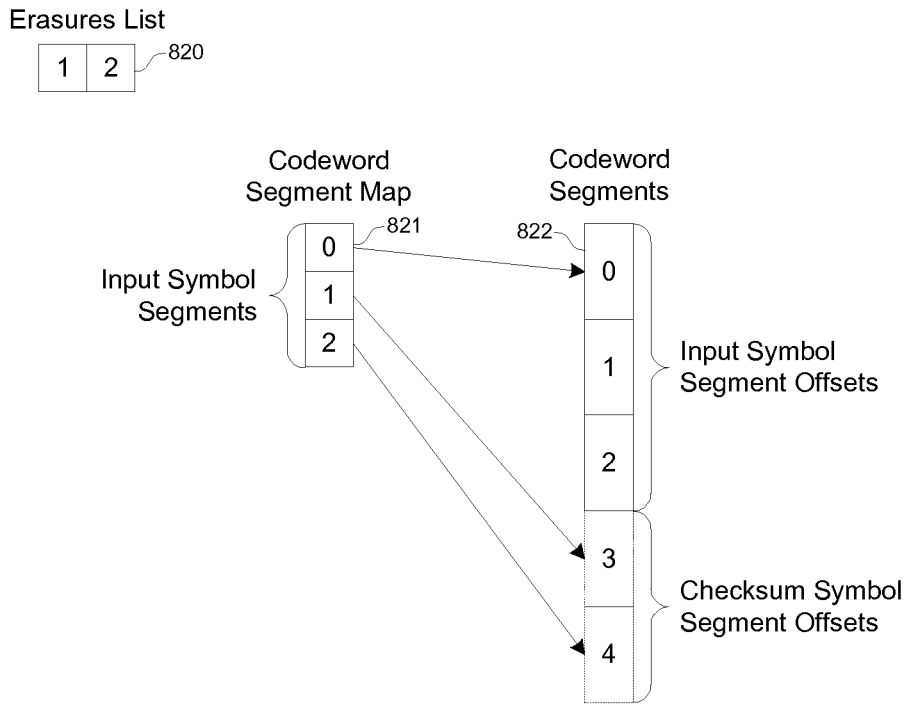
FIG. 8B is a diagram illustrating an example of the construction of a Codeword Segment Map based upon an erasures list.
Figure 8C:
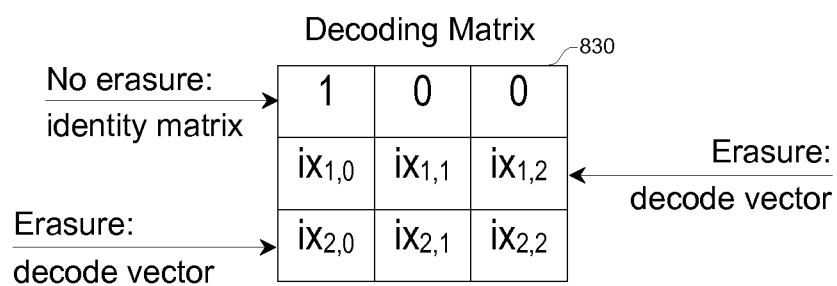
FIG. 8C is a diagram illustrating an example of the Erasure Signature decoding matrix computation.

FIGS. 8B and 8C show an example of the construction of a decoding matrix. In this example, codeword 822 consisting of 3 input symbol segments 821 (0, 1, 2) and 2 checksum symbol segments (3, 4) has incurred erasures described in erasure list 820 of input segments 1 and 2. In FIG. 8C, decoding matrix 830 has the vectors necessary to recompute input symbol segments 1 and 2. Input segment 0 is not an erasure and therefore is represented as its corresponding identity matrix vector. Input segments 1 and 2 are erasures and therefore are represented by two decoding vectors corresponding to checksum symbol segments 3 and 4.

Erasure Signatures:

A time-consuming computation is the construction of the decoding matrix X that corresponds to a given erasure pattern. Specifically the process of inversion of the X matrix is a time-consuming task. This task is especially wasteful when the erasures follow a repetitive pattern such as when some members of the cluster of Storage Systems are congested or otherwise unavailable. Erasures are more likely to occur the larger the cluster as it is difficult to ensure that a cluster consisting of thousands of Storage Systems is always functioning at 100 percent.

An Erasure Signature (ES) is a description of the missing symbol segment pattern for a codeword along with the necessary data structures to repair any codeword with this segment erasure pattern. It is generated if a sufficient combination of input and checksum symbol segments necessary to reconstruct the missing input symbol segments is received. In other words, an ES is only generated when the decoder is able to correct the codewords. An ES includes the list of erasures, a Codeword Segment Map (CSM) and the corresponding l×l decoding matrix X. The list of erasures simply contains the list of segment numbers (Storage Systems) that are erasures. The list is constructed from the list of Storage Systems from which packets were not received. The CSM is an ordered list of available segments in any codeword that matches the missing symbol segment pattern. Each entry in the list has an offset to the start of a symbol segment into the codeword. This list eliminates the need to copy the segments of codewords for contiguity in order to perform the matrix multiplications necessary for decoding.

When an Erasure Signature is created, its decoding matrix is retained so that subsequent use of the ES does not entail the generation of a new decoding matrix. A default ES is created as part of the initial negotiation process with the cluster of Storage Systems that reflects the missing Storage Systems known at the onset.

FIG. 8B shows an example of the computation of a Codeword Segment Map for an ES pattern. In this example, codeword 822 has 3 input symbol segments and 2 checksum symbol segments. Erasures of input segments 1 and 2 were detected as illustrated in erasure list 820. Codeword Segment Map 821 has the offsets to the three segments necessary to reconstruct the three input segments. Input segment 0 is not an erasure and therefore retains it own corresponding offset. Input segments 1 and 2 are erasures and now correspond to checksum symbol segments 4 and 4 respectively.

Erasure Signatures are possible within a cluster as the combination of erasures is limited by the size of the cluster and each erasure (e.g., packet missed from a Storage System) represents a segment of a codeword, not just a single symbol. Additionally, erasures within a cluster are likely to follow patterns. Once a Storage System is down, it is likely to remain down for the duration of the retrieval of the content and its absence is denoted in the default ES. Similarly, when a Storage System is congested for any reason (e.g., its load, its network, etc.) it is likely to remain so over many packets and its absence is denoted in a corresponding ES that is derived from the default ES.

In one embodiment, decoding engine 126 operates as follows and as shown in the flowchart of FIG. 8A with the corresponding steps of FIG. 8A indicated parenthetically in the description of the process. First in the decode initialization (800), Galois table 600 is initialized for the symbol width configured. Upon completion of the initial negotiating process, the system sets up the initial default ES (801). When the system determines that one or more of the Storage Systems in the cluster are unavailable and can no longer participate in the retrieval, it sets a new default ES (803) which adds a new ES (805) and sets it as the current ES (807). When the system receives a new codeword, it determines whether the new codeword's erasures are different from the default ES pattern and if so notifies the decoder of the new pattern (804). The decoder compares the new pattern with the other patterns previously established and if no match was found, creates a new ES (805) and sets it as the current ES (807). When the codeword received matches a known erasure signature, its erasure input symbol segment(s) are decoded (806). The addition of a new ES (805) is a time-consuming process that includes the inversion of the decode matrix X. This step is to be avoided if possible, so retaining old Erasure Signatures for re-use as new ones are created is a key step for decoding efficiency.

Arbitrarily Large Codewords:

A performance advantage of Restricted Checksum Symbols is that the symbol count within a codeword can exceed size of the universe of symbols corresponding to the width of the symbols. When using UCS, the count of symbols per codeword is limited to $2^w-1$ where w is the width of the symbols. Thus, when using 8-bit wide UCS, it is not possible to exceed $2^8-1=255$ symbols per codeword. When using 8-bit wide RCS, there is not limit to the number of symbols per codeword. Large codewords improve performance in two respects. First, the encoding and decoding computation is faster as the overhead of setting up for the computation is diminished in relation to the data size. The setup overhead includes function calls, variable initializations, etc. Rather than setting up for every (small) 255-symbol codeword, the codec can setup for much larger codewords. Second, the disk and network I/O is improved as more data is processed per I/O transaction resulting in less kernel access contention, more efficient usage of the hardware and greater throughput.

The Rotational Load Balancing Implementation:

Embodiments of the present invention maximize the performance of the encoding and decoding computation by evenly distributing the workload throughout the entire cluster using a Rotational Algorithm. The algorithm produces a Rotational Look Up Table (RLUT) that distributes the codec workload evenly across a cycle of codeword encoding/decoding patterns. The algorithm takes as configuration parameters the count of Storage Systems actively participating in the transaction, and the count of checksum segments per codeword. The latter count corresponds to the maximum number of recoverable Storage System failures when storing data or the actual number of failed Storage Systems when retrieving data. When storing data, the RLUT is used by the Storage Systems to determine for a given codeword number whether to encode and store a checksum segment or just store an input symbol segment. When retrieving data, the RLUT is used by the Storage Systems to determine for a given codeword number whether to decode an erasure segment. Each entry in the RLUT marked E indicates a checksum symbol segment. Each checksum symbol segment E is unique as each is computed with a unique index derived from the Storage System's unique identification. Each entry in the table marked with a number indicates a specific input symbol segment.

The algorithm for the construction of the RLUT computes all the codeword patterns in the cycle. Starting with the first Storage System in the first codeword pattern, it assigns as many codec tasks as there are checksum segments. The remaining Storage Systems are assigned input symbol storage tasks through the specific designation of an input symbol segment. The rotation continues until all codeword patterns are described. There is a secondary rotation possible within the individual codeword patterns when checksum segments reach the last Storage System and must wrap to the first Storage System.

To determine how each Storage System will process a given codeword we must first identify the codeword's corresponding RLUT pattern. As codewords are stored (encoded) they are implicitly assigned a unique number that reflects their sequential position from the start of the file. The codeword pattern x corresponding to codeword number y in an RLUT of size z is computed using modulus arithmetic as $$x = y \bmod z$$

Given a Storage System's unique sequence number n within the cluster and codeword pattern x, we can easily determine the corresponding action t as $$t = \mathrm{RLUT}(n,x)$$

FIG. 11A depicts a sample RLUT (1100) of a cluster consisting of set of seven Storage Systems denoted as rows {peer 0, ..., peer 6} and configured for (up to) three Storage System failures. Four segments per codeword are input segment and three segments are checksum segments. Each entry in the RLUT marked E indicates a checksum symbol segment. Each entry in the table marked with a number indicates a specific input symbol segment.

FIG. 11B depicts a twelve-segment Rotational Distribution Look Up Table sorted by peers (Storage Systems). Seven segments per codeword are input segment and five segments are checksum segments. In this example, each codeword will be divided into seven segments of equal size; four input symbol segments and three checksum symbol segments. The RLUT cycle has a set of seven codeword patterns denoted as columns {CW 0, ..., CW 6}. The RLUT demonstrates that the codec workload is balanced over a complete rotational cycle. As an example of the usage of the RLUT, consider codeword number 500 in an encoding or decoding sequence:
Codeword 500 corresponds to cycle CW 3
Codeword 500 is encoded by Storage Systems peer 2, peer 3 and peer 4
Codeword 500 is stored by Storage Systems peer 0, peer 1, peer 5 and peer 6
Peer 0 is storing codeword 500 segment 0
Peer 1 is storing codeword 500 segment 1
Peer 2 is encoding codeword 500
Peer 3 is encoding codeword 500
Peer 4 is encoding codeword 500
Peer 5 is storing codeword 500 segment 2
Peer 6 is storing codeword 500 segment 3
Support for Sequential and Random Access:

The encoding process distributes the content into a sequence of codewords striped across the cluster of Storage Systems as fixed-size segments. The fixed-size nature of the segments lends itself naturally to sequential access to the content. Specifically, to retrieve some original content that was encoded, it is possible to start at the top of each of the corresponding segment files in a cluster and retrieve one segment from each file and aggregate the segments as per the Storage System sequence in the cluster. This operation can be repeated until all the content is retrieved.

Figure 13:
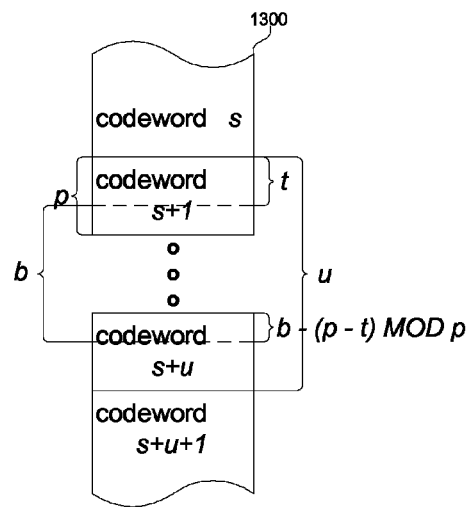
FIG. 13 depicts the major components of random access codeword computation.

Random read and write access into the content is also possible due to the fixed-size nature of the segments. Given a location within the original content and a number of bytes to read or write, it is a simple matter to compute the corresponding codeword number and thereby the location of the codeword's segments (see FIG. 13). The location within the original content is specified as a byte offset o from the start of the content and b is the byte count to read or write. Remember that in the HPEI, codeword CW(i,j,k) is defined as the ordered set of i segments of j symbols where k segments contain only checksum symbols and l=i−k segments contain only input symbols. We define q to be the width of the symbols in bytes. We compute the payload p of a codeword as the number of input symbol bytes available $$p=l*q$$

We can now compute s as the number of codewords to skip to get to the codeword that contains the start of location o.

$$s=o/p$$

We can now compute t as the byte offset into the codeword that contains the start of location o.

$$t=o \bmod p$$

Depending upon the byte count b, a sequence u of one or more codewords may be spanned with the payload of the first codeword only partially spanned towards its end and the payload of the last codeword only partially spanned towards its start. We compute u as $$u=(b+p-1)/p$$

The first codeword provides the last p−t bytes of its payload. The last codeword provides the first b−(p−t)MOD p bytes of its payload.

Pseudo Device Driver:

A Pseudo Device Driver (PDD) is the gateway to the cluster of Storage Systems for most applications. The PDD is a real kernel-resident driver that supports all the operating system's driver entry points (e.g., in UNIX/Linux these include open, close, read, write and ioctl). The term pseudo is used to indicate that the device driver does not directly control any hardware. The PDD controls one or more pseudo devices that look to all applications as individual disk drives. Each pseudo device is the logical representation of a cluster of Storage Systems. It is also possible to segment the storage capacity of each cluster member at the partition or physical level. In such cases multiple pseudo devices can correspond to various partitions of a single cluster of Storage Systems.

Figure 1B:
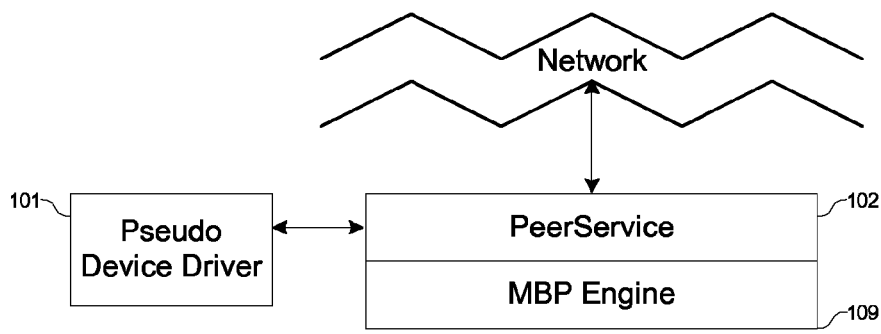
FIG. 1B depicts a block diagram of the major components of a PeerService Process including a PDD and an MBP Engine.
Figure 1C:
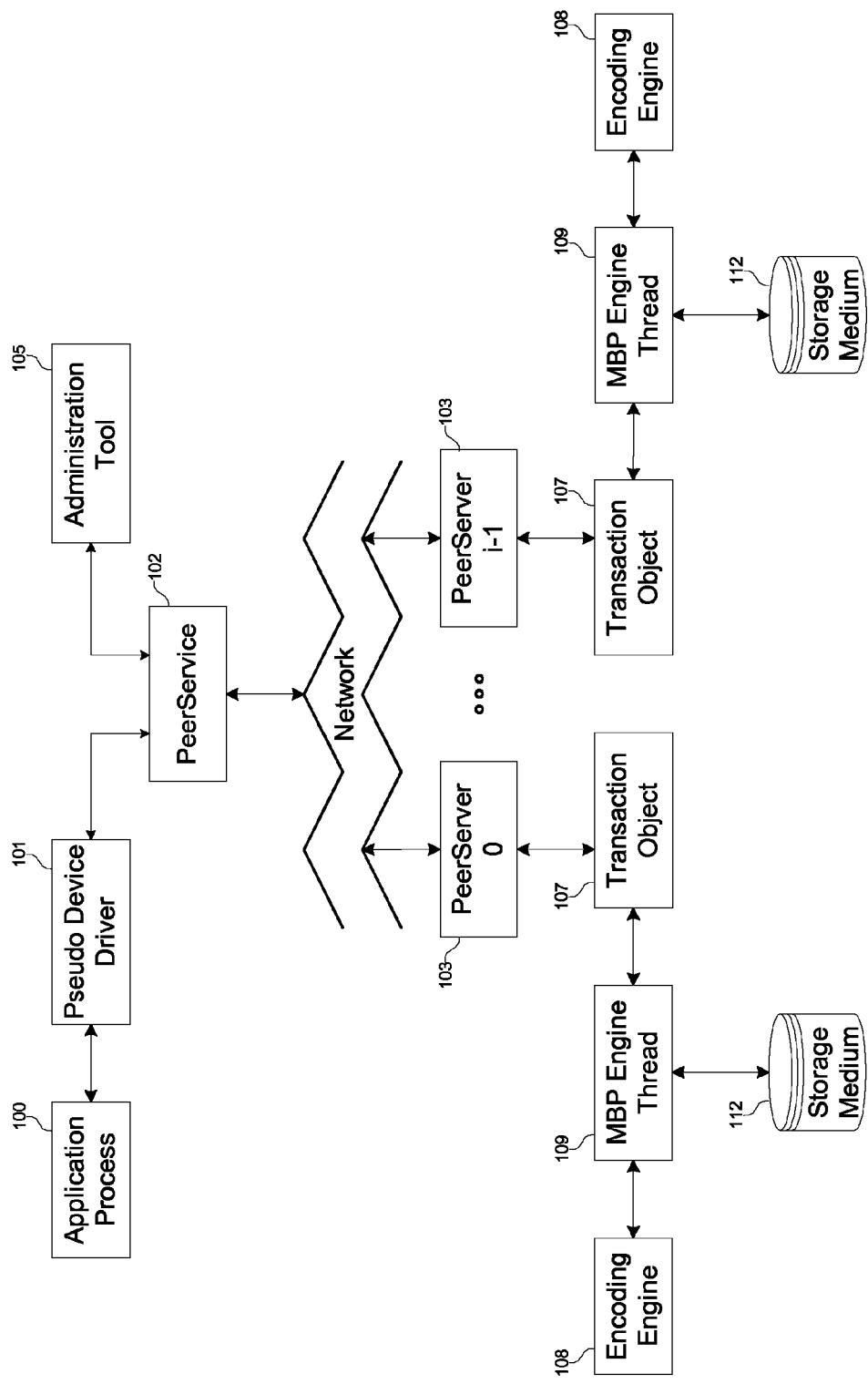
FIG. 1C depicts a block diagram of the content staging system.
Figure 1D:
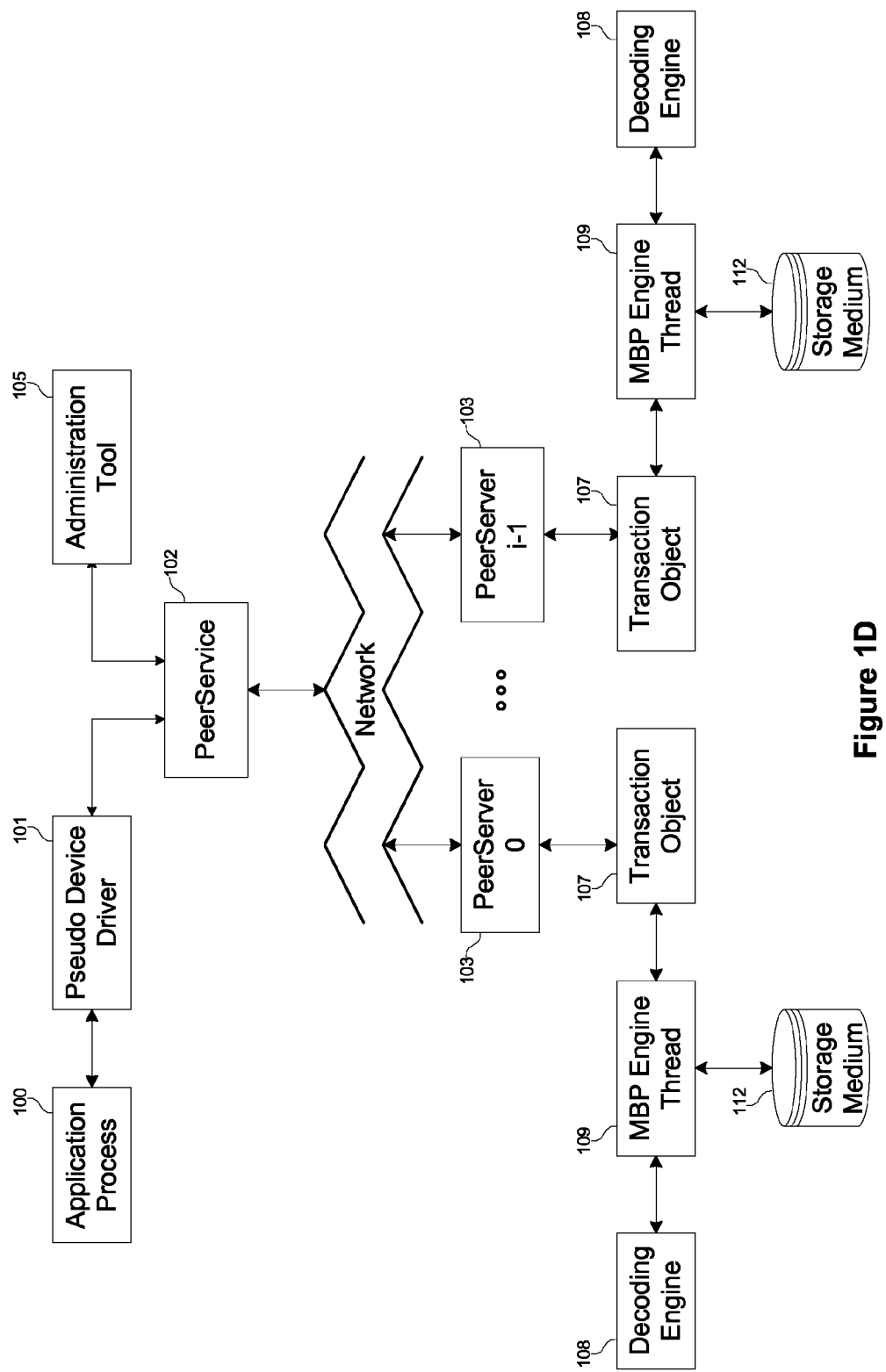
FIG. 1D depicts a block diagram of the content retrieval system.
Figure 14A:
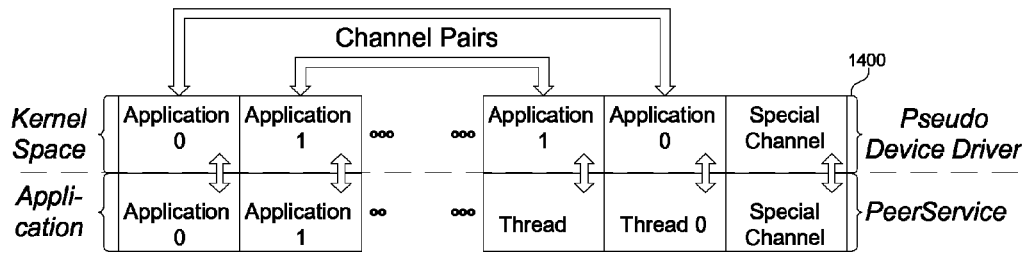
FIG. 14A depicts communication channels of the Pseudo Device Driver with a PeerService Process.
Figure 14B:
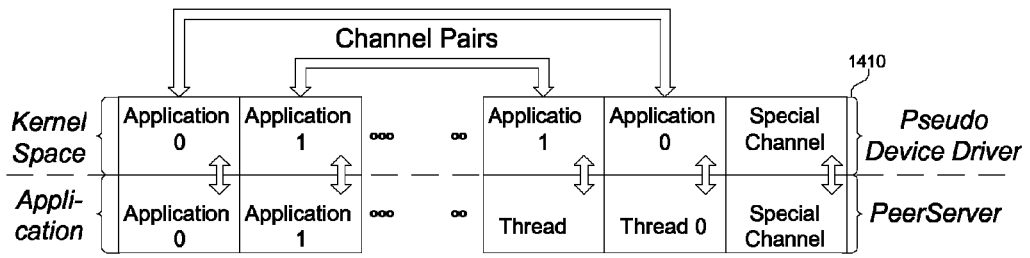
FIG. 14B depicts communication channels of the Pseudo Device Driver with a PeerServer Process.

Communication across a cluster of Storage Systems occurs in UDP/IP. This is a higher-level protocol that is not available to the PDD as it runs in kernel mode. The PeerService server process (see FIG. 1B) is a communication bridge between the PDD and the cluster of Storage Systems. Client applications open connections to the PDD and issue I/O calls which are forwarded by the PDD to the PeerService server process that in turn multicasts them to the cluster of Storage Systems. The sequence of events is as follows (see FIGS. 14A and 14B):

A. The PDD is installed on a computer and its corresponding devices created (e.g., "z:" under Windows and "/dev/pf0" under Unix/Linux).
 B. At boot time the operating system loads the device driver.
 C. Subsequently the various server processes (daemons under Unix/Linux and Services under Windows) including the PeerService are started.
 D. Upon starting the PeerService opens a special channel to the PDD and identifies itself.
 E. Some application opens a file on the PDD for reading, writing or both. This opens a channel to the PPD.
 F. The PDD forwards the request to the PeerService via the special communication channel and passes a unique session identifier.
 G. The PeerService initiates a transaction that negotiates with the cluster to enlist sufficient Storage Systems to support the command.
 H. Upon the successful completion of the negotiations, a new computation thread is created that is dedicated to this application.
 I. The thread opens a new dedicated channel to the PDD for the unique session identifier it received.
 J. Any I/O received by the PDD from either the PeerService or the application is forwarded via their channels without leaving the kernel. The two channels form a channel pair that is managed by the PDD. Thus, data written at either end of the channel pair is copied into the kernel memory of the PDD by the operating system and the PDD copies it to the buffer of the other end of the channel pair.

The PDD supports an I/O control interface via the ioctl system call. Most file oriented ioctl get/set commands are supported subject to the limits of the underlying operating system. The ioctl command to seek to a different position in the file is supported. The implementation of the seek command on a striped/encoded file is somewhat involved. The PDD is only a pass through and the actual implementation is described as part of the PeerService and PeerServer.

Virtual File System:

A file system is the software component of an operating system that manages the organization of data on its storage devices. A file system allocates space on storage devices to store file contents. A file system creates a hierarchy of directories to facilitate cataloging of the files. Directories are files whose contents are managed by the file system. The syntax of directory paths and representation of storage devices are operating system specific. Typical file systems view each logical storage device as a self-contained repository with a single root directory. From the file system aspect, files do not logically span storage devices. Even when the hardware supports this functionality, such as is the case with RAID, the RAID controller shields the file system by behaving as a single storage device. A file entry within a directory describes, among other data, the sequence of storage device blocks that make up the file.

Access to data on remote file systems is achieved via a network through a Virtual File System (VFS). A VFS does not manage file a directories directly. A VFS communicates with its file system for local file path transactions and with a remote VFS for remote file path transactions. Several VFS are presently available including NFS and CIFS.

Embodiments of the present invention define a true VFS in which files are not wholly contained within a single storage device or operating system or file system. The VFS distributes (stripes) the contents of a file across a cluster of Storage Systems (e.g., storage devices, operating systems and file systems). There is no single point of control for such a VFS, as access to its contents requires the collaboration of a cluster of Storage Systems (subject to the FEC parameters). The advantages of load balancing in this system are described below.

One advantage is the improvement in storage device I/O performance. A historical bottleneck has been the growing divergence between the capacity of storage devices and their ability to transfer data in and out. The present invention solves this problem by reducing the I/O load of each Storage System through the striping of data across a cluster of Storage Systems.

Another advantage is the balancing of storage capacity utilization across the cluster. With the present file systems, it is common for one storage device to be filled to capacity thereby causing the failure of applications. The disruptions occur even though another storage device with large available capacity is available within the same file system because file systems require files to be localized within a single storage device. Disruptions also occur even though storage capacity is available through the VFS because of difficulties in dividing large sets of files that are logically related. Therefore a lot of capacity available on storage devices is unused, as it may be too complex to use efficiently. Embodiments of the present invention maximize the storage capacity utilization by spanning multiple storage devices, which also decreases the storage utilization of any single storage device.

Peer-to-Peer Communication Through the Multicast Burst Protocol:

Embodiments of the present invention rely upon the IP protocol to ensure packets successfully transmitted are free of corruption. As UDP/IP is used, some packets of some systems may be lost in transmission, duplicated or transmitted out of order. These are detected through the system's communication protocol, as are the packets that are never transmitted due to the complete unavailability of some Storage Systems. Every UDP/IP packet encapsulates potentially a plurality of codeword segments that have a corresponding logical position within the original content. Because UDP/IP enforces packet boundaries, a packet loss represents erasures on segment boundaries, which facilitates its identification and recovery. Upon determining that a packet was lost, the system can determine the corresponding codeword segments and mark these segments as erasures for recovery. A packet loss can be pre-determined as the initial peer-to-peer negotiation protocol discovers that some Storage Systems are unavailable and therefore all their packets are lost. A packet loss can also be dynamically determined through a variety of means during data transmission such as time-outs, NACKS and protocol requests.

TCP/IP requires a dedicated socket for every point-to-point connection. Sockets are a limited resource of the operating system and a large cluster would require many point-to-point connections. Thus, with TCP/IP the operating system may run out of sockets thereby introducing a potential single point of failure into the system. Through the use of UDP/IP embodiments of the present invention are able to limit the consumption of sockets to one per Storage System per session. These properties make the UDP/IP network a well-suited erasure channel for the FEC coding method.

The limitations of the UDP/IP protocol result in the necessity to manage the flow of packets to ensure that:

The packets are received by their intended recipients
Any redundant packets are ignored
Any out-of sequence and missing packets are properly processed The Multicast Burst Protocol (MBP) ensures the reliability and performance of the Storage System cluster communication.

To ensure that their intended recipients receive the data packets requires some form of acknowledgement from the recipients. The overhead of transmitting an ACK packet for every data packet by every recipient would have a disastrous impact on performance proportional to the size of the Storage System cluster. Each data packet would require an ACK packet from every Storage System in the cluster. Thus, many more ACK packets would be transmitted than data packets. Furthermore, all things being equal ACK packets have the same likelihood of getting lost as data packets.

As part of the session initialization, the MBP enlarges the size of the socket kernel buffer to that configured for the cluster. The MBP is then able to transmit clusters of packets in multicast bursts up to the size of the socket kernel buffer while minimizing packet loss due to UDP/IP. The MBP also wraps each packet into its own MBP packet header describing the burst number, the packet number within the burst, the packet count of the burst, the MBP command, the source Storage System and the destination Storage System(s). Thus, each MBP packet is self-described, allowing duplicate packets to be ignored and out of sequence packets to be buffered.

The recipients detect the end of an MBP packet burst when all the expected packets are received at which point they transmit an ACK packet to the burst transmitter. At the end of the MBP burst, the transmitter collects the ACK packets from all the recipients. When some ACK packets are missing, either because of UDP/IP artifacts or because some of the intended recipients are missing some burst packets, the transmitter issues a NOOP packet. The NOOP packet triggers any recipient still waiting for packets to reply with a NACK packet that lists all of its missing packet numbers. The transmitter collates all the missing packet numbers from all the NACK packets and merges them into a single list. The packets in this list are transmitted in a new multicast burst, thereby ensuring that no extra network bandwidth is used for duplicate packet losses between Storage Systems. The process repeats until the all the ACK packets are received.

The data packets transmitted in a single burst can range from tens to hundreds or even thousands based upon the configuration of the Storage System cluster size and the socket kernel buffer size. This communication system is very efficient as ACK packets are transmitted per burst and NACK packets describe all the missing data packets for the current burst.

Each MBP session creates a multicast group with a default, pre-configured or specific multicast address and unique ephemeral port number that is the result of negotiation between the Storage Systems.

Deriving the Cluster of Storage Systems Dynamically:

A request to stage content can specify the FEC coverage desired in terms of an absolute Storage System count of a percentage of the cluster eventually assembled. It can specify the exact list of Storage Systems to use as the storage cluster. Most of the time such a list imposes unnecessary constraints on the system as it removes its ability to balance the load through its own selection of Storage Systems. A request can specify the minimum count of Storage Systems per cluster, as well as the replication count (e.g., the count of clusters). It is possible for a request to simply specify that all known Storage Systems are candidates and let the system assemble a cluster. A request can also specify pools of Storage Systems to use and pools of Storage Systems to avoid as well as additional Storage Systems to use or avoid. All parameters except for the source file path can be site-configured or defaulted and thus, do not have to be specified.

Figure 9:
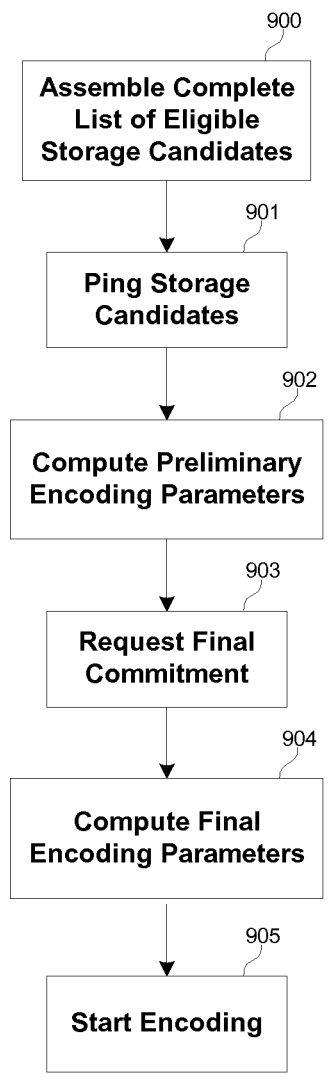
FIG. 9 depicts a flowchart of the process used to dynamically assemble a cluster of Storage Systems for staging purposes.

In one embodiment, the system assembles the cluster of Storage Systems through negotiations with the Storage Systems as depicted in FIG. 9. The system starts by sending ping commands (901) to the candidate Storage Systems to ascertain their availability. Any that do not reply to the ping protocol are eliminated from the list of candidates. The preliminary count of Storage Systems per cluster (902) is determined based upon the count of available Storage Systems and the count of replications requested. If insufficient Storage Systems are available to satisfy the FEC parameters, the transaction is aborted. The system then requests final commitment from the available Storage Systems (903). If the count of Storage Systems committing to the transaction is different, the encoding parameters are recomputed and if the new parameters are insufficient to satisfy the FEC parameters, the transaction is aborted. Once the cluster has been finalized, it is possible to compute the final parameters (904) and start encoding (905).

Figure 15A:
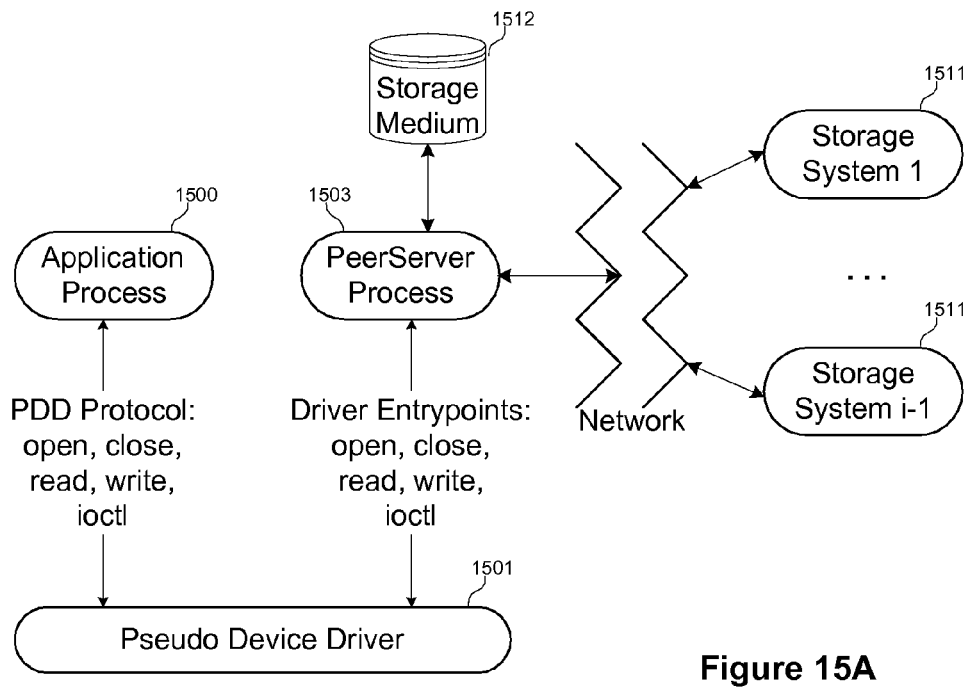
FIG. 15A depicts a block diagram according to one embodiment of the Programmatic Interface in which the client application is running on one of the Storage Systems.
Figure 15B:
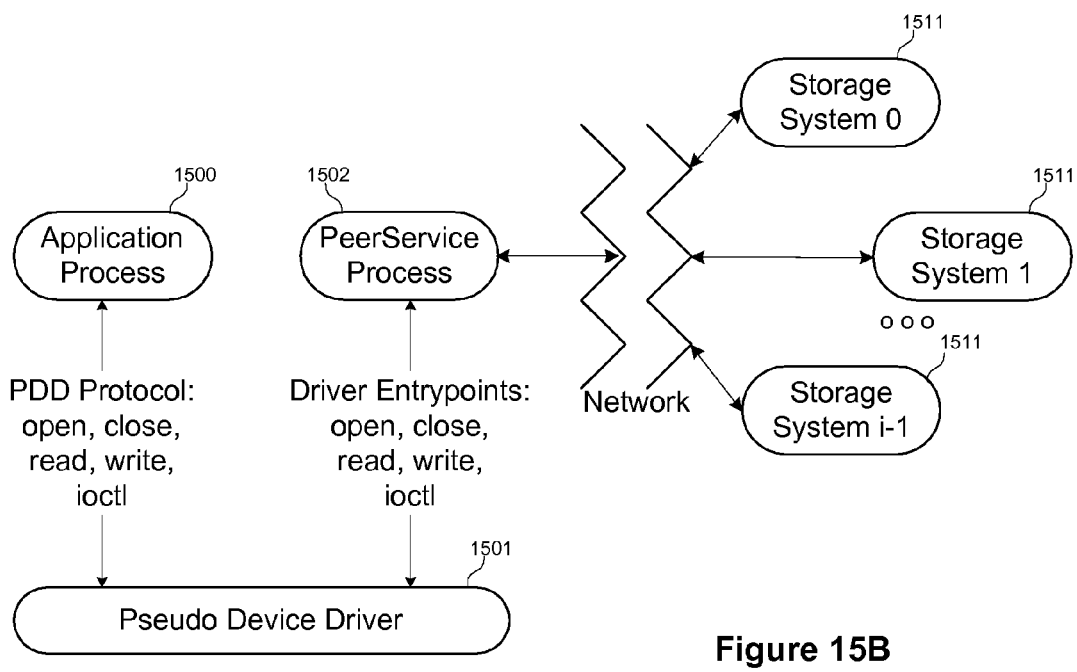
FIG. 15B depicts a block diagram according to one embodiment of the Programmatic Interface in which the client application is not running on one of the Storage Systems.

High Performance Content Staging Implementation:

In one embodiment, (see FIG. 15B), for content to be staged onto a cluster of Storage Systems, Application Process 100 must specify a file path that includes a device controlled through the Pseudo Device Driver 101. If the Application Process 100 is running on one of the Storage Systems 111 (see FIG. 15A), the PDD will communicate directly with the PeerServer Process 103. If the Application Process 100 is not running on a Storage System (see FIG. 15B), the PDD 101 will communicate directly with the PeerService Process 102 and the latter will communicate via UDP/IP (multicast) with the PeerServer Processes running on the Storage Systems that correspond to the pseudo device of the file path. The PeerService Process 102, when used (see FIG. 15B), multicasts the file path along with a request for a storage session to the cluster of Storage Systems. All Storage Systems that receive the message look for the file path in their local storage medium and send back an ACK message if the file can be accessed (read/write, ownership, etc.) or a NACK message otherwise. If the PeerServer Process 103 is communicating directly with the PDD (see FIG. 15A), it will perform the access check for the file in its local storage medium and then multicast the same request as the PeerService Process 102. When all Storage Systems have replied (or timed-out) and a sufficient count of Storage Systems is available to fulfill the minimal required count as configured for FEC, either the PeerService Process 102 or the PeerServer Process 103, as appropriate, multicasts the preliminary HMF data along with a request for commitment to the storage session to the cluster of Storage Systems. The preliminary HMF data enables the participating Storage Systems to open a file using a relative path derived from the original path on the local storage medium for write access, compute the RLUT 1100, setup the default Erasure Signature and configure the MBP Engine 109. Upon successful commitment by sufficient Storage Systems, the data transfer can begin, otherwise an error is returned to the Application Process 100 via the PDD 101. The Application Process drives the data transfer as it sends data via write and ioctl commands through the PDD 101 that forwards it to the PeerService Process 102 or PeerServer Process 103. The MBP Engine 109 manages the input buffering and the encoding is driven by the RLUT 1100. When the process of staging is terminated (e.g., by the PDD issuing a close command), the PeerServer Process 103 or the PeerService Process 102 (whichever is connected to the PDD) will generate the final HMF data and transmit it to the cluster of Storage Systems so it can be prepended to their local files.

Figure 7A:
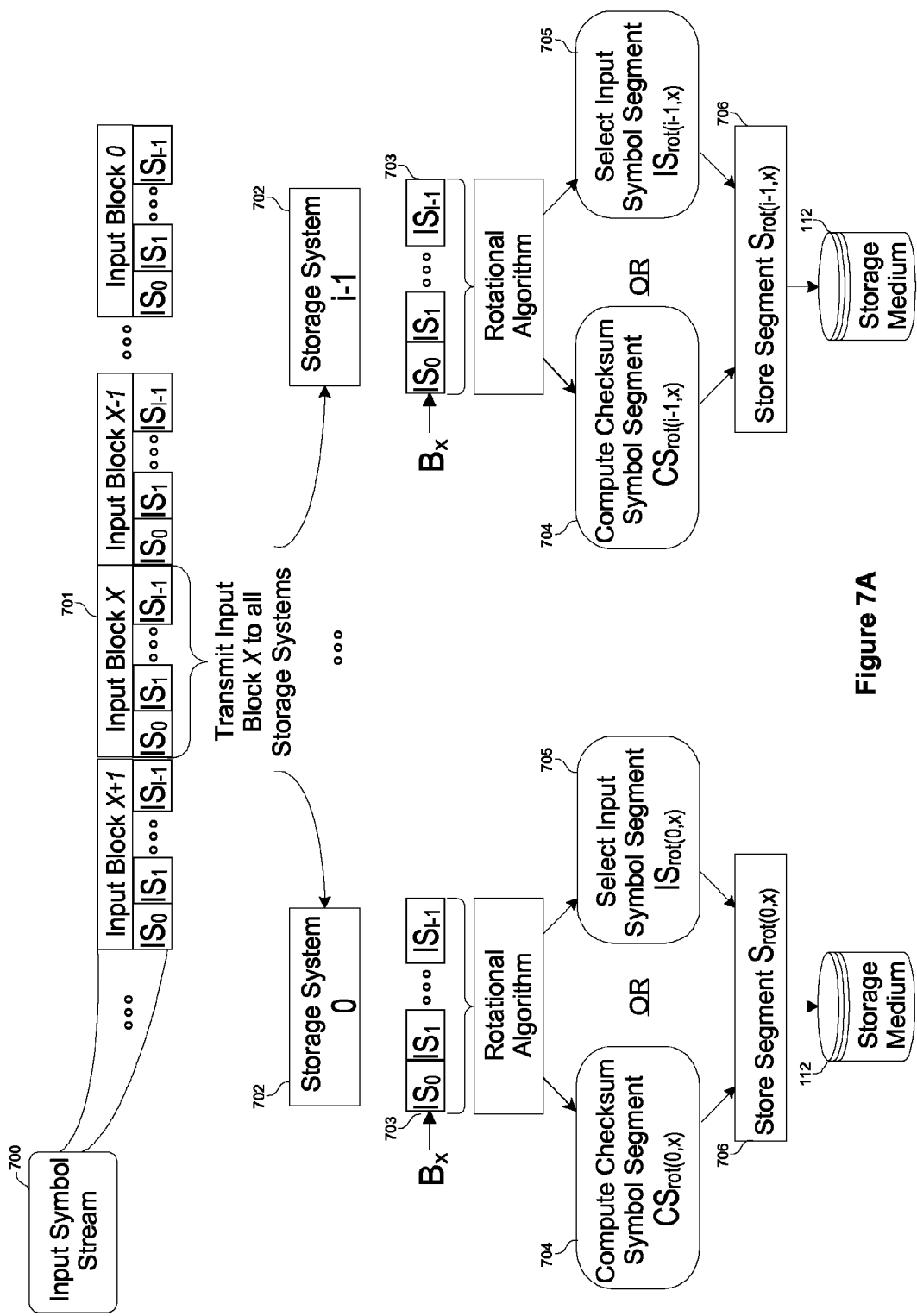
FIG. 7A depicts the High Performance Encoding System according to one embodiment of the present invention where all the Storage Systems in a cluster perform on a rotational basis the encoding computation corresponding to the FEC parameters specified.

Referring to FIG. 7A, the Input Symbol Stream 700 originating at the Pseudo Device Driver 101 produces a sequence 701 of Input Blocks of codeword payloads. In this system, the sequence of input symbols is aggregated into buffers that consist of multiple blocks of codeword payload (input symbol segments) and are transmitted to the Storage Systems via the MBP. The Storage Systems then perform on a rotational basis the encoding computation and storage of their corresponding checksum symbols segments and storage of their corresponding input symbol segments.

A codeword payload has the entire sequence of input symbol segments for one codeword. The count l of input symbol segments per block equals the count of Storage Systems in the cluster. The size of each Input Block is $l*j*w$, where j is the count of symbols per segment and w the size of each symbol in bytes. Each Input Block 701 is transmitted to each cluster of Storage System 702 via the Multicast Buffer Protocol as a UDP/IP packet. Each Storage System uses its own assigned unique sequence number y and the Input Block number $B_x$ 703 as input to the Rotational Algorithm to determine whether it should compute a checksum symbol segment 704 $CS_{rot(y,x)}$ and store it or just select one input symbol segment 705 $IS_{rot(y,x)}$. Either way a symbol segment 706 is stored on the local storage medium 112.

High Performance Content Retrieval Implementation:

In one embodiment, for content to be retrieved from a cluster of Storage Systems, Application Process 100 must specify a file path that includes a device controlled through the Pseudo Device Driver 101. If the Application Process 100 is running on one of the Storage Systems 111 (see FIG. 15A), the PDD will communicate directly with the PeerServer Process 103. If the Application Process 100 is not running on a Storage System (see FIG. 15B), the PDD 101 will communicate directly with the PeerService Process 102 and the latter will communicate via UDP/IP (multicast) with the PeerServer Processes running on the Storage Systems that correspond to the pseudo device of the file path. The PeerService Process 102, when used, multicasts the file path along with a request for the corresponding HMF data to the cluster of Storage Systems. All Storage Systems that receive the message look for the file path in their local storage medium and forward the HMF header if the file is found or a NACK message otherwise. If the PeerServer Process 103 is communicating directly with the PDD (see FIG. 15A), it will try to locate the file in its local storage medium. If the file is found, PeerServer Process 103 loads the HMF data and then multicasts a request to the cluster of Storage Systems that they confirm their readiness to provide the content of the corresponding files on their local storage mediums. When all Storage Systems have replied (or timed-out) and a sufficient count of Storage Systems is available to satisfy the minimal required count as configured for FEC, either the PeerService Process 102 or the PeerServer Process 103, as appropriate, multicasts a request for commitment to the retrieval session to the cluster of Storage Systems. This request causes the participating Storage Systems to open the file on their local storage medium for read access, compute the RLUT 1100, setup the default Erasure Signature and configure the MBP Engine 109. Upon successful commitment by sufficient Storage Systems, the data transfer can begin, otherwise an error is returned to the Application Process 100 via the PDD 101. The Application Process drives the data transfer as it requests data via read and ioctl commands through the PDD 101 that forwards it to the PeerService Process 102 or PeerServer Process 103. The MBP Engine 109 manages the input buffering and the decoding is driven by the RLUT 1100.

Figure 7B:
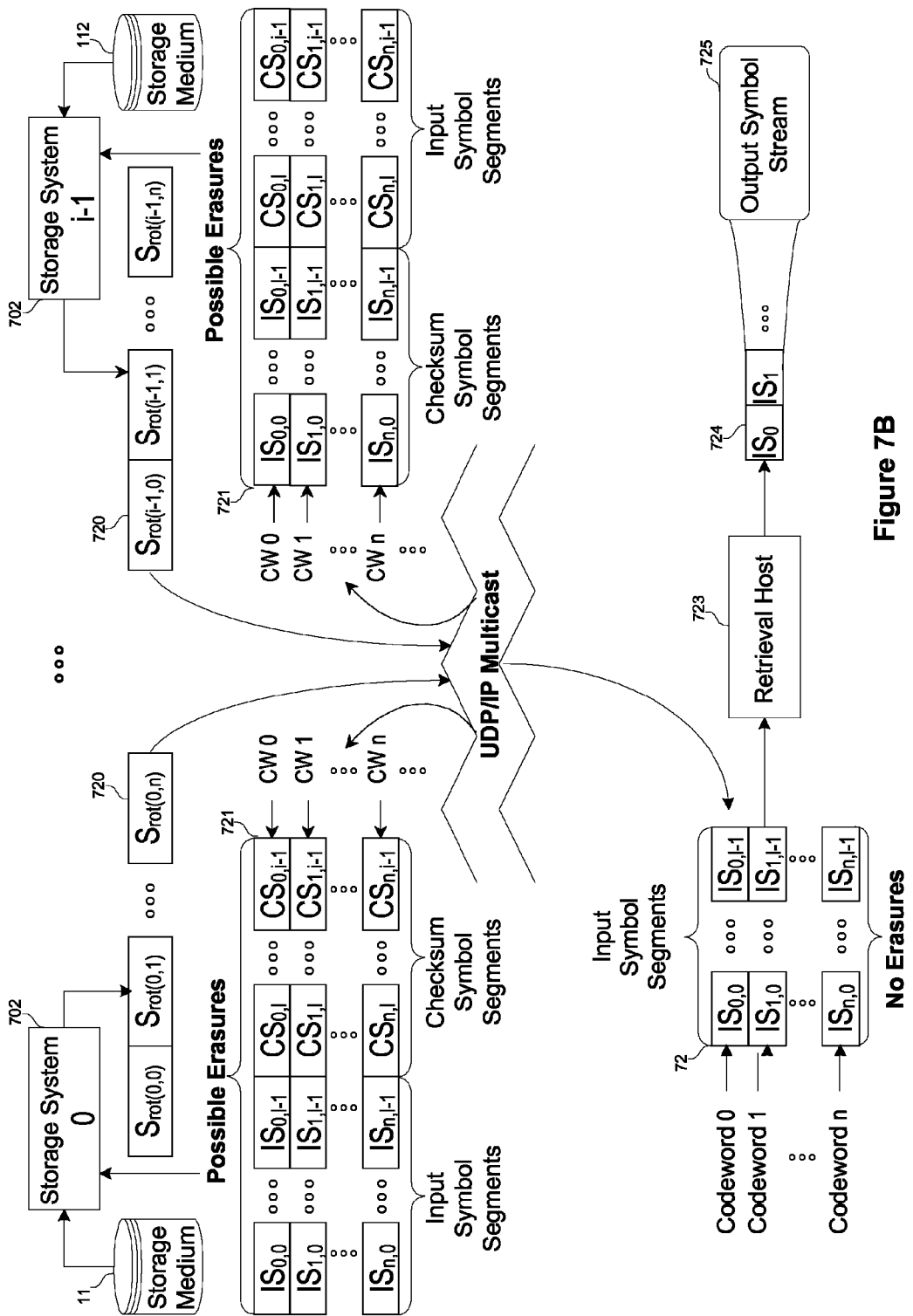
FIG. 7B depicts the High Performance Decoding System according to one embodiment of the present invention compatible with the High Performance Encoding System.

In a first embodiment of the peer-to-peer data transmission in the present invention as depicted in FIG. 7B, the content retrieval is performed on a buffered basis. The buffer has an integral number of codewords and is configured as per the latency requirements of the storage application. Each Storage System in the cluster of up to i Storage Systems 702 (depending upon availability) transmits via UDP/IP multicast an ordered sequence of symbol segment 720 to the multicast group recipients. The recipients include all the other Storage Systems in the cluster 702 and the Retrieval Host 723. Each symbol segment $S_{rot(a,b)}$ 720 aggregated by the recipients is either an input symbol segment $IS_{a,b}$ or a checksum symbol segment $CS_{a,b}$ depending upon its RLUT 1100 position computed using a and b. Where a is the Storage System number within the cluster of Storage Systems and b is the segment number within the codeword. The recipients use the symbol segments to reassemble codewords 721 in the Storage Systems and codewords 727 in the Retrieval Host. All recipients discover simultaneously any symbol segment erasures (missing packets) in codeword aggregates 721. All members of the cluster of Storage Systems recover (decode) the erasures on a rotational basis and transmit the recovered segments to the Retrieval Host 723. The Retrieval Host 723 forwards only the input symbol segments 722 ($IS_{(c,0)}$, . . . , $IS_{(c,l-1)}$), to the Output Symbol Stream 725. Where c is the codeword number in the sequence.

In a second embodiment of the peer-to-peer data transmission in the present invention, network traffic is decreased so as to improve performance. The twelve-peer cluster depicted in FIG. 11B and FIG. 11C, is encoded at forty percent FEC, resulting in codewords consisting of seven input symbol segments and five checksum symbol segments. The network traffic savings achieved are described in terms of complete RLUT rotations in order to represent completely all failure combinations. Sequential content retrieval can be represented as a series of RLUT traversals. For simplicity the assumption is made that each symbol segment transmitted requires one packet, though depending upon the size of the segments, clustering of multiple segments per UDP/IP packet may be desirable. Also for simplicity, no accounting is made of UDP/IP artifacts requiring packet retransmission, though the number of such retransmission is proportional to the number of packets transmitted and therefore decreases as the network traffic decreases. In the first embodiment of the peer-to-peer data transmission, the transmission of a complete RLUT rotation requires $p=i*i$ packets as that is the number of packets required to completely transmit every segment of every codeword (i codewords in the RLUT and i segments per codeword). For the RLUT depicted in FIG. 11C, the total number of packets is $p=144$. In this second embodiment, operating on a buffered basis, each available Storage System in the cluster transmits via UDP/IP a sequence of input symbol segments. No additional transmission is necessary when there are no erasures as is the case the vast majority of the time. This nominal condition requires $p=i*l$ packets, where the number of input symbol segments $l=7$ and therefore, $p=84$ for a savings of 41% in network traffic over the first embodiment. When erasures occur, the number of checksum packets required to repair each codeword varies based upon the location of the codeword in the RLUT. Specifically, the actual peers that fail is not material as the RLUT is evenly distributed across all codewords and all segments. One checksum symbol segment packet must be transmitted for each input symbol segment erasure and then the recovered input symbol segment must be transmitted in turn. Thus, the number of packets required to transmit a complete RLUT in the second embodiment is $p=i*l+2*e$ where e is the number of input symbol erasures over the entire RLUT and $e \le k < i$.

For example, referring to FIG. 11C, were Storage Systems Peer 10 and Peer 11 to fail, the remaining peers carrying checksum symbol segments would be able to recover as follows:

Codewords 2, 4, 9 and 11 would require no recovery as they retain all 7 input symbol segments and therefore require no additional checksum symbol segments.

Codewords 6 and 7 would each require only one additional checksum symbol segment as they consist of 6 input symbol segments and 4 checksum symbol segments.

Codewords 0, 1, 3, 5, 8 and 10 would each require only two additional checksum segments as they consist of 5 input symbol segments and 5 checksum symbol segments.

The number of packet transmissions required for erasure recovery would be 2 packets for codewords 6, 7 and 12 packets for codewords 0, 1, 3, 5, 8, 10. As each codeword must also transmit the recomputed input symbol segment(s), the total number of packets is $p=12*7+2*(2+12)=112$ for a savings of 22% in network traffic over the first embodiment.

A more likely occurrence is the loss of a single Storage System, thereby causing one erasure per codeword, which amounts to a total of $e=7$ input symbol segment erasures. In this case, $p=12*7+2*7=98$ which is a 32% improvement in network traffic.

Self-Healing Cluster Implementation:

The cluster of Storage Systems is self-healing in that it is able to detect and repair the loss of any number of members up to the error correction tolerance specified when the content was encoded. Content healing can be initiated manually through the Administration Tool 105. The system can be configured to periodically verify the availability of the content. If so configured through the Administration Tool 105, content healing is initiated automatically when the system detects that the cluster of Storage Systems is not complete. A complete cluster of Storage Systems is one in which all the Storage Systems are accessible and report that their local content is available. Content healing can be initiated for one or more files or for the entire cluster. It can be initiated if some members of a cluster fail during the staging of content. In this case, the healing proceeds simultaneously with the staging of the content with no impact on performance and no loss of data. A cluster of Storage Systems that exceeds its error correction tolerance is a failed cluster and cannot be recovered unless a replicated cluster is available from which to heal. An incomplete cluster within the bounds of its error correction tolerance can be healed as well as have its content retrieved simultaneously with no impact on performance beyond minimal disk access and network bandwidth. This is because the error recovery computation of the healing process, and therefore the vast majority of the overhead, is distributed equally across the entire cluster including the (empty) Storage System being healed.

The pull_verify command is usually the way to determine if a file should be healed. This command is a subcommand of the pull command of the retrieval process. For example, the Administration Tool 105 multicasts a pull_verify command along with a VFS file path to poll the cluster and determines that its cluster is not complete. Potential replacement Storage Systems are identified that are not part of any of the HMF's replications (starting at replication 0). All Storage Systems automatically identify themselves to their cluster upon startup as part of the network discovery procedure. The final selection of the replacement Storage Systems is done through negotiations following the same protocol as the negotiations of the staging process. The replacement Storage Systems are assigned the segment id of the Storage Systems they are replacing. They are sent a heal command by multicast along with their segment id and the current HMF data. The entire cluster receives the command and prepares for its execution. Each replacement Storage System performs a content retrieval from the remaining cluster of Storage Systems. All the replacement Storage Systems are operating under the same heal transaction id and therefore are able to join the same multicast group and ephemeral port created for this transaction. The available Storage Systems provide their content is a manner similar to a content retrieval. A content heal differs from a content retrieval in one major and one minor aspects. The major aspect is that the content heal may have multiple Retrieval Hosts as multiple Storage Systems may be healed simultaneously. The minor aspect is that the error recovery of a content heal is not limited to input symbol segments as in content retrieval, but extends to checksum symbol segments as well. As codeword are aggregated, only the segments corresponding to the replacement Storage Systems (segment ids) are recomputed (through decoding). In most cases the range of codewords to repair is the entire content's codewords. If the content healing process is initiated while the content's staging is in progress, the range of codewords to repair is limited to those that were already transmitted to the failed Storage Systems. The staging process is joined by the replacement Storage System so that for any codewords beyond this high water mark, they are performing a staging transaction. Note that not all transactions are simply content retrieval (read only) or content staging (write only). Some transactions are a combination (read and write) with random access, which introduces a small complication, as access to a codeword that was already healed will benefit from the replacement systems, whereas access to a codeword not yet healed will only be serviced by the remaining Storage Systems. The failed Storage Systems are recorded in the Host Map File. This information is used to compile the reliability profiles of the Storage Systems.

Storage System Failure Detection and Correction during Transactions:

It is possible for Storage Systems to fail during transactions (e.g., staging, retrieval or healing). The system MBP Engine 109 detects failures through three mechanisms: I/O error, time-out and failure notification by another Storage System. Detecting the failure is relatively simple but taking corrective action can be complex based upon the transaction. Essentially, the system is able to take corrective action as long as a sufficient count of active Storage Systems remains to satisfy the minimal FEC parameters.

A failure during a staging transaction is manageable as long as a sufficient count of active Storage Systems remains to satisfy the minimal FEC parameters. Under such conditions, a heal transaction can be performed either while the staging transaction is in progress or at a later time. There is no action to take until such a time as a heal transaction is initiated by a new Storage System.

A failure during a retrieval or heal transaction requires that instant corrective measures be taken and propagated to the remaining Storage Systems in the cluster. The transaction is aborted if the count of active Storage Systems falls below that required to satisfy the minimal FEC parameters. Otherwise, the cluster is informed via a UDP/IP multicast message that a Storage System has failed. The implication is simply that the content from the failed Storage System will be erasures from this point on and that the entire remaining cluster will cooperate in order to repair the erasures. Every Storage System in the cluster can aggregate all symbol segments from every cluster member as these are sent via UDP/IP multicast. Thus, every remaining Storage System member has equal opportunity to repair the input symbol segment erasures of any given codeword. The Storage Systems distribute the repair work equally across the cluster by each decoding every other n segments belonging to the missing Storage Systems, where n is the number of remaining Storage Systems. Thus, they will aggregate all available symbol segments as illustrated in FIG. 7B (721) and then each will rotationally repair input symbol segment erasures and transmit them to the Retrieval Host 723 as illustrated in FIG. 7B (722). The Retrieval Host 723 is never aware that a failure has occurred and is therefore not disrupted. This recovery procedure accommodates multiple simultaneous failures, up to the FEC parameters configured.

Cluster Replication:

The replication of a cluster is the selection of one or more clusters of Storage Systems that will store the same content. There are several reasons to replicate storage clusters. One reason is higher availability when a cluster experiences a simultaneous failure count greater than the maximum recoverable error count for some encoded content. In this situation the option exists to use a replicated cluster, or to selectively use from the replicated cluster(s) only those Storage Systems that have failed. Where content has been replicated across one or more storage clusters, it is possible to recover from Storage System failures in one cluster (whether catastrophic or not), by using the corresponding Storage Systems in the replicated clusters. All the recovery scenarios presented take place without impacting the availability of the content or the performance of its retrievals.

Another reason for replicating clusters is to achieve better performance during content retrievals. Very popular content will be retrieved very often. It is conceptually possible to overwhelm a cluster of Storage Systems no matter how many Storage Systems have been included in the content's cluster in order to improve performance and reliability. The availability of another cluster of Storage Systems with the same content (through replication or otherwise) provides another means of ensuring scalability and maintaining the performance level desired.

Cluster replication can be done at any time. One way is to indicate a replication count as part of the content staging parameters. This will cause the replication to occur as the content is being staged. Performance is not impacted as the replicated cluster joins the UDP/IP multicast group and has equal access to the data without increasing the network (or computational or storage device I/O) load. Another way is to replicate some content on the cluster after it has been staged. This may be necessary as the popularity of the content may prove to be greater than originally anticipated when it was first staged. Thus, embodiments of the present invention provide scalability and performance that can be dialed up at any time. It is possible to configure the system to define several fixed Storage System clusters of the same size and enable replication onto them by default. If this configuration is adhered to permanently, the effect is akin to software mirroring of the Storage Systems.

Cluster Restriping:

The restriping of a cluster of Storage Systems can occur when the count of cluster is reconfigured through the addition or removal of Storage Systems. The new count of cluster members changes the size of the stripes. When Storage Systems are added (typically to augment the storage capacity and the codec performance), restriping will redistribute the storage load to leverage the capacity and I/O throughput of the new members. Therefore subsequent content retrieval will leverage fully the enlarged cluster. When Storage Systems are removed (typically because they were underutilized), restriping will redistribute the storage load to eliminate FEC overhead during retrievals due to the missing Storage Systems. Note that unlike RAID, a Storage System does not have to be restriped if storage mediums are added or removed. Restriping takes place without impacting the availability of the content.

Cluster restriping is implemented as a retrieval transaction coupled with a storing transaction. Thus, the retrieval transaction uses the existing HMF data and the storing transaction creates a new HMF that reflects the changes in the cluster. Upon the successful completion of the cluster restriping for each file, a new file is produced that replaces the old file and the latter is deleted.

The Host Map File Implementation:

Upon successful completion of the staging of content, the Host Map File (HMF) data is produced describing fully how to locate and access the staged content. FIG. 10A depicts the grammar of the HMF, FIG. 10B depicts a sample HMF and FIG. 10C depicts tables that describe the various constructs of a HMF grammar. The HMF describes the original content and the encoding parameters in the header construct 1001. The sub-constructs of header construct 1001 are described in table 1003. Each cluster replication, including the initial staging (denoted as "replication 0"), is described in subsequent replication construct 1002. The sub-constructs of replication construct 1002 are described in table 1003 and table 1004.

The HMF data is the only means to retrieve content that has been staged and to purge staged content from its cluster. The HMF data is also used to verify that content can be retrieved and whether it needs to be healed. This entails attempting to contact every Storage System in the original cluster to ascertain that a sufficient subset is available to retrieve and if necessary decode the content. The HMF data is not a single point of failure because it is stored as the header of every stripe file. Thus, it is possible to reconstruct the original content starting from any stripe file on any Storage System.

A First Embodiment

A first embodiment of the present invention is a content-on-demand distribution system. In this embodiment computers with available storage capacity and broadband access to the Internet join to form communities of peers. Content stored in any cluster of Storage Systems within a community is potentially available to all the members of the community. The content does not have to be replicated to ensure high-availability or performance as embodiments of the present invention address both. Other benefits arise if the community has subscribers to an ISP service. The ISP will save on bandwidth charges, because the data transmitted between communities of subscribers will remain within the ISP's network, as it is not routed through the Internet backbone. The asymmetric nature of the bandwidth of broadband to the home (xDSL, cable modem, etc.) fits very well the model of many Storage Systems transmitting to one recipient as download bandwidth is greater than upload bandwidth.

A Second Embodiment

A second embodiment of the present invention is a video-on-demand/audio-on-demand streaming system. The requirements for this embodiment to function are similar to the content-on-demand distribution system previously described. Here the content is to be streamed rather than transferred as it has both video and audio material. One such community could be one or more head ends of a cable provider and the Storage Systems could be the set-top boxes (STB's) provided to the customers. Another such community could be Private Video Recorder (PVR) owners that subscribe to a service. Current STB/PVR technology is converging with computer technology in that both have the most important attributes required for embodiments of the present invention (e.g., a processor, memory, a large capacity hard disk drive, access to broadband, etc.). Further, STB/PVR's are directly connected to conditional access systems and televisions thereby ensuring secure access to the HMF, payment for the audio/video content as well as an ideal medium for viewing the content. The content is secure as it is encrypted before transmission and it is streamed so it may only be stored on the playback STB/PVR subject to the content provider's authorization. Content is distributed across clusters of STB/PVR's with replications as necessary to ensure sufficient streaming performance based upon the popularity of the content. Other networking technologies to the home such as DSL and broadband wireless can also be used for this purpose, though this is less practical until the viewing device (television) is part of the home network.

A Third Embodiment

A third embodiment of the present invention is a high-availability storage management system. In this enterprise environment, off-the-shelf PC's are clustered into a seamless high-performance and highly available storage solution. Very large data sets can be staged providing highly reliable access that can withstand multiple simultaneous failures. The failures are not simply at the component level (e.g., processor, memory, RAID, etc.) but at the entire system level. Embodiments of the present invention stripe the content not across spindles of a single RAID, but across entire systems that themselves may use RAID storage subsystems. In a conventional system, redundancy for hardware components entails a secondary/stand-by resource (e.g., dual controllers, entire system, etc.) and redundancy at the software level usually entails replication of the data onto another server. Yet most redundancy solutions guard against a single point of failure only and a second failure can disable the system. The cost of software suites (e.g., for replication, fail-over, on-line backup, virtualization, etc.) and high-availability hardware redundancy are very high. Embodiments of the present invention allow the failure tolerance to be dialed up to the desired level. For example, it is possible to specify that some content to be staged upon 100 Storage Systems, tolerate a 20 percent failure (20 servers), or a 40 percent failure (40 servers) and even higher. Yet this flexibility and tremendous redundancy comes without the need to replicate the content and does not require extra or custom hardware. Another benefit of embodiments of the present invention is the inherent load balancing and security it provides. As the entire storage clusters participate in the staging (encoding) and retrieval (transmission) process, the burden is evenly spread. As previously discussed, the distribution and encoding of the content adds to its security.

A Fourth Embodiment

A fourth embodiment of the present invention is an on-line backup system. In the enterprise environment, this system is able to use all spare storage capacity across computers as a seamless repository. The system is able to use storage across computers without compatibility concerns about the hardware manufacturers, operating systems, etc. As various computers in a local area network may have greater or smaller available storage capacity, it is often difficult to find a single disk with enough free space to store large content. Embodiments of the present invention are able to adjust the formation of clusters to use most available free disk space in underutilized systems.

A Fifth Embodiment

A fifth embodiment of the present invention is an off-line backup system. In the enterprise environment, this system clusters groups of tape drives to provide a high performance and high availability tape backup system. As on-line storage capacity grows into terabytes and beyond, it is becoming difficult to transfer to slow tape devices such large data sets. The large capacity of a single tape drive cannot match the HDD capacity of data centers. Multiple tapes have to be used in sequence to capture all the on-line data. Robotic tape systems exist to automate the swapping of tapes, however for most systems a single drive is used for storing and retrieving data. Embodiments of the present invention use banks of (robot controlled) tape drives to store and retrieve large data sets. The data is read/written in parallel to all the tape drives thereby multiplying their performance. A further benefit is that the system automatically recovers from broken tape drives or damaged/missing tapes through its FEC capability. The system has also the ability to heal the contents of a damaged tape by recreating the missing data thus, providing greater longevity to off-line backups.

A Sixth Embodiment

A sixth embodiment of the present invention is a hardware implementation of the Storage System (see FIG. 1A) whereby the electronics required are reduced to a single board or chip encompassing a processor, memory, a network communications interface (e.g., Ethernet, Fibre, etc.) and a storage medium interface (e.g., SCSI, IDE, PCI, etc.). The encoding and decoding computation are performed over Galois fields and therefore require table lookup, XOR and boundary checking operations. A chip implementation of the codec will off-load the general-purpose processor and provide better performance. The hardware implementation attaches directly to the storage medium and to the network thus, affording unprecedented flexibility. Such units can be physically located anywhere on the network; they can be moved as needed; their cost is so low that they require no maintenance or repair, and instead are simply replaced upon failure.

A Seventh Embodiment

A seventh embodiment of the present invention provides a way of protecting contents on distribution media such as music, videos, games and software against piracy. Content would be encoded with erasures such that the actual content is incomplete as well as augmented with checksum symbols. Thus, directly copying it from the distribution media to a computer hard disk would include the erasures. The erasures would make the content on the hard disk useless for playing, for sharing or other unauthorized distribution. When accessing from the intended media player (e.g., a CD player, a game console, etc.), the erasures are dynamically repaired in memory and the content is whole again for that device. The erasures do not have to be very large, as for example, simply erasing most the MPEG structures of audio/video content would render it useless. The HMF data is stored on the CD and may be encrypted.

Although only a few embodiments have been described in detail above, those having ordinary skill in the art will certainly understand that many modifications are possible in the embodiments without departing from the teachings thereof All such modifications are intended to be encompassed within the claims.

Some Features of the First Set of Embodiments are:

1. A method of storing data in a clustered data processing system, comprising:

receiving, by a plurality of peers in the system, a plurality of input symbol segments that become part of a codeword; and performing one or the other of the following by each of the plurality of peers:

storing one of the input symbol segments by the peer, and generating and storing a checksum symbol segment by the peer, the checksum segment being unique to the peer and based on the plurality of input symbol segments, the checksum symbol segment having contents that allows recovery of any one of the plurality of input symbol segments.

2. The method of clause 1, wherein whether the peer performs storing or generating is determined in accordance with a rotational lookup table.

3. The method of clause 1, wherein the storing is performed in accordance with a rotational lookup table.

4. The method of clause 1, wherein the generating is performed in accordance with a rotational lookup table.

5. The method of clause 1, wherein the received input symbol segments were sent to the peers in the system using a multicast transmission.

6. The method of clause 1, wherein the stored input symbol segment is stored in local storage of the peer.

7. The method of clause 1, wherein the stored input symbol segments is stored in a storage device dedicated to the peer.

8. The method of clause 1, wherein the plurality of peers perform their respective storing and generating concurrently.

9. The method of clause 1, further including additional clusters of peers that perform the receiving and performing steps.

10. The method of clause 1, wherein a mathematical seed for the generating the checksum is an i.d. of the peer.

11. The method of clause 1, using a different rotational table entry for each codeword stored.

12. The method of clause 1, wherein each peer receives all of the data to be stored but only stores a portion of the data in accordance with a rotational lookup table.

13. A method of retrieving data in a clustered data processing system, comprising:

receiving, by a plurality of peers of the system, a content request from a content requestor;

transmitting by ones of the plurality of peers, an input symbol segment stored by the peer so that available ones of the plurality of peers and the content requestor receive the input symbol segment; and if erasure of an input symbol segment has occurred:

transmitting by ones of the plurality of peers, one checksum symbol segment per erasure, and regenerating the erased input symbol segment using the transmitted checksum symbol segment and the rest of the codeword, any checksum symbol segment being able to repair any input symbol segment in conjunction with the rest of the codeword.

14. The method of clause 13, wherein in the regenerating step, a peer who transmits a checksum symbol segment does not regenerate the erased input symbol segment, but a peer who receives the checksum symbol segment does regenerate the erased input symbol segment.

15. The method of clause 13, where the regenerating is done in accordance with a rotational lookup table.

16. The method of clause 13, further including determining which of the plurality of peers are available at a beginning of the data retrieval process.

17. The method of clause 16, further including creating a rotational lookup table in accordance with which peers participated in an original storage operation.

18. The method of clause 13, wherein the transmitting of an input symbol segment is performed using multicasting.

19. The method of clause 13, wherein non-available peers are identified and a rotational lookup table is adjusted on the fly in accordance with the identified non-available peers.

20. A method of healing data in a clustered data processing system, comprising:

transmitting available input symbol segments to a plurality of peers in the system;

if erasure of an input symbol segment has occurred, repairing all erased input symbol segments so that all available peers have all input symbol segments;

if erasure of a checksum symbol segment has occurred, regenerating the erased checksum symbol segments for the peers that have an erased checksum symbol segment.

21. The method of clause 20, further including storing the regenerated erased checksum symbol segment in the peer.

22. The method of clause 20, further including transmitting the regenerated erased checksum symbol segment to another peer for storage.

23. The method of clause 20, where the erasure of input symbol segments occurs before the other steps.

24. The method of clause 20, where the erasure of input symbol segments occurs during the other steps.

25. The method of clause 20, where the erasure of checksum symbol segment occurs before the other steps.

26. The method of clause 20, where the erasure of checksum symbol segments occurs during the other steps.

27. The method of clause 20, where the transmitting occurs in accordance with a rotational lookup table.

28. The method of clause 20, where the repairing occurs in accordance with a rotational lookup table.

29. The method of clause 20, where the regenerating occurs in accordance with a rotational lookup table.

30. The method of clause 20, wherein the peer having the erased checksum symbol segment takes part, on a rotational basis, in repairing the erased input symbol segments.

31. The method of clause 20, wherein the transmitting is performed using multicasting.

32. The method of clause 20, wherein regenerating the erased checksum symbol segments for the peers that have an erased checksum symbol segment occurs concurrently for more than one peer.

33. The method of clause 20, wherein regenerating the erased checksum symbol segments for the peers that have an erased checksum symbol segment occurs while read/write access is occurring.

34. The method of clause 20, wherein communication between peers occurs through a multicast burst protocol.

35. The method of clause 20, wherein non-available peers are identified and a rotational lookup table is adjusted on the fly in accordance with the identified non-available peers.

Second Set of Embodiments

The described embodiments relate to data storage and more specifically to a cluster storage system.

Networked storage systems provide remote access to their content. The benefits of this technology include better accessibility and ever increasing capacity. The problems are mainly I/O performance and reliability. Performance is an issue due to the high count of users across the network making I/O requests. It is a function of the speed of the HDD, the bus, the network and the size of the cache as well as access patterns. Reliability is an issue because storing vast amounts of data introduces risks as the impact of losing all that data can be catastrophic. Performance is improved through a variety of hardware means. Network performance is improved through the Storage Area Network (SAN) standard. HDD performance is improved with new HDD standards such as SAS that have faster rotational speeds, smaller seek times and optimized command queuing. Still hardware has its physical limits and scalability remains a challenge; it is not possible to add more HDD's than can fit in the chassis or add more processors than can fit on the motherboard or add more cache memory beyond the maximum for which the system was designed, etc. Reliability is addressed through hardware redundancy. The state-of-the-art comprises cross-strapping components for hot component-level fail-over in case of failure. Other solutions specify that the entire system be mirrored with one system active and another passive. Upon a failure in the active system, the passive system is to take over. The resiliency of most systems does not exceed one single point of failure thus they lose their redundancy after the first failure.

Access to a networked storage system is either through a native file system (with a direct SAN connection to a storage pool) or a virtual file system (VFS) that provides IP network access to a remote file system (NAS). Either way a local file system owns its storage and manages all access. Access to storage is lost when its file system is unavailable (such as when its computer is down).

Summary

The present invention is a highly resilient, scalable, high-performance data storage system that stripes its content across a cluster of peer computers. Multiple peers can fail (up to the FEC level configured in the cluster) without disrupting the clients. Peer failures are detected by the cluster and all missing data is seamlessly generated so all I/O operations complete successfully. Two embodiments are described: (a) a VFS that stripes files across a cluster of peers; and (b) a virtual block device (VBD) that stripes data across a cluster of peers. Both embodiments rely upon the core technology of the present invention but export different interfaces to the outside world.

The Core Technology:

The Core Technology comprises the software components necessary for any embodiment of the present invention. The core technology components include:

The Peer Communication Protocol:

This protocol is used for all communications except file I/O. It is used for network discovery when peers initially determine which other peers are active. In this context it is also used for peer authentication and joining/leaving the cluster. It is used for heartbeats between peers and peer management commands such as shutting-down, healing and restriping. It is used for high-level file system commands such as delete/rename/link, and directory listing, etc. It is used for operating system calls such as open/close/stat/flock/lockf/fcntl, etc.

The Packet Multicaster/Demulticaster:

This subsystem comprises hardware and software for shaping the storage IP network traffic. It is a network switch located between the cluster and the rest of the network. Its main use is the elimination of multicast packets outside the cluster. Multicast packets originating from the cluster (outbound) are converted to unicast packets for their destination client systems. Conversely, when appropriate, unicast packets originating outside the cluster (inbound) are converted to multicast packets for all the cluster peers to receive. Thus the present invention benefits from the tremendous bandwidth savings of the UDP/IP multicast protocol without impacting the rest of the network. For scalability and resiliency purposes multiple Packet Multicaster/Demulticaster systems are aggregated within a single storage system.

The Reed-Solomon Codec:

This codec is used for the computation of metadata for purposes of Forward Error Correction (FEC). The codec produces codewords by encoding data to be stored (input symbols) thus producing metadata (checksum symbols). When a peer failure occurs the metadata is used to recover all missing data. The present invention supports random read/write access to files, which introduces complications during partial codeword overwrite. Conventional codecs require all of a codeword's input symbols in order to generate checksum symbols. A partial codeword overwrite by definition does not supply all the input symbols. Ordinarily for encoding to be possible the missing input symbols would have to be retrieved (via the network) from the storage system (the cluster) and combined with the new checksum symbols. This amounts to one packet per cluster peer storing input symbols. These extra network packets and disk reads can be very detrimental to performance. The present invention supports a second encoding process that requires only the old input symbols corresponding to the partial overwrite. This is accomplished by de-encoding the old input symbols from the old checksum symbols and re-encoding the new checksum symbols. For small overwrites the extra step of de-encoding has a negligible impact on performance and the reduction in the number of packets and disk reads greatly improves performance.

The Rotation Management:

The cluster performance is ensured by evenly balancing the workload across all the peers. When writing to a cluster, some peers must only store a part of the data while others must generate and store metadata. Similarly when reading from a cluster with peer failures, some peers must only read data while others must read metadata and generate missing data to effect repairs. A Rotational Lookup Table (RLUT) is constructed based upon the count of active peers and the count of metadata-generating peers per codeword (e.g. the FEC rating). Every possible file location has a corresponding slot in the RLUT that describes the task of every active peer. When there are no peer failures the tasks are simply to encode or to store indicating that a peer must generate metadata or store data. When there are peer failures the RLUT slot tasks also specify for each metadata-generating peer whether it must participate in repairs by providing its metadata and/or perform repairs.

The Actuator Management:

The Actuator management optimizes the HDD and network I/O of the peers. All I/O requests map to a sequence of codewords. The footprint of a read request is unlikely to coincide with an integral number of codewords. The peers whose rotational segments do not overlap the read request footprint have nothing to contribute. It would be highly inefficient for them to read data from their HDD and transmit it over the network. The Actuator management ensures that such peers take no action for these codewords. Similarly for the footprint of a write request, the Actuator management computes whether each peer will have to store any data, or in case of failure read and transmit data for recovery. Any superfluous HDD or network I/O avoided allows concurrent I/O requests to proceed resulting in greater system throughput.

Transient Error Repairs:

A peer can incur I/O errors without having to shut down. The I/O errors can occur due to many causes such as bad disk blocks, bit rot, disk controller errors, network errors, etc. Some errors such as bit rot may not be detected by the hardware and therefore not be reported by the operating system. In most storage systems such errors cause the I/O transaction and possibly the entire system to fail. Thus it is possible that a single bad block would have a severe impact and trigger a fail-over to a backup system if available. The present invention computes a checksum for every segment stored on the disk and every packet transmitted over the network. This checksum is verified when a packet is received and when a segment is read. When a mismatch between the computed checksum and the expected checksum is discovered corrective measures are taken. If the mismatch is in a segment received through a network packet, the packet is requested again. If the mismatch is in a segment read from the local HDD, a second attempt is made at reading the segment. If a second mismatch is detected on the same segment a transient peer failure is declared by the cluster and the other remaining peers repair that codeword as though a peer failure had occurred. The peer that is the source of the checksum mismatch continues operating and if the mismatch was due to a disk read the repaired segment is written to disk in an attempt at a persistent fix.

The Multicast Burst Protocol:

The Multicast Burst Protocol (MBP) is high-performance protocol used for file I/O (e.g. read and write), peer failure detection and notification, and transient peer failure detection and notification. The MBP runs on the cluster peers and all clients. It manages the transmission and reception of multicast bursts of data to compensate for the unreliability of UDP/IP. It filters redundant packets and marshals out of order packets. It manages burst timeouts and requests missing packets. The MBP uses the Actuator manager, Rotation manager and Reed-Solomon codec to construct the expected Actions of each peer. Thus each peer knows what packets it is expected to transmit and what packets it can expect to receive. The MBP detects when peers fail and derives the corrective actions required of all the peers. Subsequently the MBP will determine the most efficient manner to regenerate missing data due to failed peers based upon the availability of pre-computed and cached data segments. The MBP keeps all the peers in the cluster and their clients synchronized without requiring any network communication beyond the original client commands. Without the MBP there would be a large amount of network chatter in large clusters with many peers. This chatter would be subject to UDP/IP artifacts which would cause ACKs/NACKs and data re-transmissions thereby exacerbating the chatter.

The First Embodiment

The first embodiment is a VFS operating on client machines that stripes files across a cluster of peers. The peers control their local storage through a native file system provided by their operating system. The interface exported is a VFS mount point in compliance with the operating system of the client machine. Multiple clients can mount the VFS directly as no single computer owns the storage cluster. This is a significant advantage over most VFS that are simply gateways to another (storage) computer and therefore subject to its availability. Peers in the cluster can also mount the VFS thereby making the cluster a storage grid as well as a computational grid. The VFS appears to most of the operating system's utilities and all user programs as the root directory of a local HDD. To the operating system's kernel the cluster appears as two devices: a network interface and a block device. Multiple such network interface/block device pairings can refer to the same cluster as a means of partitioning a cluster. The standard (file) system calls that are supported are passed by the kernel to the VFS and it relays them to the cluster.

Whereas files are striped across the cluster, directories are replicated. Thus when the VFS is called upon to create a directory it creates the directory on all the peers. When a file is created, it also is created on all the peers; however data written to the file is striped (divided) among the peers.

This embodiment has an I/O cache for minimizing the HDD I/O of the peers. This cache is file-system aware as compared with conventional caches that are only disk-block aware. With the awareness of the file system it is possible to associate priorities to directories, files, and ACL's. When the cache is exhausted and must be flushed it is possible to preserve the highest priority content. Thus the pages of a critical database are not going to be sacrificed to a low-priority backup task.

Healing is the process of recreating missing data on peers that are out of synchronization. When peers fail the cluster regenerates all the missing data as required for each I/O transaction without disrupting the clients. The regeneration introduces additional overhead as it requires network and HDD I/O as well as consuming CPU cycles for the codec. This overhead is minimal and depending upon the count of failed peers and the I/O pattern of the clients can be negligible. However, every peer that fails and drops out of the cluster decreases the margin of safety in the FEC configuration of the cluster. For example a 10-peer cluster with an FEC of 40% could lose up to 4 peers with no disruptions. The 4-peer margin of safety is decreased by every peer failure. A failed peer that rejoins the cluster is by definition stale. If the peer was simply rebooted it missed all the I/O transactions that occurred since it failed and if the peer is a new system it has no data. The healing process traverses the cluster's directory tree starting at the root, recreating missing directories, deleting obsolete directories and repairing missing files. The healing process repairs all stale peers simultaneously. The healing process can occur while the cluster is in use and can heal files that are concurrently opened for read/write access by applications.

Restriping is the process of redistributing a cluster's content over a changed peer count. Restriping is necessary when peers are permanently added or removed from the cluster. When a cluster shrinks in capacity some peers are removed. The peers removed are considered as failed by the remaining peers and though this does not disrupt the cluster it increases the overhead and diminishes the safety margin of all the data previously stored. Restriping over the smaller cluster will eliminate the overhead of performing repairs as well as establish the margin of safety of the new FEC level. Similarly when a cluster grows in capacity it must be restriped so the content can benefit from the new FEC, added disk capacity/bandwidth, network bandwidth and processor(s) of the new peers. Whether the cluster grows or shrinks, new files are striped based upon the new peer count as soon as the cluster configuration is changed. The restriping process can occur while the cluster is in use and can restripe files that are concurrently opened for read/write access by applications.

The Second Embodiment

The second embodiment is a virtual block device (VBD) that stripes data across a cluster of peers. A VBD has no file system but is mounted and controlled by a file system like a real block device (e.g. HDD, etc.). The VBD views its configured storage capacity as an implicit file of fixed size that is always opened and represents the only I/O context. There is no explicit mapping between a VBD block size and its codeword size.

The peers control their local storage through a native file system provided by their operating system. The interface exported to the kernel is that of a block device. Only one client can mount the VBD as that client's operating system kernel and file systems are the sole owners of the storage cluster represented by the block device. To the operating system's kernel the cluster appears as two devices: a network interface and a block device. Multiple such network interface/block device pairings can refer to the same cluster as a means of partitioning a cluster. The standard block device kernel interface is supported and the calls are passed through the device driver to the cluster. Any native file system (e.g. one that manages the placement of data on local storage) can own the VBD similarly to a real block device.

This embodiment has understands only HDD blocks and has no notion of files/directories. The client's native file system manages the content of all the storage blocks available. When an I/O request for a block address is sent by the file system, the driver maps the corresponding block of codewords and forwards the request to the peers.

This embodiment has an I/O cache for minimizing the HDD I/O of the peers. This cache is only disk-block aware and behaves as a conventional cache.

Healing proceeds on a codeword basis starting at the first codeword and progressing to the last codeword. Healing is necessary for the same reasons outlined in the first embodiment. The healing process repairs all stale peers simultaneously. The healing process can occur while the cluster is in use.

Restriping proceeds on a codeword basis starting at the first codeword and progressing to the last codeword. Restriping is necessary for the same reasons outlined in the first embodiment. It is one way to modify the capacity of the VBD as reported to the file system. The restriping process can occur while the cluster is in use.

Actuator

Within the context of computer hardware, an actuator typically refers to the head in a disk drive. In this patent application the Actuator (FIG. 19) refers to the storage mechanism of a peer. This could consist of any data repository as the medium (HDD, CD, tape, etc.) is not material. What is material is that access to the data stored is via a conduit with finite bandwidth. The Actuator seeks to optimize this bandwidth by computing the smallest set of accesses required to fulfill an I/O request (e.g. read or write).

The Actuator (1900) is tightly coupled to the Rotation (1930) described in the previous patent. The Rotation is itself tightly coupled to the Codec (1940) also described in the previous patent. The Codec divides the stream of I/O into fixed-size logical blocks called codewords. Each codeword in the Reed-Solomon algorithm comprises a group of Input Symbol Segments (ISS) and Checksum Symbol Segments (CSS). The ISS are the payload and the CSS are metadata to repair ISS erasures. In the present invention, the number of segments is related to the number of peers available (or configured if not all are available). Thus each peer stores one segment of each codeword. An optimal rotation is computed to balance the computational workload of generating the CSS.

For the purposes of the Actuator an I/O request (1910) is defined as a byte count and a starting file position that overlaps a corresponding contiguous sequence of codewords. Whether the I/O request is for reading or writing is not material to the Actuator. When a file is viewed as a stream of data, most I/O requests do not coincide with an integral number of codeword payloads. They range from very small data (e.g. less than one codeword) to very large data (e.g. many codewords). Most starting file positions will be within the payload range of some initial codeword and not coincide with its beginning Most ending file positions will be within the payload range of some initial codeword and not coincide with its ending. Some sequence of codewords between the leading and trailing codewords may be spanned.

The Actuator takes the I/O transaction parameters and the Rotation configuration to compute which segments within the sequence of codewords must be accessed (read or written) by which peers. The Actuator also includes in its computation any peer failures to account for the I/O of repair peers (see the first patent application). The Actuator output describes the Actions to be taken by each peer to satisfy an I/O request. For a single I/O request each peer will have at most three Actions. The leading Actions (1950) and trailing Actions (1960) describe the leading and trailing partial codewords of the I/O and the middle Action (1970) describes the whole codewords. The leading and trailing Actions specify the byte count, the starting position (the offset within the partial codeword) and the codeword number. The middle Action specifies the count of codewords and a sequence of codeword numbers (1971) representing the ordered list of valid/material codewords. Note that the middle Action does not specify and offset or a byte count as the middle codewords are by definition whole (e.g. no offset and a fixed size). Each Action includes a Boolean flag indicating whether it is enabled. Thus an I/O request that starts on an even codeword boundary will not have a leading Action and an I/O request that is smaller than a codeword will not have a middle Action but may have both a leading and a trailing Action.

Each active peer in the cluster is assigned a unique peer number (1920) every time the peers in the cluster are first marshaled to create a file. The peer number ranges from zero to the cluster peer count minus one and can change for any given peer from file to file. This number is the key used to establish the peer context for the Rotation Codec and Actuator components as well as inter-peer communication. Each peer derives its actions from the Actuator by specifying the I/O request parameters along with its unique peer number. Similarly each peer also derives the actions of all the other peers in the cluster. In the normal case when there are no peer failures, all the peers know exactly what all the other peers will do and in what order without inter-peer communication. When there are peer failures, the Actuator describes which CSS peer are responsible for repairs, but is unable to determine whether the repair peers are able to provide a GP or whether they will require additional actions to repair the failed peers.

The alternative to the Actuator is for each codeword within the footprint of an I/O request to have all of its segments (ISS and CSS) accessed (and possibly transmitted over the network) by each peer. This is very inefficient as even the smallest I/O (less than a codeword or a segment) would involve the entire cluster of peers which precludes concurrent I/O across the cluster as well as potentially uses a lot more network bandwidth. Most electro-mechanical devices no matter how fast (e.g. as HDD's) have limited bandwidth due to physical constraints such as head movements, rotational latency, etc. Such penalties on the performance of the system may hinder its use in database storage and other I/O intensive applications.

High-Performance Reed-Solomon Codec.

Conventional Reed-Solomon encoding requires that all the input symbols (IS) of a codeword be available for the checksum symbols (CS) to be computed. This is a fundamental mathematical requirement because the CS computed must be related to all the IS in order to subsequently be able to repair any IS erasure (FIG. 20A). The input symbol sequence I={$IS_0$, $IS_1$, . . . , $IS_{n-1}$} is encoded by iterating over every element of the sequence to produce each checksum symbol $CS_{i, 0 \leq i \leq m-1}$ (2000). When a given input symbol $IS_{k, 0 \leq k \leq n-1}$ is erased, it can be repaired by substituting any of the CS computed and decoding the erasure by iterating over every element of the sequence to produce the missing IS. There exist many texts and publications focusing on the subject of combinatorics, Forward Error Correction and the Reed-Solomon algorithm. Of special relevance to the present invention is one such paper by Luigi Rizzo titled "Effective Erasure Codes for Reliable Computer Communication Protocols" that appears on ACM Computer Communication Review, Vol. 27, n. 2, April 97, pp. 24-36, which is herein incorporated by reference.

The requirement that all the IS be available for the computation of a CS can have serious implications for the performance of a networked cluster of peers when only some of the IS of a previously generated codeword are modified. In the present invention all peers store symbol segments (contiguous blocks of related symbols). Each peer stores either an Input Symbol Segment (ISS) or a Checksum Symbol Segment (CSS). The ISS availability requirement means that even in a single-byte write operation all ISS must be transmitted to all CSS peers. Note that there is no such overhead when a write operation overlaps a codeword completely (e.g. the middle Actions).

In the present invention, when a write operation partially overlaps a codeword (e.g. the leading and/or trailing Actions) only the overlap is recomputed by the CSS peers and only the old ISS overlapping the codeword's modified footprint are transmitted. They are subtracted (de-encoded) from the old CSS (2010) and the new footprint is added (encoded) to produce the new CSS (2020). From the performance aspect of the numerical computation the process of de-encoding is comparable to the process of encoding. When some old values of an ISS are de-encoded its new values must always be encoded, resulting essentially in the same overhead as encoding the ISS twice. The main advantage in de-encoding stems from the bandwidth savings of the transmission of fewer ISS. For example (FIG. 20B) a codeword (2060) is striped across the cluster of peers (2050) with no peer failures. A write operation multicasts a new value (2070) that is received by the cluster. Peer 0 and peer 2 store IS symbols and have no tasks as they do not overlap the new value. Peer 1 overlaps the new value and will multicast the corresponding old value (2080) to the cluster. Peer 3 and peer 4 store CS symbols and will use the old value to de-encode and the new value to re-encode their respective CSS. All other peers will ignore the old Value. This method is advantageous when the footprint is less than half the codeword payload. When the modified footprint is half the codeword payload both methods require the same count of ISS, but de-encoding performs twice the numerical computations. Thus a worst case transmission of half a codeword is established. As the modified footprint shrinks in proportion to the count of ISS per codeword, this method grows more advantageous.

By selecting the optimal method for the footprint of each write request it is possible to ensure that the number of packets (ISS or CSS) that is required to encode the new codeword never exceed half the count of ISS per codeword.

Multicast Burst Protocol

Most networked applications use TCP/IP to avoid the inherent unreliability of UDP/IP. The reliability of TCP/IP imposes restrictions (greater overhead, point-to-point connections, no multicast, unable to take full advantage of NIC bonding, etc.) that outweigh its benefits for the present invention. The Multicast Burst Protocol (MBP) in the present invention provides the reliability of TCP/IP communication over UDP/IP multicast. The MBP uses UDP/IP multicast, NIC bonding and Inference to maximize performance and reliability. It overcomes the limitations of UDP/IP including lost packets, out-of-order packets, duplicate packets and corrupt packets. These limitations when improperly managed result in packet retransmission (thus inefficient bandwidth usage) and timeouts waiting for packets that will never arrive.

UDP/IP multicast is the ability for several hosts (a cluster of peers in the present invention) to form a group for the purpose of sharing network packets. A packet transmitted to a multicast group will be simultaneously received by all the members (subject to UDP/IP artifacts). The bandwidth savings are tremendous over the TCP/IP alternative of repeating the transmission for each host in the cluster. The benefits grow as the cluster grows and as the amount of I/O grows.

NIC bonding is the abstraction of multiple NICs on a single computer into a single virtual NIC interface. Network I/O through this interface can be evenly distributed across all the NICs thereby increasing the overall network performance. Without NIC bonding a networked application would only be able to use the bandwidth of a single NIC at a time even though there may be several available. Most networked applications use TCP/IP which is unable to take advantage of NIC bonding due to the management of its packet window (TCP/IP internals: packet ordering, time-out management, congestion management, application throttling). The present invention uses UDP/IP and manages its own packet window (Burst) thus it is able to take full advantage of NIC bonding to multiply its network bandwidth almost linearly with the count of NICs available. Another advantage of NIC bonding is the added resiliency it provides. When a bonded NIC fails, it is abandoned but the bond interface continues to function as long as there are operational NICs.

The UDP/IP protocol is connectionless so there it has no inherent method to ensure that multicast packets are received by all the peers and this task is left to the applications. For this reason it is usually necessary for a receiver to transmit ACK packets to the sender to confirm the receipt of the packets (of course the ACK packets themselves can be lost). ACK packets are significant performance impediments in network communications as they require additional network overhead and run the risk of exacerbating UDP/IP artifacts. The present invention minimizes the number of ACKs by requiring a single ACK per peer for a write Burst and none for a read Burst. The ACK for write Burst is necessary because most of the time the master performs synchronized I/O and must have confirmation that the burst has been processed and stored. Read Bursts require no ACK because the master inherently has confirmation that all the packets were read. In a read Burst, the slave peers that complete their transmissions are never sure that the master (or other peers in the cluster) has received every packet. Therefore upon completion of their Actions in a read Burst, slave peers retain the Burst context while waiting for the next read/write request from the master or a NACK packet.

Time-outs are major performance impediments in network communications. A single 10 ms time-out corresponds to a lost opportunity for megabytes of data transfer with gigabit Ethernet and multiple bonded NICs. The present invention reduces time-outs through the process of Inference whereby ancillary packets multicast by the peers in the cluster are used to infer the packets that were missed without incurring a time-out and without additional communication.

The MBP is divided into three components: the first is the master that initiates requests and runs on clients, the second is the slave that responds to requests and runs on cluster peers and the third is the core that implements functionality shared by the master and the slave. Any peer in the cluster can also run the master component alongside the slave component.

An MBP Burst comprises the exchange of MBP packets (FIG. 21A) among the peers in the cluster (slaves) and the application driving the Burst (master). A Burst is initiated by the application driving the I/O such as a database engine, a mail server, etc. In response to a request, the master sends to the peers a corresponding request specifying the command type (read/write), the starting position in the file and the byte count. The master assigns a monotonically increasing number to each Burst that serves as the Burst identification. Stale Burst identifications are one criterion by which obsolete UDP/IP packets are detected. The packets of the Burst are described in the Actions of each peer. At the start of a Burst each peer knows the packets it expects to transmit and the packets it expects to receive as well as the optimal corrective measures required when there are peer failures. As previously described, when there are no peer failures the Actions fully describe the Burst. The first opportunity for Inference occurs when some peers miss a read or write request of a master. Instead they receive a packet from one of the slave peers and derive from the packet header the data needed to join the burst in mid-stream: the command type (read/write), the starting position in the file and the byte count. Through the new (greater) Burst identification in the packet they are able to determine that a new Burst is in progress.

One mechanism that is used throughout the life of a Burst is Inference. Inference is used when packet loss has occurred and other packets that are received are used to infer the information of the lost packets. Most of the time when a packet is lost the result is that some peers in the cluster missed the packet, but others received the packet. Inference occurs when a peer misses a packet but upon receiving response packets from other peers in the cluster it is able to derive the lost packet and adjust its state accordingly. Inference avoids time-outs and NACKs. The opportunities to apply Inference are described individually. Note that the packet could be lost or out of order due to UDP/IP artifacts. If the packet is out of order and is later received it will simply be ignored as the peer will have already adjusted its state. However the out-of-order packet will be checked for conformity to the current state as applicable. Note also that when all the peers miss the packet a time-out occurs after which either the slaves or the master (or both) will NACK as appropriate.

An MBP Burst has three stages.

Stage 1 uses the Actuator to compute the initial characteristics of the Burst as described by the Actions. This stage produces identical results on all peers in the cluster. The known peer failures as described in the Rotation are taken into account, and the assumption is made at this stage that no repairs are necessary even if some peers are failed. The Actions produced assume that the CSS peers rotationally designated for the repairs of the codewords in the Burst have the necessary GP's. Note that the Cache assigns greater weight to GP's than dirty and clean pages of a given priority, but it is possible for any pages from a higher priority to replace a GP. Every codeword in the Burst materially affected by a peer failure is marked as undescribed pending the completion of Stage 2. There are no undescribed codewords when there are no material peer failures. If this is a write request a determination will be made for the lead/trail partial codewords as to whether re-encoding or de-encoding is more efficient. By the end of Stage 1 all the peers in the cluster have computed the Actions of all the peers in the cluster and are implicitly synchronized by construction without any inter-peer communication. All the active peers in the cluster advance from Stage 1 to Stage 2 automatically.

Stage 2 resolves all undescribed codewords. All CSS peers rotationally designated for repairs confirm the availability of the GP in their local cache through its multicast transmission (this applies only to material ISS on failed peers). Peers lacking a GP will transmit a CSS packet to indicate to the cluster that repairs must be performed to reproduce the missing ISS. Only the message header is transmitted if the peer's CSS is not required by other peers to perform repairs. If required, the CSS is added as payload to the packet. When ISS peers for a given codeword receive a CSS packet it is an indication that the corresponding codeword must be repaired. The ISS peers add an Action for this codeword and maximize their footprint and all peers increment the material segment count and the expected packet count. The CSS peers aggregate all old ISS/CSS/GP required to perform repairs and transmit their repaired GP's as necessary. By the end of Stage 2 there are no undescribed codewords and the Burst can proceed to the next stage.

There are several opportunities for Inference in stage 2. ISS that missed a CSS packet but see a packet from an ISS peer previously not material for this codeword or a packet from a material ISS peer with a maximized footprint, infer that they also must add an Action or maximize their footprint. Note that if there are multiple peer failures any CSS packet will cause the ISS peers to add an Action or maximize their footprint.

Stage 3 fulfills the Burst. If this is a write request, the peers rotationally store their designated ISS as well as compute and store their CSS. An ACK packet is transmitted to the cluster by each peer that completes all its Actions. It this is a read request, the peers transmit their material ISS/CSS in sequence. Forward Error Correction (FEC) occurs at this stage. If the Burst is a write request, the CSS peers will have aggregated the necessary segments to repair/encode the leading and trailing Actions describing partial codewords. If the Burst is a read request, each peer multicasts its material segments and aggregates those of the other peers. When all the active peers have completed their multicast, repairs can proceed as indicated by the Rotation. Repaired segments are then multicast. By the end of Stage 3 the Burst is fulfilled and the final I/O status is reported to the application through the VFS.

Stage 3 Inference opportunities include read request Bursts when peers infer packet losses by detecting unexpected Burst transmissions. Also in read request Bursts a new Burst is detected when a new request from the master is received or when a reply to such a request is received from another peer in the cluster. Another inference opportunity occurs as a Burst is received and the expected sequence of packets arrives with packets gaps. The system infers whether the missing packets are due to packets arriving out of order (e.g. the packets are still in transit) or whether the gaps are due to packet loss. The MBP protocol will always transmit the sequence of packets in a Burst in order and thus under optimal conditions the packets are expected to arrive in order as well. It is important for the system's performance that no time-outs occur while waiting for packets that are lost. The UDP/IP protocol defines that packets from node n to node m that go through one or more routers may not be routed the same way every time. The routers may direct the packets onto different paths based upon the network congestion when the packets arrive, or they may delay or drop the packets altogether. This explains why the sequence of packets $P_{i=0, \ldots k-1}$ transmitted from node n may arrive out of order at node m. How far out of order a packet can arrive is related to LAN throughput since network congestion introduces delays and changes the packet ordering. The basis for the inference is the count of packets received that are sequentially beyond the first gap. A small count of such packets may only be a symptom of packets that were routed onto a congested network path. If the count grows beyond a configurable threshold the system infers the loss of the missing packets and requesting their retransmission is more efficient than incurring a time-out and then requesting their retransmission.

Through all three stages of a Burst peer failures are detected and the cluster automatically adjusts and recovers. A peer failure is a rare occurrence that can be detected by any peer either through an I/O error or through a time-out. A failed-peer message is then multicast to the cluster and an ACK is expected of every active peer including the master. The Burst is rolled-back if it is a write request from the master so the encoding can restart from the original state of the file. Rolling back a Burst is limited to rolling back the leading and trailing Actions describing partial codewords because these require old values from the cluster to encode. The middle Action can be re-initiated without roll back as the codewords are complete and no old values are necessary. Upon receiving all the necessary ACKs, the Codec dispersal matrices, the Rotation and peer sequence are recomputed and the Burst is reinitiated. This peer failure detection and recovery process occurs transparently to the driving application as long as sufficient peers remain for FEC to proceed.

Write Bursts are a sequence of packets where the first and last packets can contain either a whole codeword's IS or a partial codeword's IS. The packets in the middle of the sequence can only contain whole codewords that by definition completely overwrite any previous values. The peers process packets with whole codewords by storing their corresponding ISS or generating their corresponding CSS as rotationally indicated. The processing of whole codewords requires no interaction between peers and they proceed independently regardless of any peer failures. When a packet contains a partial codeword the ISS peers can store any applicable IS, but the CSS peers are unable to encode the IS without interaction with the ISS peers as described in the High-Performance Reed-Solomon Codec disclosure. ISS peer failures that are material to the partial codeword complicate the interaction as the failed ISS peers are not available to provide the IS overlapping or complementary to the partial codeword footprint. The CSS peers that are rotationally tasked with repairing the material failed ISS peers are material. Only the material CSS peers know whether the corresponding GP is available in their Cache at the time codeword is processed. The GP is unavailable if this codeword was not overwritten since the peers failed (as there would have been no need to generate the GP), or if the GP page was reclaimed by the Cache for a higher priority page. The steps followed by material peers for a partial codeword during a write Burst are as follows.

Step 1 (FIG. 21C) is to ascertain the availability of the corresponding GP in the Cache (2140). This step is performed (2141) by all the material CSS peers. A goal of this process is to generate and Cache a GP when it is not available so it is available to speed up future writes to this codeword. Every GP that is available decrements the failure count is decremented for purposes of repairing the codeword as the corresponding peer failure has effectively been overcome. If the GP is unavailable (2142) the cluster must be notified and the GP must be generated. If there is only one peer failure (2145) then no other CSS peer has to regenerate a GP so it is sufficient to notify the cluster by transmitting (2151) a MBP Message Header with a type of MBP_MSG_TYPE_CSS and a Packet Size of zero. Otherwise the CSS must be transmitted (2150) to possibly assist other CSS peers in regenerating their GP's. If the GP is available (2144) it must be transmitted to the cluster so other CSS peers can update their CSS. If there is only one peer failure (2149) then no other CSS peer has to regenerate a GP so it is sufficient to transmit the part of the GP that is material (e.g. overlaps the write footprint). Otherwise the whole GP must be transmitted (2148) to possibly assist other CSS peers in regenerating their GP's. The ISS peers whose rotational task to transmit the entire old ISS is predetermined (2143) perform the transmission (2152) and otherwise wait (2153) to aggregate CSS peer notifications. The ISS peers ignore message of type MBP_MSG_TYPE_GP as they entail no additional tasks beyond decrementing the peer failure count for the codeword. Upon receiving a message of type MBP_MSG_TYPE_CSS all ISS peers become material as they must assist the CSS peers in reconstructing their GP's. At the conclusion of step 1 all ISS peers know whether they should transmit their old ISS and how big a footprint to transmit. At the conclusion of step 1 all CSS peers know whether they should transmit a CSS or a GP and how big a footprint to transmit or transmit nothing for those CSS peers that are not material. The CSS peers also know whether they must participate in the repair of the partial codeword or only provision for other CSS peers to perform repairs. They also know whether to complete the write they must encode the whole codeword or only de-encode/re-encode the overlapping old footprint.

Step 2 (FIG. 21D) is to provision the codeword repairs (2160) and is performed by all material peers (2161). All material ISS peers (2165) transmit their old ISS (e.g. before the write is applied) up to the footprint computed in step 1. All CSS peers transmit (2164) as rotationally tasked their CSS (2166) or wait for cluster provisioning (2167). At the conclusion of step 2 all CSS peers have sufficient symbols (e.g. a combination of ISS/GP and CSS) to perform repairs.

Step 3 is to perform the repairs. All CSS peers perform repairs and transmit the repaired segment as rotationally tasked. Note: no repairs are performed by any CSS peers with a GP. At the conclusion of step 3 the CSS peers have sufficient symbols (e.g. ISS/GP) to complete the write request.

Step 4 is to complete the write request. All CSS peers generate the CSS corresponding to the new partial codeword IS. All CSS peers as rotationally tasked retain the updated GP's in their Cache. All material ISS peers have updated their ISS in their Cache. At the conclusion of step 4 all peers have completed the write request.

Consider (FIG. 21E) an eight-peer cluster with five peers storing ISS and three peers generating CSS on a rotational basis. In this example the ISS peers storing ISS1 (2180) and ISS2 (2182) have failed and CSS0 and CSS1 are tasked with their respective repairs. The client requests a partial codeword write (2181) that partially overlaps ISS1 and ISS2. If there were no peer failures the old values of ISS1 and ISS2 would be multicast to regenerate CSS0, CSS1 and CSS2. The peers storing ISS0, ISS3 and ISS4 are not material as they assume all both GP's are available so they wait for confirmation from CSS0 and CSS1.

For a first example define that CSS0 has the GP for ISS1 but CSS1 does not have the GP for ISS2.

Step 1: Ascertain GP Cache.
A. CSS0 discovers it has GP (ISS1).
1. CSS0 decrements the count of failed peers from two to one.
2. CSS0 transmits the whole of GP (ISS1) because the count of failed peers is not zero.
3. All the peers receive GP (ISS1) and decrement the count of failed peers.
4. CSS0, CSS1 and CSS2 aggregate GP (ISS1).
B. CSS1 discovers it does not have GP (ISS2).
1. CSS1 transmits the notification CSS1 without a payload because the count of failed
peers is one and it is tasked with repairing the failed peer. Note if CSS 1 had not yet
received GP(ISS1) it would have transmitted the whole of CSS1.
2. CSS0 and CSS2 aggregate CSS1 if transmitted.
3. ISS0, ISS3 and ISS4 become material peers.
Step 2: Provision Repairs.
A. ISS0, ISS3 and ISS4 transmit their segments.
Step 3: Perform Repairs.
CSS1 repairs ISS2 (generates GP (ISS2)).
CSS1 transmits GP (ISS2).
CSS0 and CSS2 aggregate GP (ISS2).
Step 4: Complete the Write Request.
A. CSS0, CSS1 and CSS2 use the old values GP (ISS1) and GP (ISS2) along with the new values provided by the client in the write request to generate the new CSS0, CSS1 and CSS2.

For a second example define that neither CSS0 nor CSS1 have GP's.
Step 1: Ascertain GP Cache.
A. CSS0 discovers it does not have GP (ISS1).
1. CSS0 transmits CSS0 because the count of failed peers is not zero.
2. CSS1 and CSS2 aggregate CSS0.
3. ISS0, ISS3 and ISS4 become material peers.
B. CSS1 discovers it does not have GP (ISS2).
1. CSS1 transmits CSS1 because the count of failed peers is not zero.
2. CSS0 and CSS2 aggregate CSS1.
3. ISS0, ISS3 and ISS4 become material peers.
Step 2: Provision Repairs.
A. ISS0, ISS3 and ISS4 transmit their segments.
Step 3: Perform Repairs.
A. CSS0 repairs ISS1 (generates GP (ISS1)).
B. CSS0 transmits GP (ISS1)\
C. CSS1 and CSS2 aggregate GP (ISS1).
D. CSS1 repairs ISS2 (generates GP (ISS2)).

E. CSS1 transmits GP (ISS2).

F. CSS0 and CSS2 aggregate GP(ISS2).

Step 4: Complete the Write Request.

A. CSS0, CSS1 and CSS2 use the old values GP (ISS1) and GP (ISS2) along with the new values provided by the client in the write request to generate the new CSS0, CSS1 and CSS2.

Every MBP packet has a MBP Message Header (2100) that describes the context of the packet. The MBP Message Header comprises two parts: the Burst descriptor and the message descriptor. The Burst descriptor is included to overcome UDP/IP packet loss by enabling any peer that missed the client's original Burst request to derive it from any other peer's reply. The Burst descriptor specifies the Burst Number (2101) which is incremented by the client every time a new Burst request is transmitted to the cluster. The VFS Byte Count (2111) describes the count of bytes requested and the VFS File Position (2112) describes the starting position in the file. Only the client stores its current file position so that no seeking command (e.g. seek, lseek, etc.) has to be sent to the cluster. Instead every read and write request specifies the starting VFS File Position that the cluster peers convert to an offset within a codeword through modulo arithmetic using the size of the IS payload of a codeword and if necessary adjust the local file pointer to that codeword.

The Message Type (2102) is the data member of the MBP Message Header used to describe the packet. When the client initiates a session the Message Type (FIG. 21B) MBP_MSG_TYPE_SIDREGISTER (2128) is specified along with the new session number and when the session is torn down the Message Type MBP_MSG_TYPE_SIDUNREGISTER (2129) is specified along with the session number. When the client initiates a read Burst the Message Type MBP_MSG_TYPE_RECVRQST (2127) is specified along with the VFS Byte Count and the VFS File Position. When the client initiates a write Burst the Message Type MBP_MSG_TYPE_XMITRQST (2126) is specified along with the VFS Byte Count and the VFS File Position. When a packet carries a payload is specifies MBP_MSG_TYPE_ISS (2120), MBP_MSG_TYPE_CSS (2121) or MBP_MSG_TYPE_GP (2122) depending upon the segment type and MBP_MSG_TYPE_XMITHMF (2125) if the payload is HMF data. When a client transmits a read Burst no ACK is necessary as the peers remain prepared to re-transmit any part of the Burst requested or proceed to the next Burst when that request is received. For a write Burst it is necessary for the peers to indicate that they have received the Burst completely and completed the necessary encoding by transmitting a packet specifying MBP_MSG_TYPE_SAVEACK (2124). Depending upon the configuration, the MBP_MSG_TYPE_SAVEACK message from the peers to the client indicates that the Burst has been moved to the Cache or that the Burst has been written to disk. When a peer or client determines that it has not received some packets that it expected it compiles a list of the missing packets and transmits that list as part of a MBP_MSG_TYPE_XMITNACK (2123) message with the Packet Count (2104) specifying the count of packets missing from the Burst and the payload containing the corresponding list of missing packets. When a peer does not respond after repeated request, it is deemed to have failed and a message of type MBP_MSG_TYPE_PEERFAILURE (2130) with the Destination Peer Number (2103) specifying the failed peer number is multicast for all peers and clients to receive.

As previously explained the present invention uses UDP/IP for all communication in order to benefit from its multicast capabilities. Another advantage of UDP/IP over TCP/IP is that because it is connectionless it does not require a dedicated socket on each peer per client session. Each socket consumes operating system resources so that each peer would require one socket per client session and one socket per peer and similarly each client would require one socket per peer per session. It is impossible for most operating systems to support thousands of simultaneous sockets. In the present invention a session comprises all the I/O transactions performed on a file from the opening of the file, through reading and writing and finally closing the file. A session is created when a file is first opened and terminated when the file is closed. A Session Identification (2109) is a session counter that is unique within the domain of a single client and incremented by the client upon the creation of each new session. A Session Identification uniquely identifies a client session to the cluster when it is associated with a client network address (e.g. Session Identification x on client y). All packets exchanged between a client and the cluster specify a Session Identification in the MBP Message Header. When a MBP packet is received the address of the computer that sent it is available and is coupled with the Session Identification in the MBP Message Header to identify the session context including the Burst. A Single MBP socket per computer (e.g. client or peer) is sufficient to transmit and receive packets for all client sessions. Note that a single socket does not imply a single network interface; multiple network interfaces on a single computer can be leveraged by a single socket through trunking.

Every packet specifies the Source Peer Number (2110) and the Destination Peer Number (2103). The peer number is assigned to the peers that are active at the time a file is first created. A peer can have different peer numbers for different files. The peer number is used to identify a peer when computing its rotational tasks. In an n-peer cluster, the peers are identified as peer 0 through peer n−1, the client is identified as peer n and peer−1 (all bits turned on) indicates that the packet is for the entire cluster.

In the context of the packet, the Packet Count (2104) specifies the count of packets in the Burst. The Packet Number (2105) identifies the packet in the stream of packets. The Packet Offset (2106) identifies the offset within a segment (ISS or CSS) of the packet payload. The Packet Size (2107) specifies the size of the Packet Payload (2113), if any.

The Packet Checksum (2108) is the checksum of the packet computed over the MBP Message Header (with a NULL Packet Checksum) and the Packet Payload.

Packet Multicaster/Demulticaster

This subsystem comprises hardware and software for shaping the storage IP network traffic. In one embodiment (FIG. 17A) it comprises a computer with two network ports and a network switch. In another embodiment it comprises software embedded within a switch or router (FIG. 17B). It is located between the cluster and the rest of the network. One network port is connected to the switch to which the cluster peers is connected. The other network port is connected to the clients via the LAN. In yet another embodiment (FIG. 17C) it is integrated within each peer of the cluster where each peer has one or more network ports are connected to the client LAN (1750) and one or more network ports are connected to the cluster LAN (1760) via one or more network switches (1770). The main use of this subsystem is the elimination of multicast packets outside the cluster. These packets could cause network performance degradation for computers whose NIC's are not able to filter them out. Such NIC's will not determine at the hardware level whether the multicast packets are relevant to their host. They will let the kernel's network subsystem software make this determination thereby introducing unnecessary overhead. Another consideration for converting the multicast packets to unicast is that by default, multicast packets are sent with a time-to-live (TTL) of 1, which prevents them from being forwarded beyond a single sub-network. Setting the appropriate TTL value requires an in-depth understanding of the topology of the network as routers may not forward multicast packets otherwise.

The solution to both these problems is to convert UDP/IP multicast packets to UDP/IP unicast packets by changing the destination address from a multicast-range address to a unique host address. All packets conforming to the communication protocols of the present invention indicate two destination addresses. The first is the address the packet is sent to via the network subsystem. The second, found in the header of the packet payload, is the address of the intended client. Thus a multicast packet could specify in the secondary address a unicast host address and conversely, a unicast packet could specify a multicast group as the secondary address.

Packets originating from the within the cluster (e.g. outbound) are received through the switch port (FIG. 18B). When a packet (1840) is multicast, the switch will ensure that it is received by all the peers in the cluster. When a packet (1870) specifies a unicast secondary address, it is used to forward the packet as a unicast packet for its destination client. Sometimes outbound packets are unicast in which case they are simply forwarded with no modifications. When a packet (1860) specifies a multicast secondary address the packet is an intra-cluster packet and it is not forwarded by the Packet Multicaster/Demulticaster to the client LAN. Intra-cluster packets occur when additional ISS/CSS beyond the client I/O request must be transmitted for a repair or partial codeword write. They also occur exclusively during the healing and restriping processes. Healing and restriping are not requested by a client and may transmit the entire content of the cluster.

Packets originating from clients outside the cluster (e.g. inbound) are received through the client LAN port (FIG. 18A). Such packets are always unicast and never multicast by the clients. When a packet (1820) specifies a multicast secondary address it is forwarded as a multicast packet through the switch port for the cluster peers to receive. When a packet (1830) specifies a unicast secondary address the packet is simply forwarded to that multicast address through the switch port. Thus the present invention benefits from the tremendous bandwidth savings of the UDP/IP multicast protocol without impacting the rest of the network. For scalability and resiliency purposes multiple Packet Multicaster/Demulticaster systems are aggregated within a single storage system.

I/O Cache

Typically a storage cache is memory used to optimize access to the persistent storage by buffering data in order to minimize slower I/O transactions to the HDD. The data resides in pages in the cache that map to disk blocks. Each disk block address is a unique identifier. When an application issues a read request, the requested blocks are looked up in the cache. If they are found, the cache is used to satisfy the read request otherwise the blocks are read from the HDD into the cache. It is also possible to configure the cache to read more contiguous disk blocks than requested to take advantage of the efficiency of sequential access to the HDD's. Pages read from disk are marked clean to indicate that they need not be written again. Similarly when an application issues a write request, the requested blocks are buffered in the cache and not necessarily written immediately to the HDD's. The cache pages buffering the write request are marked dirty to indicate that they need to be written to disk. Access to the cache memory is much faster than access to the HDD's, but the capacity of the cache memory is much smaller than the capacity of the HDD's. The cache capacity is eventually exhausted and existing cache pages must be flushed in order to make space for new I/O requests. Several methods exist to determine which pages to flush. The flushing can consist of removing clean pages first as these do not need to be written to disk and as a last resort writing dirty pages to the HDD's. Most methods are variations of the Least-Recently-Used (LRU) algorithm.

The Cache in the present invention (FIG. 26A) can be configured to buffer reads and writes, only reads, only writes, or neither reads nor writes. It can be configured to read ahead (pre-fetch) a number of contiguous blocks when reading and to pool a number of contiguous blocks to flush (e.g. write to HDD). The Cache defines three Page Types: clean, dirty and golden. The pages of type clean and dirty have the usual connotation and can contain either CSS or ISS. The pages of type golden contain only the ISS of failed peers as computed by a rotationally designated repair CSS peer. The golden pages are expensive to produce as they require additional network I/O among the active peers and codec computation. The golden pages are never written to HDD's as by definition their storage has failed. They are created when there are peer failures as part of the repair process of I/O transactions. They are cached to avoid the overhead of recreating them. Within their respective priority levels, golden pages are the last to be freed when capacity is exhausted as they are the most expensive to reproduce. Golden pages are freed as the healing and restriping processes generate ISS and the page is no longer needed. A Cache Hash Table is used to lookup pages by Cache Id in the Cache.

A Cache Page Entry (FIG. 26B) is part of three linked lists (2610). The Inode Page List is used to lookup Cache pages from the perspective of a file (e.g. for purposes of flushing upon closing the file). The Hash Page List is used to lookup Cache pages from the perspective of Hash table collisions. The Priority Page List is used to lookup Cache pages from the perspective of a priority level (e.g. for purposes of flushing to HDD in order to free it up for a higher priority level). A Cache Page Entry also specified the Page Id, Page Type and the Page Data (content). The Page Data is augmented with a checksum to detect corruption of the data as described in Transient Error Repairs.

There is only one priority level by default (as is the case with the Virtual Block Device embodiment). The Cache Priority Entry (FIG. 26C) describes the pages associated with a priority level. The Clean Pages List is used to lookup the pages that were not modified after being read from disk and do not need to be written to disk before being freed. These are the cheapest pages to reallocate in order to satisfy a higher priority level. The Dirty Pages List is used to lookup pages that must be written to disk before being freed. These pages are more expensive to reallocate in order to satisfy a higher priority level than Clean Pages. The Golden Pages List is used to lookup pages that must not be written to disk before being freed. To recreate them would require several network packets, possibly disk I/O on other peers as well as computational overhead. These pages are the most expensive to reallocate in order to satisfy a higher priority level than Clean Pages.

Transient Error Repairs

There are a variety of I/O errors that can occur that are recoverable even if they are not controllable (e.g. HDD bad blocks, HBA errors, network errors, phantom writes/reads, etc.). Some errors are not detected by the underlying I/O systems. While such silent errors are very rare, their rates of occurrence increase in proportion to the workload and the scale of the I/O systems (reference: Google's experience with their own massive clusters). There are three primary relevant I/O systems: memory (RAM), storage (HDD/HBA) and network (NIC/switch). The use of ECC memory ensures that this subsystem is self-correcting. Storage systems generally have weak protection against undetected I/O errors. When available at all, the common means of protecting against such errors is through a checksum or CRC computed on the payload. A checksum is computed at the time the payload is created (e.g. as it is stored on the HDD or as it is packetized for network transmission) and associated with the payload (e.g. stored or transmitted). The checksum is recomputed at the time the payload is received (e.g. as it is read from the HDD or from the NIC). When a mismatch between the expected checksum and the computed checksum is detected, an error is generated thereby causing the I/O to fail. For most systems such an error is fatal except where a mirrored I/O system is available (e.g. RAID) in which case a fail-over occurs to the secondary system and the primary system is abandoned.

The present invention is able to detect and repair most I/O errors to avoid a peer failure. The failure of a peer is a burden on the performance of the cluster as repairs must be performed while the peer is unavailable and continue once the peer rejoins the cluster until it is healed. Peers failures occur mostly for reasons that are not controllable or recoverable (e.g. power loss, kernel crash, network loss, etc.).

In the present invention a 64-bit checksum is computed for every page (segment) written and read through the Cache as well to every packet transmitted via the network. This checksum ensures that:

Disk I/O:
When a page written through the Cache, a checksum is computed and written.
When a page is read through the Cache, its checksum is read and verified.

Network I/O:
When a packet is transmitted, a checksum is computed and transmitted.
When a packet is received, its checksum is received and verified.
NACK the transmitting peer to retry (up to a max) the transaction.

When an I/O error is detected, the originating peer has no means to take corrective measures on its own beyond attempting the I/O a second time. I/O errors are repaired by the cluster as though the originating peer failed for that codeword only. The originating peer continues to actively participate in all other I/O transactions.

Added security is another benefit of the checksum. When a file is corrupt or modified the checksum are invalid. Other systems use the MD5 algorithm to compute the overall file checksum which limits them to a binary result (yes/no) when verifying the contents of a file. The present invention can tell not just that the file was changed, but which pages were changed (therefore what the changes made were) and reproduce the original content through cluster repairs.

Description of the First Embodiment:

The first embodiment is a virtual file system that stripes files across a cluster of peers. It has unlimited scalability in performance, capacity and resiliency through the addition of peers. Peers can be added (and removed) at any time without disruptions subject to the FEC level limits that are configured. Each peer added provides additional storage capacity, network bandwidth and processing power thus providing sustained scalability. Conventional file systems can be mounted by several VFS yet they retain exclusive control of their storage so when they fail all the VFS also fail. In the present invention the cluster can be mounted the by multiple clients yet no single peer owns the storage so when peers fail no clients fail thus providing higher resiliency.

VFS Cluster Locks

In a conventional file system (e.g. one in which the entire file system resides on HDD's controlled by a single kernel), the file system arbitrates between competing requests for access to files and directories through file locks and arbitrates for access to kernel-mode structures through semaphores and mutexes. File locks (e.g. in UNIX/Linux flock and lockf/fcntl, etc.) are used by applications to acquire access (e.g. shared or exclusive) on an entire file or only a portion thereof. The software implementing locks is part of the kernel and operates on file system structures of the kernel (e.g. in Unix/Linux inodes, etc.). A kernel-mode thread attempting to access file system structures must guard against other kernel-mode threads attempting to access the same structures.

For a file lock example consider two (or more) processes running applications that seek exclusive (write) access to the same file under a conventional file system. Only one process can be granted exclusive access at one time. If the requests are sufficiently spaced in time, the first process will be granted a lock by the file system and the remaining processes will not (e.g. they may block until the lock is released or fail). The requests may be sufficiently close in time that the file system has not completed the first request before the other requests are received. The file system is protected from concurrent access to its data structures through the use of kernel semaphores and mutexes.

The present invention presents to the applications a VFS that stripes files across a cluster of independent computers each running its own native file system as part of its kernel. The locking of a file as well as a semaphore and mutex must apply across the entire cluster for the arbitration to be valid. Consider the previous example of multiple processes running on separate computers seeking exclusive access to the same virtual file. As each peer receives the first request, it ascertains that no conflicting lock was previously granted and votes to grant the lock. Subsequent requests are denied though the lock is not yet granted. It is not possible for a peer to grant the lock until all peers vote to grant the lock.

If the requests are sufficiently spaced in time, each peer in the cluster will ascertain that there is no conflict and vote to grant the lock. The voting is implemented as a UDP/IP multicast, so all peers (including the computer requesting the lock) are able to tally the votes and grant the lock without further communication.

The complexities arise when the conflicting requests are sufficiently close in time that the peers do not all receive the requests in the same order (e.g. due to network artifacts) and do not vote in unison. Some peers will have to alter their votes so that one request is granted the lock. Several scenarios are possible as the votes of the multiple conflicting requests are tallied: (a) the request that has received a simple majority of the votes is identified and the peers switch their votes accordingly; or (b) after all peers have voted no request received a simple majority (e.g. more than two concurrent requests) so the request with the greatest vote count is identified and the peers switch their votes accordingly; or (c) two or more requests tied for the highest vote count so the request with the lowest lexicographical transaction id is identified and the peers switch their votes accordingly.

As usual care must be taken to overcome UDP/IP artifacts without incurring time-outs and packet retransmissions. One possibility is packet loss due to the original lock request being missed by some peers in the cluster. The replies of the peers that did receive the request include sufficient information to reconstruct the request. Thus if the one request packet is missed by some peers in the cluster, the (several) replies by the peers that did not miss the request can be used as a substitute request and a reply. Another possibility is that vote packets arrive out of order. To overcome this each peer assigns a packet number so that duplicate and out of order packets are ignored by the cluster. To minimize chatter, vote switches are implemented as regular votes that identify the request receiving the vote but do not specify the request losing the vote. When a vote is received, all conflicting requests are checked to ensure that previous votes are cleared.

Cluster locks are used in the present invention as a means of locking files as well as a means of implementing semaphores and mutexes. The difference is that a request to lock a file can only occur after a file is opened, whereas a semaphore or mutex request refers to a uniquely identified abstract resource. For example when the cluster receives a request to rename a file, it is possible that a concurrent request to open the file is also received. Depending upon the order in which each peer receives the packets, the open request may succeed on some peers and fail on others. The present invention uses a mutex to protect the file's parent directory before the file is renamed or opened thus insuring the cohesiveness of the cluster.

Sending a cluster lock request (FIG. 22) starts by looking up the resource (e.g. inode) (2205). If the resource is not found an error (2215) is returned as its path must have been walked by the file system prior to requesting a lock. The request could be to release a previously awarded lock (2225), in which case the lock is looked up (2240). If the lock is found a request to release it (2255) is sent to the cluster, otherwise no error is returned. If the request is not to release a lock it can only be to test for the availability of a resource or to lock a resource. Either way we must first check whether the request conflicts with another lock (2235). If there is a conflict but the request was just to test (2250) we can simply return an error (2270). If there is a conflict and the request was to lock then we must check whether the requestor is prepared to wait for the lock to be released (2265). If the requestor cannot wait we return an error (2270), otherwise we remember the lock request (2254), send the request to the cluster (2260) and wait for the cluster to grant the lock (2275).

Receiving a cluster lock request (FIGS. 23A & 23B) is a bit more complex that sending a lock request. Due to UDP/IP artifacts, a reply to a lock request may be received by a peer that has not received the original request. To overcome this possible problem requests and replies are processed the same way (2300). We first lookup the resource (2302) as when sending a request and return an error (2303) if the resource was not found. If the resource was found we look up the lock (2305). If the request is to release a lock (2306) and the lock was found (2307) the lock is released (2310) and any locks that were blocked waiting for this lock are queued up (2311). If the request is not to release a lock it can only be to test for the availability of a resource or to lock a resource. Either way we must first check whether the request conflicts with another lock (2309). A request is to test a lock is ignored unless it comes from the request originator (2313) so as to avoid endlessly replying to replies. If the request is not to test for the availability of a resource we look up the lock (2322).

If the lock was found we check if the peer that sent the message is joining the lock (2323) and if not we remove the peer from having voted for the lock (2324). Otherwise we switch the peer to vote for this lock (2327) which also removes it from any conflicting locks that received this peer's vote. Since this lock has received one more vote, we check to see if it has achieved a majority (2330). If it has we check to see that the local peer is part of this majority (2335). If the peer did not vote for this lock we switch the peer to this lock (2338) and notify the cluster that we are voting for this lock (2341). Either way we check if the lock was awarded (2339) and if not we grant the lock which blocks all conflicting lock requests that can wait and denies those that cannot wait (2342), If the lock was not found we check for conflicts (2321) and if there are conflicts we deny the lock (2326) and if the requestor can wait (2329) we queue up the lock (2333). If there were no conflicts we add the lock to the list of non-committed votes (2320). If the peer that sent the message is joining the lock (2325) we switch it to this lock (2328). We check if the local peer has no non-committed lock conflicts (2332) as we already ascertained that the lock does conflict with a previously granted lock in (2321). If there is no non-committed conflict we switch to the lock and notify the cluster that we are voting for this lock, otherwise we notify the cluster that we deny this lock.

VFS I/O Cache

The Cache in the present invention supports several levels of priority that determine which pages are flushed when capacity is exceeded. This priority can be configured through Access-Control-Lists (ACL's) that are associated with users, groups of users and applications. The Cache is file-aware therefore priority levels can also be associated with files and directories. When the cache capacity is exhausted, the Cache is able to flush pages in order of priority to ensure that critical applications/databases/etc. preserve their performance.

The Cache Config Entry (FIG. 26D) is used to describe a configured priority. It specifies the Cache Mode that determines buffering (e.g. read-only, write-only, read-write, or none). It specifies the Priority level that determines which pages will be sacrificed (freed) to be used by a higher priority level. It also specified the VFS path name of the file-system resource (e.g. file, directory, etc.) associated with this entry.

Healing the VFS Cluster

Some peers may fail and become unable to participate in the cluster transactions. The cluster continues working and makes the necessary computations to regenerate data on the failed peers as needed to fulfill I/O requests. Any change to the data (e.g. write operations) cannot be reflected on the failed peers and therefore their content is stale when/if they rejoin the cluster. The healing of a peer is the process of synchronizing a peer's content (e.g. directories, files, links, etc.) with the rest of the cluster. A peer may have been down for a very short time before rejoining the cluster and have very little data to heal. A peer may have had a catastrophic failure and was replaced by a new (blank) peer for which all the content must be healed. There may not be sufficient replacement peers available for all the failed peers in which case healing will not bring the cluster up to full resiliency and the cluster can be healed again when additional replacement peers are available. There may be more replacement peers available than failed peers in which case healing will bring the cluster to full original resiliency but will not increase the resiliency until re-striping is performed.

There are two ways to heal a peer. One way is to first bring the cluster to a quiescent state during which no application has write access to files as they are healed. This method has the obvious disadvantage that access to the cluster is severely limited with a potentially unacceptable impact on applications. It has the similarly obvious advantage of simplicity for the healing process. The second way is for the healing of the failed peer's content to proceed in conjunction with normal application access to the cluster.

The Heal Utility (FIG. 24A) is a user-mode application that initiates the healing process (FIG. 24B). The Heal Utility reads the VFS root directory (2401) to create the initial healing context. It then instantiates multiple Heal Utility Threads (HUT) and waits for all of them to terminate at which point the cluster is healed. The HUT's traverse the cluster's directory tree to heal the files in each directory, heal the links and finally traversing its sub-directories. The directories are created or deleted as appropriate based upon the vote of the majority of the cluster. If the majority of the cluster thinks that a directory exists, that directory is created otherwise it is deleted. A HUT starts by locking a mutex (2411) so as not to interfere with the other HUT's. It then checks if there is another file to heal (2412). If there is a file to heal, it is removed from the healing context (2414), the mutex is released (2417) so the other HUT's can proceed and the file is healed (2421). If there is no other file to heal, the HUT's check if a subdirectory (2413) to heal next exists. If there is a directory, it is read (2415) and established as the healing context (2418). If no subdirectory is found, this healing context if completed and the HUT's try to move up to the parent directory (2416). If there is no parent directory (the HUT's have reached the top of the VFS tree) the cluster healing is complete (2422). Otherwise, the subdirectory just healed is removed from the healing context (2420) and its sibling directory is healed if one is found (2423) or the HUT's try to move up to the parent directory. This process is repeated by all HUT's until the entire VFS tree is traversed and healed.

To heal a file (2421) a HUT multicasts the HEAL-OPEN message to the cluster causing the creation of a Heal Thread (HT) on each peer. This message is similar to the OPEN message as the peers that successfully open the file transmit their HMF data for validation by the HUT as well as descriptors for all the processes that have opened the file. The HUT compares the MDS signatures of all the HMF's to determine whether a majority is achieved and verify that the peer count is sufficient for the FEC level indicated in the HMF. Any peers that are unable to open the file or have a stale HMF have failed and are designated heal peers that open/create the file for read-write access. The heal peers also duplicate all the process descriptors received. The HUT iterates over the entire file multicasting HEAL-READ message to the cluster. This message is similar to the READ message as the HT's with data multicast their ISS and cooperate to regenerate the ISS missing due to the failed peers. The HT's of the heal peers receive the ISS and based upon the rotation, store their ISS or generate and store their CSS. Thus healing a file occurs simultaneously across all the available peers that need to be healed and uses the same amount of bandwidth whether there is one or multiple heal peers.

An HT is a known service within the present invention so the Cache retains two contexts for a single file: one for applications and one for the HT. The HUT traverses the file from the start sequentially to its end commanding the cluster to heal the file in Bursts of codewords. As a codeword Burst is healed, the HT's move the HUT high-water mark. Any application I/O request above the HUT high-water mark is serviced by the peers not being healed as they are the only ones with content that is not stale. Any application I/O request below the HUT high-water mark is fulfilled by the entire cluster including the peers being healed as they too have valid content and have the necessary process descriptors. When the HUT reaches the end of the file being healed, it terminates.

Re-Striping the VFS Cluster

The count of peers in a cluster is not fixed. It is possible to add peers in order to add capacity of throughput (codec: CPU, I/O: memory, network. HDD, tape, etc.). While this may be the most common reason to change the count of peers in a cluster, it is also possible to remove some peers from a cluster (up to the FEC level). This can be done in order to break it up into two or more clusters or simply because the cluster is underutilized and the peers are needed in another cluster. Whether peers were added or removed, the outcome is the same: the striping of the content on the remaining peers does not reflect the new cluster size. If new peers were added to improve performance or capacity, the existing content must be re-striped before the new peers are leveraged. If some peers were removed, a commensurate loss of resiliency for the existing content has resulted and all I/O to the existing content will incur the overhead of repairs to complete. If sufficient peers are available to reach the new resiliency level then re-striping also results in healing the new cluster.

Similarly to the healing process, there are two ways to perform the re-striping process. One way is to bring the cluster to a quiescent state to re-stripe its content and the preferred way is to perform the re-striping process in conjunction with normal application access to the cluster. The re-stripe service high-water mark is used to determine how an application I/O transaction request can be serviced. There is one significant difference in that the codeword sizes (segment counts) differ above and below the re-stripe service high-water mark. The ramifications are deep as there must be two stripe files per peer with two rotation tables codec's for use by both the re-stripe service and the applications. Any application I/O request below the re-stripe service high-water mark is fulfilled by the entire cluster including the new peers being re-striped as they too have valid content. When the restripe service reaches the end of the file being re-striped, it terminates leaving behind the file access threads it created. Note that re-striping a cluster with failed peers also heals the cluster.

The Re-stripe Utility (FIG. 25A) is a user-mode application that initiates the re-striping process (FIG. 25B). The Re-stripe Utility reads the VFS root directory (2501) to create the initial re-striping context. It then instantiates multiple Re-stripe Utility Threads (RUT) and waits for all of them to terminate at which point the cluster is re-restriped. The RUT's traverse the cluster's directory tree to re-stripe the files in each directory, re-stripe the links and finally traversing its sub-directories. The directories are created or deleted as appropriate based upon the vote of the majority of the cluster. If the majority of the cluster thinks that a directory exists, that directory is created otherwise it is deleted. A RUT starts by locking a mutex (2511) so as not to interfere with the other RUT's. It then checks if there is another file to re-stripe (2512). If there is a file to re-stripe, it is removed from the re-striping context (2514), the mutex is released (2517) so the other RUT's can proceed and the file is re-striped (2521). If there is no other file to re-stripe, the RUT's check if a subdirectory (2513) to re-stripe next exists. If there is a directory, it is read (2515) and established as the re-striping context (2518). If no subdirectory is found, this restriping context if completed and the RUT's try to move up to the parent directory (2516). If there is no parent directory (the RUT's have reached the top of the VFS tree) the cluster re-striping is complete (2522). Otherwise, the subdirectory just re-striped is removed from the re-striping context (2520) and its sibling directory is re-striped if one is found (2523) or the RUT's try to move up to the parent directory. This process is repeated by all RUT's until the entire VFS tree is traversed and re-striped.

To re-stripe a file (2521) a RUT multicasts the RS-OPEN message to the cluster causing the creation of a Re-stripe Thread (RT) on each peer. This message is similar to the OPEN message as the peers that successfully open the file transmit their HMF data for validation by the RUT as well as descriptors for all the processes that have opened the file. The RUT compares the MD5 Signatures of all the HMF's to determine whether a majority is achieved and verify that the peer count is sufficient for the FEC level indicated in the HMF. Any peers that are unable to open the file or have a stale HMF have failed and are designated new peers that open/create the file for read-write access. The new peers also duplicate all the process descriptors received. The RUT iterates over the entire file multicasting RS-READ message to the cluster. This message is similar to the READ message as the RT's with data multicast their ISS and cooperate to regenerate the ISS missing due to the failed peers. All RT's receive the ISS and based upon the rotation, store their ISS or generate and store their CSS in the new stripe files.

Thus restriping a file occurs simultaneously across all the available peers and uses the same amount of bandwidth whether there is one or multiple new peers.

An RT is a known service within the present invention so the Cache retains two contexts for a single file: one for applications and one for the RT. The RUT traverses the file from the start sequentially to its end commanding the cluster to heal the file in Bursts of codewords. As a codeword Burst is healed, the RT's move the RUT high-water mark. Any application read request above the RUT high-water mark is serviced by the old peers as they are the only ones with content that is not stale. Any application read request below the RUT high-water mark is fulfilled by the entire cluster including the new peers as they too have valid content and have the necessary process descriptors. Any application write request above the RUT high-water mark is fulfilled by the old peers as the new peers have no content at this location. Any application write request below the high-water mark is serviced on the old file and the new re-stripe file to guard against data loss. When the RUT reaches the end of the file being restriped, it terminates.

Description of the Second Embodiment:

The second embodiment is a virtual block device (VBD) that stripes data across a cluster of peers. It has unlimited scalability in performance, capacity and resiliency through the addition of peers. Peers can be added (and removed) at any time without disruptions subject to the FEC level limits that are configured. Each peer added provides additional storage capacity, network bandwidth and processing power thus providing sustained scalability. In the present invention the VBD can be divided into several logical units. Each logical unit can be mounted by a single files system. The failure of some peers will not disrupt any of the file systems.

Healing the VBD Cluster

Healing a VBD comprises traversing and repairing all its codewords in sequence. The process is similar to the healing of a VFS file, except that there is only one file and it is implicitly opened and of fixed size. A high-water mark is managed to allow peers in the process of being healed to participate in I/O requests below the high-water mark.

Re-Striping the VBD Cluster

Re-striping a VBD comprises traversing and re-striping all its codewords in sequence. The process is similar to the re-striping of a VFS file, except that there is only one file and it is implicitly opened and of fixed size. A high-water mark is managed so that the new cluster of peers can participate in I/O requests below the high-water mark and the old cluster of peers can participate in I/O requests below the high-water mark. Re-striping can grow or shrink the BVD capacity reported to the file system.

One embodiment of the invention includes at least one of the following:

Actuator

A. A method of computing the minimum storage access required to execute a content request, comprising:

receiving, by a plurality of peers of the system, the content request from a content requestor; and generating, for all peers of the system, a sequence of input symbol segments material to the content request; and if erasure of an input symbol segment has occurred, augmenting the sequence of material segments with the necessary checksum symbol segment per erasure.

A1. The method of clause A, wherein the content request maps to partial leading and/or trailing input symbol segments.

A2. The method of clause A, where the generating of the sequence is done in accordance with a rotational lookup table.

A3. The method of clause A, further including determining which of the plurality of peers are available at a beginning of the sequence generating process.

Cache

B. A method of minimizing storage access, comprising:

caching, by a plurality of peers of the system, symbol segments in memory; and associating with every file a priority level that determines when the cache is full which cached symbol segments will be written to storage;

B1. The method of clause B, further associating a priority level with a set of files.

B2. The method of clause B, further associating a priority level with a directory.

B3. The method of clause B, further associating a priority level with a set of directories.

B4. The method of clause B, further associating a priority level with a user.

B5. The method of clause B, further associating a priority level with a set of users.

B6. The method of clause B, further defining a plurality of priority levels.

Encoding Data Changes

C. A method of regenerating the checksum symbols of a codeword, comprising:

receiving, by a plurality of peers in the system, a plurality of new input symbol that represent changes to an existing code word; and performing one or the other of the following by each of the plurality of peers:
transmitting the old input symbols corresponding to new input symbols then storing the new input symbols, and
transmitting the input symbols complementing the new input symbols, then storing the new input symbols, and
receiving and de-encoding the corresponding old input symbols then re-encoding the new input symbols, and
receiving the input symbols complementing the new input symbols then encoding the entire codeword.

C2. The method of clause C, wherein whether the storing peer transmits the input symbols overlapping or complementing the new input symbols is determined by whether the count of new input symbols represents a majority of the total count of input symbols in the codeword.

C3. The method of clause C, wherein whether the generating peer de-encodes the old input symbols and re-encodes the corresponding new input symbols or encodes the new input symbols and complementing input symbols is determined by whether the count of new input symbols represents a majority of the total count of input symbols in the codeword.

C4. The method of clause C, wherein the storing peer having determined that is must transmit the old input symbols corresponding to new input symbols then determines whether the new input symbols overlap its locally stored input symbol segment.

C5. The method of clause C, wherein the generating peers compute checksum symbols in a manner compatible with the ability to selectively de-encode any input symbols.

Multicast Burst Protocol

D. A method for reliable UDP/IP multicast transmission in a clustered data processing system, comprising:

receiving, by a plurality of peers of the system, content from a content provider; and receiving, by a plurality of peers of the system, a content request from a content requestor; and transmitting, by a plurality of peers, symbol segments stored by the peers so that available ones of the plurality of peers and the content requestor receive the symbol segment;

D1. The method of clause D, where each UDP/IP packet contains a protocol header describing the packet contents as well as the packet sequence; and D2. The method of clause D, where the protocol header of each packet is by itself sufficient to overcome UDP/IP artifacts such as lost, missed, duplicate and out-of-order packets; and D3. The method of clause D, where the protocol header of each packet is by itself sufficient for the plurality of peers to infer the state of the packet transmitter; and D4. The method of clause D, where the transmission of packets to the content requestor require no ACKs to confirm the completion; and D5. The method of clause D, further including determining for partial codewords whether transmitting the overlapping old input symbols or complementing input symbols minimizes packet transmittal.

D6. The method of clause D, where if erasure of an input symbol segment has occurred, buffering the repaired input symbol segments as global pages in the cache to avoid repairing them every time they are requested.

Transient Error Repairs

E. A method of detecting and repairing undetected transient I/O errors in a clustered data processing system, comprising:

writing to local storage, each ones of the plurality of peers computes a checksum that is written along with each symbol segment; and reading from local storage, each ones of the plurality of peers computes a checksum for each symbol segment read and compares it with the checksum read; and transmitting via UDP/IP, each ones of the plurality of peers, includes in the packet header the checksum of the packet; and receiving via UDP/IP, each ones of the plurality of peers computes a checksum for each symbol segment read and compares it with the checksum read; and;

E1. The method of clause E, further including the MBP packet header and the symbol payload in the checksum.

E2. The method of clause E, wherein upon reading from local storage and detecting a checksum mismatch, a peer attempts to read a second time and if a checksum mismatch is detected again, the peer reports an error and terminates all sessions of that file.

E3. The method of clause E, wherein upon receiving a packet via UDP/IP and detecting a checksum mismatch, a peer will request that the packet be transmitted again by its originator.

E4. The method of clause E, wherein upon receiving a packet via UDP/IP several times and detecting a checksum mismatch, the plurality of peers is enlisted to repair the packet and the packet originator is not deemed to have failed.

E5. The method of clause E, wherein if the error occurred while reading from the HDD, upon the packet being repaired the packet originator writes the packet to its storage to make the repair persistent.

Healing the Cluster

F. A method for healing a failed peer by reconstructing its contents, comprising:

receiving, by a plurality of peers of the system, a heal request from a requestor; and transmitting by ones of the plurality of peers, an input symbol segment stored by the peer so that available ones of the plurality of peers and the heal requestor receive the input symbol segment; and if erasure of an input symbol segment has occurred:

transmitting by ones of the plurality of peers, one checksum symbol segment per erasure, and regenerating the erased input symbol segment using the transmitted checksum symbol and the rest of the codeword, any checksum symbol segment being able to repair any input symbol segment in conjunction with the rest of the codeword.

storing the regenerated input symbol segment by the heal requestor; and generating and storing checksum symbol segments by the heal requestor.

F1. The method of clause F, where the regenerating is done in accordance with a rotational lookup table.

F2. The method of clause F, further including determining which of the plurality of peers are available at a beginning of the data retrieval process.

F3. The method of clause F2, further including creating a rotational lookup table in accordance with which peers are available.

F4. The method of clause F, wherein the transmitting of a symbol segment is performed using multicasting.

F5. The method of clause F, wherein non-available peers are identified and a rotational lookup table is adjusted on the fly to take failures into account.

F6. The method of clause F, wherein the healing process occurs when the cluster of peers is active but only concurrent read access is allowed to any file being healed.

F7. The method of clause F, wherein the healing process occurs when the cluster of peers is active and various files are concurrently being accessed and modified including those being healed.

F8. The method of clause F7, further including the heal peer participating equally in all concurrent 110 requests below the heal high-water mark of the file.

F9. The method of clause F7, further including the heal peer upon completion of healing a file joining fully in all concurrent I/O requests on the file.

F10. The method of clause F, where multiple files per peer are healed concurrently.

F11. The method of clause F, where multiple peers are healed concurrently.

Re-Striping the Cluster

G. A method for balancing the storage of a plurality of peers by restriping their contents, comprising:

receiving, by a plurality of peers of the system, a restripe request from a requestor; and transmitting by ones of the plurality of peers, an input symbol segment stored by the peer so that available ones of the plurality of peers receive the input symbol segment; and if erasure of an input symbol segment has occurred:

transmitting by ones of the plurality of peers, one checksum symbol segment per erasure, and regenerating the erased input symbol segment using the transmitted checksum symbol and the rest of the codeword, any checksum symbol segment being able to repair any input symbol segment in conjunction with the rest of the codeword.

aggregating the input symbol segments by the plurality of peers; and storing new stripe input symbol segments by the plurality of peers; and generating and storing new stripe checksum symbol segments by the plurality of peers.

G1. The method of clause G, where the regenerating of the original erased input symbol segment is done in accordance with a rotational lookup table.

G2. The method of clause G, further including determining which of the plurality of peers are available at a beginning of the data retrieval process.

G3. The method of clause G2, further including creating a rotational lookup table in accordance with which peers are available.

G4. The method of clause G, wherein the transmitting of a symbol segment is performed using multicasting.

G5. The method of clause G, wherein non-available peers are identified and a rotational lookup table is adjusted on the fly to take failures into account.

G6. The method of clause G, where the regenerating of the new erased input symbol segment is done in accordance with a rotational lookup table.

G7. The method of clause G, wherein non-available peers in the new plurality of peers are identified and a rotational lookup table is adjusted on the fly to take failures into account.

G8. The method of clause G, wherein the restriping process occurs when the cluster of peers is active but only concurrent read access is allowed to any file restriped healed.

G9. The method of clause G, wherein the restriping process occurs when the cluster of peers is active and various files are concurrently being accessed and modified including those being restriped.

G10. The method of clause G9, further including the plurality of restriped peers participating equally in all concurrent I/O requests below the restripe high-water mark of the file.

G11. The method of clause G9, further including the plurality of restriped peers upon completion of restriping a file joining fully in all concurrent I/O requests on the file.

G12. The method of clause G, where multiple files per peer are restriped concurrently.

G13. The method of clause G, where failed peers are healed as the cluster is restriped.

Multicaster/Demulticaster

H. A system for filtering network packets between a multicast-centric cluster and its clients to eliminate multicast disruptions outside the cluster, comprising:

one network communication port connected to the cluster switch and one network communication port connected to the client LAN; and receiving, by the system, inbound unicast packets specifying a secondary network address from the clients; and if the secondary network address is a multicast address:
forwarding the packet via the cluster port to the multicast address.

if the secondary network address is a unicast address:
forwarding the packet via the cluster port to the unicast address.

receiving, by the system, outbound packets specifying a secondary network address from the cluster; and if the secondary network address is a multicast address:
ignore the packet.

if the secondary network address is a unicast address:
forwarding the packet via the client port to the unicast address.

H1. The method of clause H, wherein the cluster switch is embedded into the system.

H2. The method of clause H, wherein there are multiple ports connected to the cluster switch and multiple ports are connected to the client LAN.

H3. The method of clause H, wherein the system is incorporated into one or more peers of the cluster.

Cluster Locks

I. A method of arbitrating between competing requests for a resource distributed across a plurality of peers, comprising:

receiving, by a plurality of peers of the system, a resource request from a resource requestor; and voting, by all peers of the system, for the granting of the resource request; and if the majority of the peers of the system voted not to grant the resource:

denying the request for the resource.

if the majority of the peers of the system voted to grant the resource:

all the peers not in the majority changing their votes to join the majority thereby unanimously granting the resource by all peers of the system, and granting the request for the resource.

if the all the peers having voted in reply to a plurality of conflicting requests for resources, no request receives a majority of the votes to grant the resource:

identifying the request for the resource that received the most votes, and all the peers not having voted for granting this request changing their votes to grant this request thereby unanimously granting the resource by all peers of the system, and granting the request for the resource.

if the all the peers having voted in reply to a plurality of conflicting requests for resources, two or more requests tie for the highest count of the votes to grant the resource:

identifying the request for the resource that has the lowest lexicographically transaction id, and all the peers not having voted for granting this request changing their votes to grant this request thereby unanimously granting the resource by all peers of the system, and granting the request for the resource.

I1. The method of clause I, wherein the request is to release the resource previously granted.

I2. The method of clause I, wherein the request is to test the possibility to be granted the resource.

I3. The method of clause I, wherein the resource is a directory distributed across a plurality of peers.

I4. The method of clause I, wherein the resource is a file striped across a plurality of peers.

I5. The method of clause I, wherein the resource is an mutex abstraction distributed across a plurality of peers.

I6. The method of clause I, wherein a resource requestor previously granted one or more resources fails and the plurality of peers having granted the resource release the resource.

I7. The method of clause I, where each UDP/IP packet contains a protocol header describing the packet contents as well as the packet sequence.

Reed-Solomon Codec

J. A method of applying changes to the input symbols of a codeword by using the matching old input symbols to compute the corresponding changes to previously generated checksum symbols, comprising:

receiving, by a plurality of peers of the system, new input symbols for a codeword; and receiving, by a plurality of peers of the system, the matching old input symbols for the codeword; and generating, by all peers of the system rotationally designated to generate checksum symbols, interim checksum symbol corresponding to the old checksum symbols minus the old input symbols; and generating, by all peers of the system rotationally designated to generate checksum symbols, new checksum symbol corresponding to the interim checksum symbols plus the new input symbols.

J1. The method of clause J, wherein subtracting the old input symbols from the old checksum symbol segments comprises re-encoding the old input symbols.

J2. The method of clause J, wherein if the old input symbols are part of an erasure of the codeword, they must first be regenerated through the repair of the codeword.

Virtual File System

K. A system for storing and retrieving content across a plurality of peers, comprising:
  a highly resilient storage system:
    no single point of failure, and
    able to withstand multiple failures, and
    a configurable forward error correction level
  no single owner:
    mounted by multiple computers; and
    no computer has exclusive ownership of the system
  a highly scalable with each additional peer incrementing the system's:
    storage capacity; and
    network bandwidth; and
    disk bandwidth; and
    CPU bandwidth; and
    resiliency
  all peers are equal:
    all peers perform the same amount of work; and
    all peers have the same knowledge K1. The method of clause K, wherein the count of peers in the system can increase dynamically.

K2. The method of clause K, wherein the count of peers in the system can decrease dynamically.

K3. The method of clause K, wherein any of the plurality of peers can mount the system.

Virtual Block Device

L. A system for storing and retrieving content across a plurality of peers, comprising:
  a highly resilient storage system:
    no single point of failure, and
    able to withstand multiple failures, and
    a configurable forward error correction level
  multiple systems per plurality of peers:
    each mounted by a single file system that has exclusive ownership of the system
  a highly scalable with each additional peer incrementing the system's:
    storage capacity; and
    network bandwidth; and
    disk bandwidth; and
    CPU bandwidth; and
    resiliency
  all peers are equal:
    all peers perform the same amount of work; and
    all peers have the same knowledge L1. The method of clause L, wherein the count of peers in the system can increase dynamically.

L2. The method of clause L, wherein the count of peers in the system can decrease dynamically.

What is claimed is:

1. A method for operating a cluster of peer systems supporting a filesystem common to all of the peers in the cluster, the filesystem including a plurality of files each divided into codewords striped across at least a subset of the peer systems, comprising the steps of:

each of the peers across which codewords of a particular one of the files are striped having a respective local copy of file metadata indicating both the identity of all the peers across which the codewords of the particular file are striped, and which portions of each of the codewords are assigned to which of the peers, the particular file being striped across more than one peer;

each given available one of the peers across which codewords of the particular file are striped, in response to receiving from a content requestor a first multicast request message which includes a request to read data from the particular file, the first request message identifying both the particular file and the range of data requested, determining in dependence upon both the file metadata copy local to the given peer and the file and data range identified in the first request message, which respective portion of the requested data (if any) is the responsibility of each of the available peers to provide and which respective portion of the requested data is the responsibility of each unavailable peer (if any) to provide; and each of the given available peers multicasting, toward at least the content requestor and all of the available ones of the peers across which codewords of the particular file are striped, the data which is the responsibility of given peer to provide; and each of the given peers including in conjunction with its multicast data an identification of both the particular file and the range of data requested by the first request message.

2. The method of claim 1, wherein the particular codeword includes a checksum symbol segment, and wherein a first subject one of the peers across which codewords of the particular file are striped is unavailable, thereby rendering a first input symbol segment of the file missing, the method comprising a second subject one of the peers across which codewords of the particular file are striped:

determining, in dependence upon both the file metadata copy local to the second subject peer and the file and data range identified in the first request message, that the second subject peer has a first checksum symbol segment applicable for regenerating the first missing input symbol segment; and multicasting the first checksum symbol segment toward at least all of the available ones of the peers across which codewords of the particular file are striped.

3. The method of claim 2, further comprising a third subject one of the peers across which codewords of the particular file are striped:

determining in dependence upon both the file metadata copy local to the third subject peer and the file and data range identified in the first request message, that the third subject peer is responsible for regenerating the first missing input symbol segment;

regenerating the first missing input symbol segment in dependence upon the first checksum symbol segment received by multicast from the second subject peer and in further dependence upon data received from available ones of the peers responsively to the first request message; and multicasting the regenerated first missing input symbol segment.

4. The method of claim 3, wherein the range of data identified in the first request message covers fewer than all input symbol segments of a particular codeword of the file, but does cover the first missing input symbol segment, further comprising a fourth subject one of the peers:

determining in dependence upon both the file metadata copy local to the fourth subject peer and the file and data range identified in the first request message, that the data range identified in the first request message excludes fourth data of the particular codeword held by the fourth subject peer; and in dependence upon recognition that the first subject peer is unavailable, multicasting the fourth data of the particular codeword toward at least the third subject peer.

5. The method of claim 1, wherein a first subject one of the peers across which codewords of the particular file are striped is unavailable, thereby rendering a first input symbol segment of the file missing, and wherein the particular codeword includes a checksum symbol segment applicable for regenerating the first missing input symbol segment, the method comprising a third subject one of the peers across which codewords of the particular file are striped:

determining in dependence upon both the file metadata copy local to the third subject peer and the file and data range identified in the first request message, that the third subject peer is responsible for regenerating the first missing input symbol segment;

regenerating the first missing input symbol segment in dependence upon the checksum symbol segment and in further dependence upon data received from available ones of the peers responsively to the first request message; and multicasting the regenerated first missing input symbol segment.

6. The method of claim 5, further comprising the third subject peer determining, in dependence upon both the file metadata copy local to the second subject peer and the file and data range identified in the first request message, that the third subject peer has the checksum symbol segment stored locally to the third subject peer.

7. The method of claim 1, wherein a particular one of the peers across which codewords of the particular file are striped fails to receive the first request message, further comprising the particular peer, in response to receiving a particular one of the multicasts sent by a peer responsively to the first request message, the particular multicast including in conjunction therewith the identification of both the particular file and the range of data requested, multicasting the data which is the responsibility of particular peer to provide.

8. The method of claim 7, wherein the first request message is one of a plurality of request messages sent by a data requestor, each of which further includes a unique request identifier, wherein each of the multicasts sent by peers includes in conjunction therewith the unique identifier of the request identifier of the request message to which it is responsive, further comprising the particular peer discovering its failure to receive the first request message at least in part by determining that the particular peer had not previously seen a request message having the same request identifier as the particular multicast.

9. The method of claim 1, wherein the filesystem common to all of the peers in the cluster includes a directory hierarchy which is replicated in all of the peers in the cluster.

10. The method of claim 1, wherein the identification of the particular file includes a directory path to the particular file and a name of the particular file.

11. The method of claim 1, wherein the file metadata copies local to each of the peers across which codewords of each subject one of the files is striped each indicate the identity of all the peers across which the codewords of the subject file are striped, including both available peers and any unavailable peers.

12. The method of claim 11, wherein the file metadata copies local to each of the peers across which codewords of each particular one of the files is striped each further indicate a total peer count across which the subject file was striped and a minimum available peer count necessary to open the particular file.

13. The method of claim 1, wherein the range of data identified by the first multicast request message begins with a block other than the first block of the particular file.

* * * * *